(12) United States Patent
Takahashi et al.

(10) Patent No.: US 10,891,983 B2
(45) Date of Patent: Jan. 12, 2021

(54) DISC DEVICE

(71) Applicant: Panasonic Intellectual Property Management Co., Ltd., Osaka (JP)

(72) Inventors: Hiroshi Takahashi, Hyogo (JP); Yukio Morioka, Osaka (JP); Takuto Yamazaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/641,270

(22) PCT Filed: Oct. 12, 2018

(86) PCT No.: PCT/JP2018/038103
§ 371 (c)(1),
(2) Date: Feb. 24, 2020

(87) PCT Pub. No.: WO2019/111531
PCT Pub. Date: Jun. 13, 2019

(65) Prior Publication Data
US 2020/0357440 A1    Nov. 12, 2020

(30) Foreign Application Priority Data
Dec. 7, 2017   (JP) ................................ 2017-235496

(51) Int. Cl.
  *G11B 23/03* (2006.01)
  *G11B 17/26* (2006.01)
  *G11B 23/023* (2006.01)
(52) U.S. Cl.
  CPC .......... *G11B 23/0313* (2013.01); *G11B 17/26* (2013.01); *G11B 23/023* (2013.01)

(58) Field of Classification Search
  CPC .... G11B 23/0311; G11B 17/26; G11B 23/023
  (Continued)

(56) References Cited

U.S. PATENT DOCUMENTS 6,091,696 A * 7/2000 Miyoshi ................. G11B 17/26
                                                    369/179
8,984,544 B2 * 3/2015 Goto ................... G11B 23/0328
                                                    720/615
(Continued)

FOREIGN PATENT DOCUMENTS

JP    2014-13639    1/2014
JP    2014-17044    1/2014

OTHER PUBLICATIONS

International Search Report dated Jan. 8, 2019 in International (PCT) Application No. PCT/JP2018/038103.

*Primary Examiner* — Allen T Cao
(74) *Attorney, Agent, or Firm* — Wenderoth, Lind & Ponack, L.L.P.

(57) ABSTRACT

The disc device comprises disc selector spindle that hold discs in a stacked state, separate lowermost disc from other discs, and supply separated lowermost disc to drive unit. The disc selector spindle includes first, second, and third support claws that move to storage position at which each support claw is stored inside center hole of disc and protrusion position at which each support claw protrudes in a region located in the vicinity of inner diameter of disc in plan view. First support claw moves to storage position and protrusion position independently of the movements of second support claw and third support claw. Second support claw is disposed so as to be shifted from third support claw in a stacking direction of disc by a thickness of one disc, and to move from storage position to protrusion position at a timing different from a timing of third support claw.

11 Claims, 47 Drawing Sheets

(58) Field of Classification Search
USPC .................................... 720/615, 616, 601
See application file for complete search history.

(56) References Cited

U.S. PATENT DOCUMENTS

| | | | | |
|---|---|---|---|---|
| 2013/0326549 A1* | 12/2013 | Nishi | ................... | G11B 17/225 |
| | | | | 720/615 |
| 2013/0336098 A1 | 12/2013 | Yamazaki et al. | | |
| 2013/0347012 A1* | 12/2013 | Maeda | ............... | G11B 23/0323 |
| | | | | 720/610 |

* cited by examiner

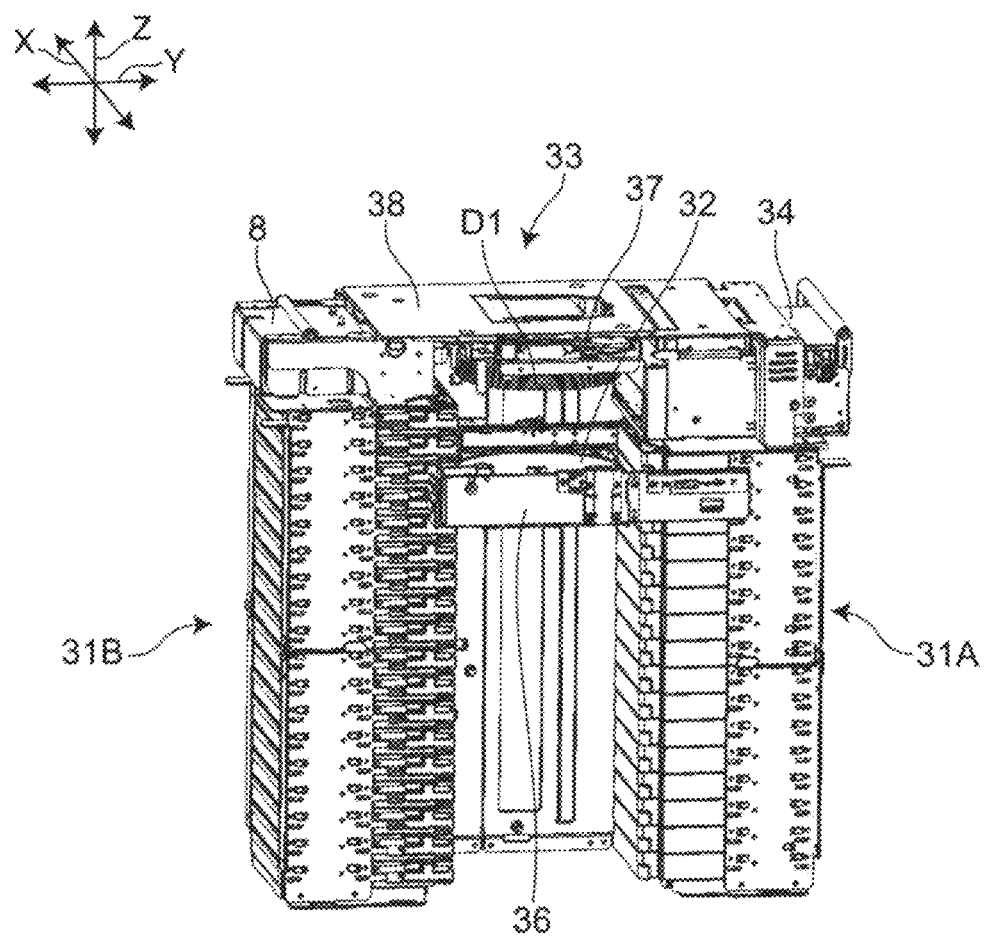

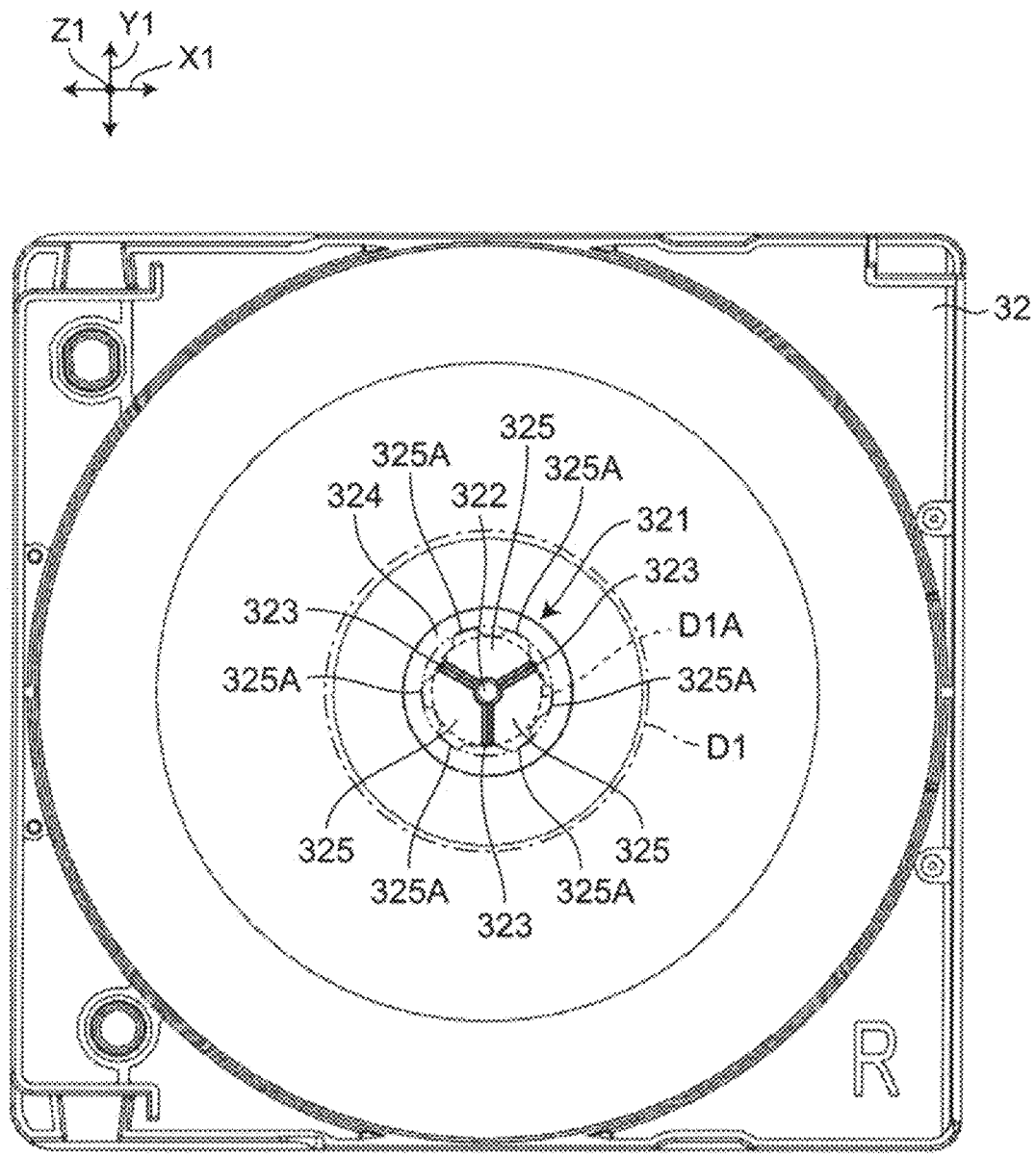

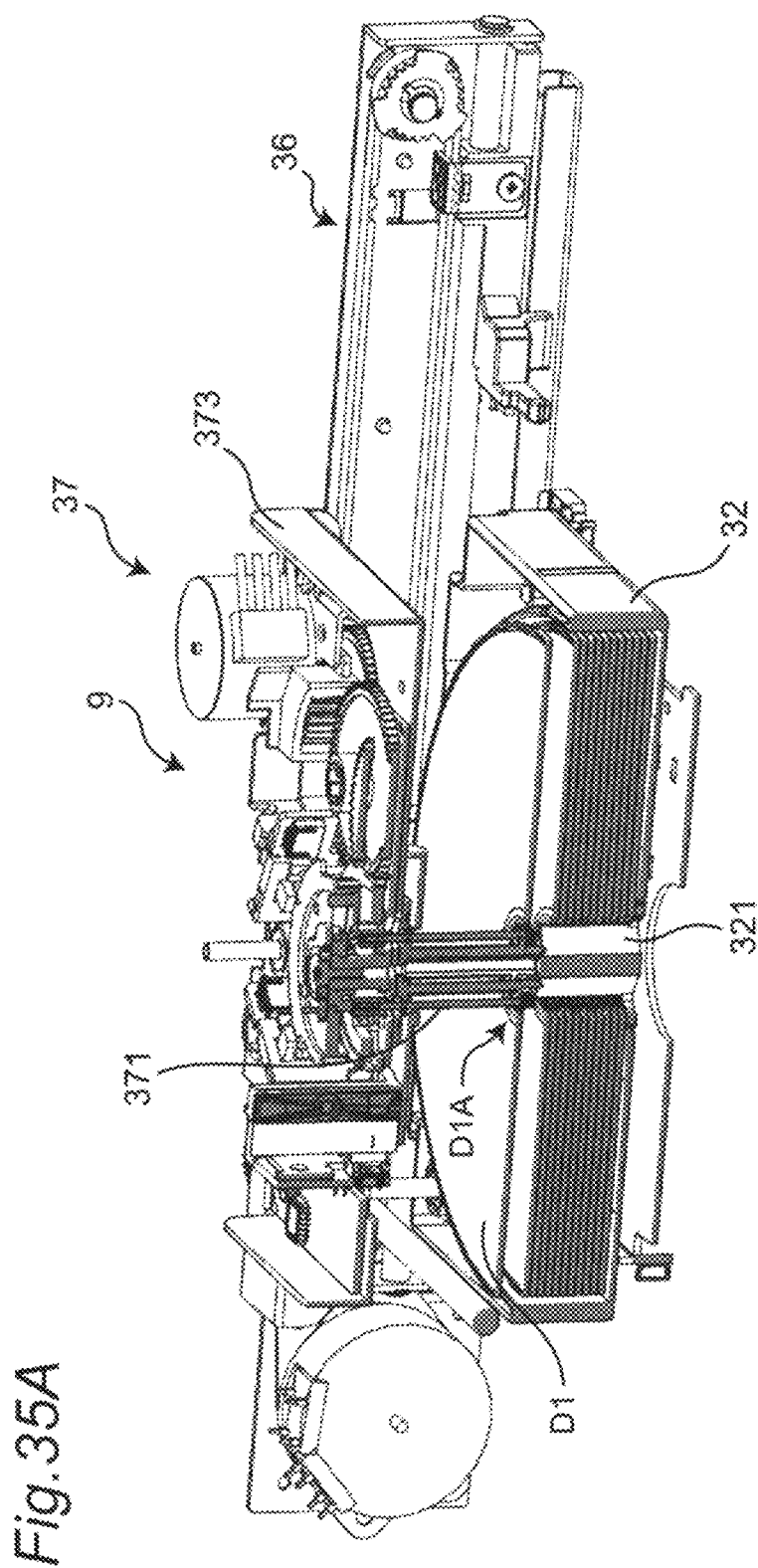

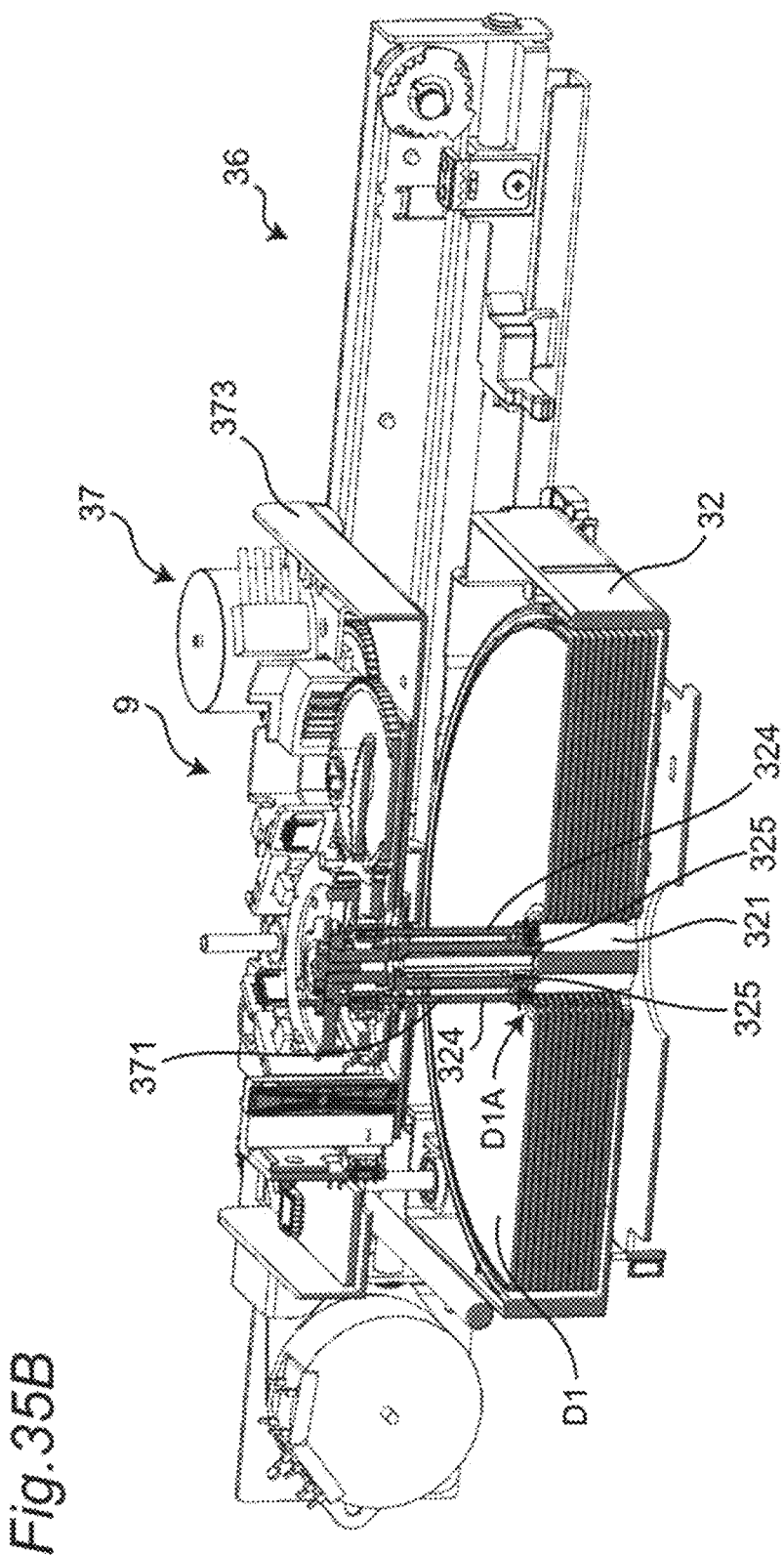

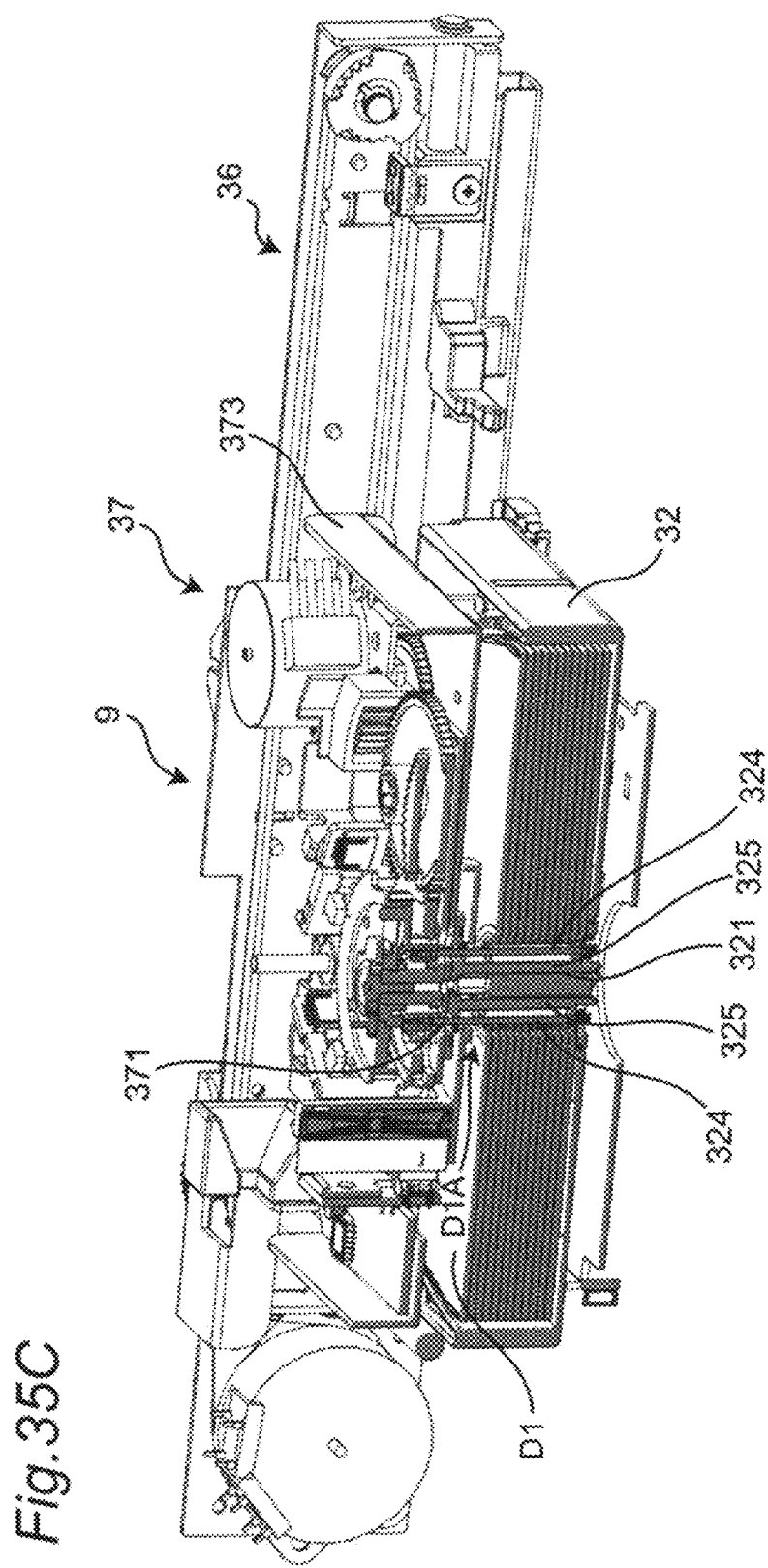

DISC DEVICE

TECHNICAL FIELD

The present disclosure relates to a disc device that supplies one disc of a plurality of stacked discs (a disc-shaped information storage medium such as a CD and a DVD) to a drive unit.

BACKGROUND ART

In the related art, for example, a device described in Patent Document 1 (JP 2014-13639 A) is known as this type of disc device. FIG. 36 is a perspective view schematically illustrating a schematic configuration of a disc device of the related art.

The disc device of the related art includes two magazine stockers 101 and 101. Two magazine stockers 101 and 101 are provided on a bottom chassis 111 so as to face each other. In FIG. 36, one (front side) magazine stocker 101 is not illustrated.

Each magazine stocker 101 stores a plurality of magazines 102. Each magazine 102 includes a disc tray 121 that stores a plurality of discs, and a box-shaped tray holder (not illustrated) that stores the disc tray 121. A picker 103 that pulls out the disc tray 121 from the tray holder to hold the disc tray 121 is provided between two magazine stockers 101 and 101.

The picker 103 is configured to transport the held disc tray 121 to the vicinity of a plurality of drive units 104 arranged at the rear of the device. A lifter 105 that pushes out a plurality of discs from the disc tray 121 is integrally provided at the picker 103.

The drive unit 104 is a device that records or reproduces information on the disc. The drive unit 104 is a tray-type drive unit that loads the disc by using a tray. The plurality of drive units 104 is stacked in a height direction of the device, and is arranged adjacent to the magazine stockers 101 and 101 at the rear of the device. A carrier 106 is provided between the plurality of drive units 104 arranged so as to be stacked adjacent to one magazine stocker 101 and the plurality of drive units 104 arranged so as to be stacked adjacent to the other magazine stocker 101.

The carrier 106 is configured to hold the plurality of discs pushed out by the lifter 105 in a stacked state, separate the lowermost disc from the plurality of held discs above the tray discharged from any drive unit 104, and place the separated disc on the tray.

An electric circuit and a power supply 107 are provided further behind the device than the carrier 106 and the plurality of drive units 104. A control unit (not illustrated) that controls operations (motors) of the units such as the picker 103, the drive unit 104, and the carrier 106 is provided at the electric circuit and the power supply 107. The control unit is connected to, for example, a host computer that manages data. The host computer sends a command to the control unit to perform an operation such as writing or reading data to or from the designated magazine 102 based on an instruction from an operator. The control unit controls the operations of the units such as the picker 103, the drive unit 104, and the carrier 106 according to the command. Hereinafter, a unit having functions of the picker 103, the lifter 105, and the carrier 106 is referred to as a "changer unit".

PRIOR ART DOCUMENT

Patent Document

Patent Document 1: JP 2014-13639 A

SUMMARY OF THE INVENTION

Subjects to be Solved by the Invention

The disc device of the related art is a large-sized device that includes the plurality of drive units 104 and is configured to simultaneously record or reproduce the plurality of discs. Thus, a transport time of the disc from the magazine stocker 101 to the drive unit 104 by the changer unit becomes relatively long.

In contrast, the applicant has studied the disc device in which one changer unit is provided for one drive unit and the number of disc trays stored in one device is reduced. According to this disc device, since a size of the device can be reduced, the disc transport time can be reduced. A plurality of the disc devices is arranged, and thus, it is possible to store the same number of disc trays in the same installation space as the disc device of the related art. In the disc device, since it is not necessary to supply the disc to each of the plurality of drive units, it is considered that a configuration of the changer unit can be simplified.

In the disc device of the related art, the lifter 105 is configured to push out the plurality of discs from the disc tray 121 by inserting three pins into the disc tray 121 through three through-holes formed in a bottom wall of the disc tray 121. At this time, the lifter 105 is provided such that three pines are arranged apart from each other at positions near a recording region of the lowermost disc in plan view in order for three pins to stably hold the plurality of discs. Three through-holes formed in the bottom wall of the disc tray 121 are also arranged apart from each other at positions near the recording region of the lowermost disc in plan view. In this configuration, a foreign substance such as dust may enter the disc tray 121 through three through-holes, and the foreign substance may damage the recording region of the disc.

Accordingly, the present disclosure has been made in order to solve the aforementioned problems, and an object of the present disclosure is to provide a disc device capable of simplifying a configuration of a changer unit by eliminating the necessity of providing a lifter.

Means for Solving the Subjects

A disc device according to the present disclosure is a disc device that supplies one disc of a plurality of stacked discs to a drive unit. The device includes a disc selector spindle that is inserted into center holes formed in the plurality of discs, and is configured to hold the plurality of discs in a stacked state, separate a lowermost disc from the other discs, and supply the separated lowermost disc to the drive unit. The disc selector spindle includes a select hook having a first support claw, and a drop hook having a second support claw and a third support claw, each of the first support claw, the second support claw, and the third support claw is configured to move to a storage position at which each support claw is stored inside the center hole of the disc and a protrusion position at which each support claw protrudes in a region located in the vicinity of an inner diameter of the disc in plan view, the first support claw is configured to move to the storage position and the protrusion position independently of the movements of the second support claw and the third support claw, and the second support claw is disposed so as to be shifted from the third support claw in a stacking direction of the disc by a thickness of one disc, and is configured to move from the storage position to the protrusion position at a timing different from a timing of the third support claw.

Effects of the Invention

According to the disc device of the present disclosure, it is possible to simplify the configuration of the changer unit by eliminating the necessity of providing the lifter.

BRIEF DESCRIPTION OF THE DRAWINGS

FIG. 7E is a perspective view illustrating the disc transport operation subsequent to FIG. 7D.

FIG. 10 is a plan view of the disc tray.

FIG. 35A is a perspective view illustrating a modification example of the disc returning operation in which the disc selector spindle collects the disc on the tray of the drive unit and returns the collected disc to the disc tray in a partial cross-section.

FIG. 35B is a perspective view illustrating the disc returning operation subsequent to FIG. 35A in a partial cross-section.

FIG. 35C is a perspective view illustrating the disc returning operation subsequent to FIG. 35B in a partial cross-section.

Figure 1:
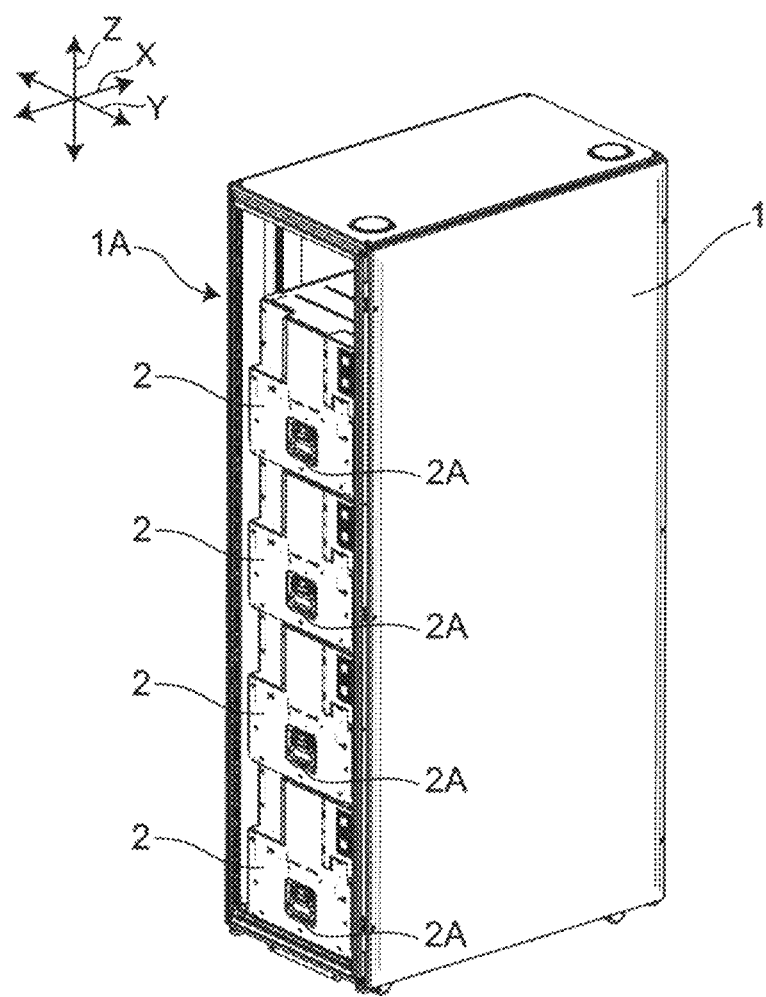
FIG. 1 is a perspective view of a storage that stores a plurality of disc devices according to an embodiment.

MODES FOR CARRYING OUT THE INVENTION (Knowledge that Becomes Basis of Present Disclosure)

The inventors have intensively studied in order to simplify the configuration of the changer unit by eliminating the necessity of providing the lifter, and have obtained the following knowledge as a result of the intensive study.

The disc device of the related art is configured to hold and separate the plurality of discs by moving three pins provided at the lifter and the first support claw and the second support claw provided at one cylindrical disc selector spindle forward and backward.

In contrast, the present inventors have found that it is possible to simplify the configuration of the changer unit by eliminating the necessity of providing the lifter in such a manner that the disc selector spindle is divided into the plurality of parts, the disc selector spindle is formed in a shape capable of penetrating the disc tray, and the movement timings of the first support claw, the second support claw, and the third support claw are controlled. The following invention has been achieved based on this new knowledge.

According to a first aspect of the present disclosure, there is provided a disc device that supplies one disc of a plurality of stacked discs to a drive unit. The device includes a disc selector spindle that is inserted into center holes formed in the plurality of discs, and is configured to hold the plurality of discs in a stacked state, separate a lowermost disc from the other discs, and supply the separated lowermost disc to the drive unit. The disc selector spindle includes a select hook having a first support claw, and a drop hook having a second support claw and a third support claw, each of the first support claw, the second support claw, and the third support claw is configured to move to a storage position at which each support claw is stored inside the center hole of the disc and a protrusion position at which each support claw protrudes in a region located in the vicinity of an inner diameter of the disc in plan view, the first support claw is configured to move to the storage position and the protrusion position independently of the movements of the second support claw and the third support claw, and the second support claw is disposed so as to be shifted from the third support claw in a stacking direction of the disc by a thickness of one disc, and is configured to move from the storage position to the protrusion position at a timing different from a timing of the third support claw.

According to a second aspect of the present disclosure, in the disc device according to the first aspect, the select hook includes a first shaft extending in the stacking direction, the first support claw is configured to move to the storage position and the protrusion position in conjunction with a rotation operation of the first shaft around an axis, the drop hook includes a second shaft extending in the stacking direction, and the second support claw and the third support claw are configured to move to the storage positions and the protrusion positions in conjunction with a rotation operation of the second shaft around an axis.

According to a third aspect of the present disclosure, in the disc device according to the first or second aspect, the select hook and the drop hook are configured to relatively move in the stacking direction.

According to a fourth aspect of the present disclosure, in the disc device according to any one of the first to third aspects, the disc selector spindle is configured to position the first support claw, the second support claw, and the third support claw at the storage positions when the disc selector spindle is inserted into the center holes of the plurality of discs, move the first support claw and the second support claw from the storage positions to the protrusion positions when the first support claw and the second support claw are moved below a predetermined disc, and cause the first support claw and the second support claw to hold the predetermined disc and a disc above the predetermined disc by moving the first support claw and the second support claw upward relative to the predetermined disc in a state in which the first support claw and the second support claw are located at the protrusion positions.

According to a fifth aspect of the present disclosure, in the disc device according to the fourth aspect, the disc selector spindle is configured to separate a disc below the predetermined disc from the predetermined disc by moving the first support claw or the second support claw downward relative to the predetermined disc in a state in which the first support claw and the second support claw hold the predetermined disc and the disc above the predetermined disc.

According to a sixth aspect of the present disclosure, in the disc device according to any one of the first to fifth aspects, the disc selector spindle is configured to move the second support claw from the protrusion position to the storage position and move the third support claw from the storage position to the protrusion position in a state in which the first support claw and the second support claw hold a predetermined disc and a disc above the predetermined disc, cause the third support claw to hold the predetermined disc and the disc above the predetermined disc by moving the first support claw from the protrusion position to the storage position in a state in which the second support claw is located at the storage position and the third support claw is located at the protrusion position, and separate the predetermined disc from the disc above the predetermined disc by moving the first support claw and the second support claw from the storage positions to the protrusion positions and moving the third support claw from the protrusion position to the storage position in a state in which the third support claw holds the predetermined disc and the disc above the predetermined disc.

According to a seventh aspect of the present disclosure, in the disc device according to the sixth aspect, the disc selector spindle is configured to separate the predetermined disc from the disc above the predetermined disc by moving the first support claw and the second support claw downward relative to the predetermined disc in a state in which the first support claw and the second support claw are located at the protrusion positions and the third support claw is located at the storage position.

According to an eighth aspect of the present disclosure, in the disc device according to any one of the first to seventh aspects, the disc selector spindle includes a plurality of the select hooks and a plurality of the drop hooks.

According to a ninth aspect of the present disclosure, in the disc device according to the eighth aspect, the plurality of select hooks and the plurality of drop hooks are alternately arranged at intervals in a circumferential direction of the center hole of the disc in plan view.

According to a tenth aspect of the present disclosure, in the disc device according to the eighth or ninth aspect, at least one of the first support claw of one select hook of the plurality of select hooks and the second support claw of one drop hook of the plurality of drop hooks is configured to correct an inclination of the disc with respect to a direction orthogonal to the stacking direction by coming in contact with an inner peripheral portion of the disc earlier than the other support claw when the at least one moves from the storage position to the protrusion position.

According to an eleventh aspect of the present disclosure, the disc device according to any one of the first to tenth aspects further includes a disc tray that stores the plurality of discs in the stacked state. The disc tray has a through-hole in the region located in the vicinity of the inner diameter of the disc in plan view, and the disc selector spindle is configured to move to a position at which a lower end portion protrudes downward outside the disc tray via the through-hole.

Hereinafter, an embodiment will be described in detail while appropriately referring to the drawings. However, unnecessarily detailed description may be omitted. For example, detailed descriptions of already well-known matters and redundant descriptions for substantially the same configuration may be omitted. By doing this, the following description is avoided from being unnecessarily redundant, and thus, it is easy to facilitate understanding of those skilled in the art.

The inventors provide the accompanying drawings and the following description in order for those skilled in the art to fully understand the present disclosure, and do not intend to limit the subject matter described in the claims by the accompanying drawings and the following description.

In the following description, terms indicating directions such as "up", "down", "right", "left", "front", and "oblique" are used on the assumption that these terms are usually used for the sake of convenience in description. However, these terms do not mean that a use state of a disc device of the present disclosure is limited.

Embodiment

FIG. 1 is a perspective view of a storage that stores a plurality of disc devices according to an embodiment.

A storage 1 is, for example, a 19-inch rack. The storage 1 is a rectangular parallelepiped box-shaped member, and has an opening 1A on a front surface. In the storage 1, a length in a depth direction X is, for example, 1,000 mm, a length in a horizontal direction Y is, for example, 600 mm, and a length in a vertical direction Z is, for example, 2,000 mm. The storage 1 includes a plurality of drawers 2 as illustrated in FIG. 1. In the embodiment, four drawers 2 are arranged in the vertical direction Z. Each drawer 2 is configured to be drawn in and out through the opening 1A of the storage 1. Each drawer 2 is configured to be operable independently of the other drawers 2, and even when the storage 1 is powered on, the drawer 2 can be drawn out without obstructing operations of the other drawers 2. However, electrical control is performed such that only one drawer 2 can be drawn out within the same rack. Accordingly, it is possible to prevent a center of gravity from moving forward by drawing out the plurality of drawers 2 and the storage 1 from falling down.

Figure 2:
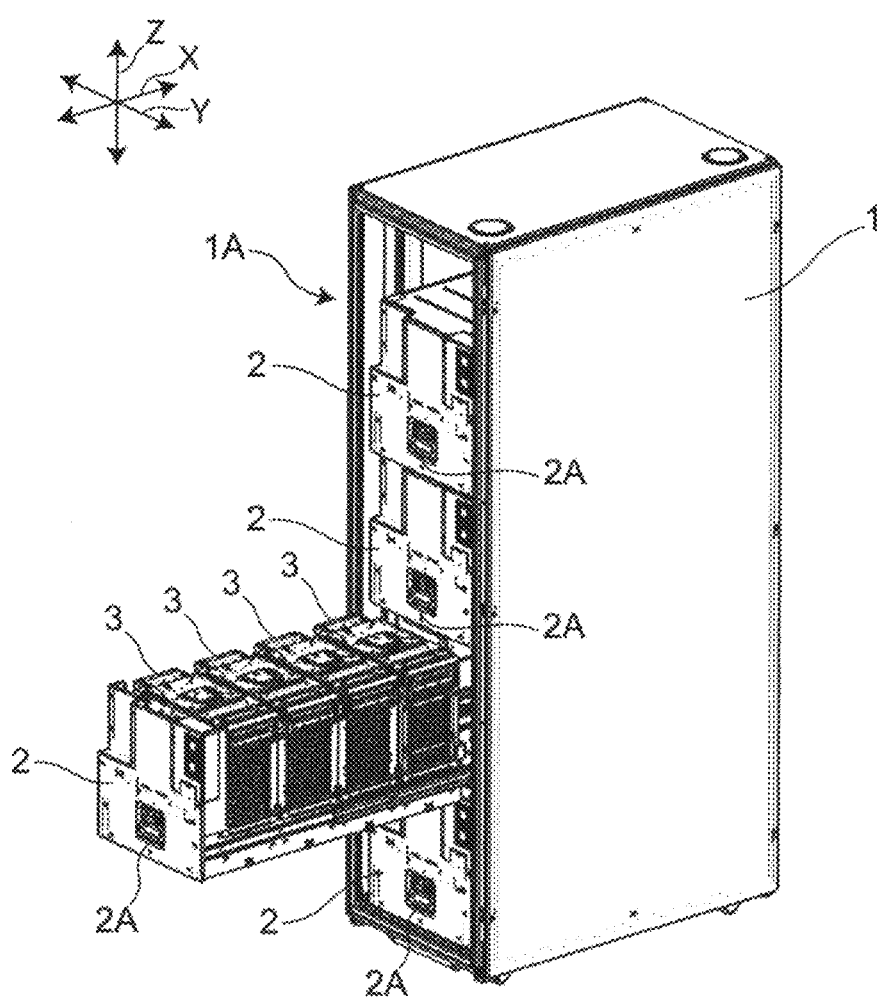
FIG. 2 is a perspective view illustrating a state in which one drawer is drawn out from the storage of FIG. 1.

FIG. 2 is a perspective view illustrating a state in which one drawer 2 is drawn out from the storage 1 of FIG. 1.

As illustrated in FIG. 2, the drawer 2 stores the plurality of disc devices (also referred to as changer modules) 3 according to the embodiment. In the embodiment, four disc devices 3 are stored in one drawer 2 in the depth direction X. A handle 2A is provided on a front wall of the drawer 2. The handle 2A is pushed or pulled in the depth direction X, and thus, the drawer 2 can be easily drawn in and out of the storage 1.

Figure 3:
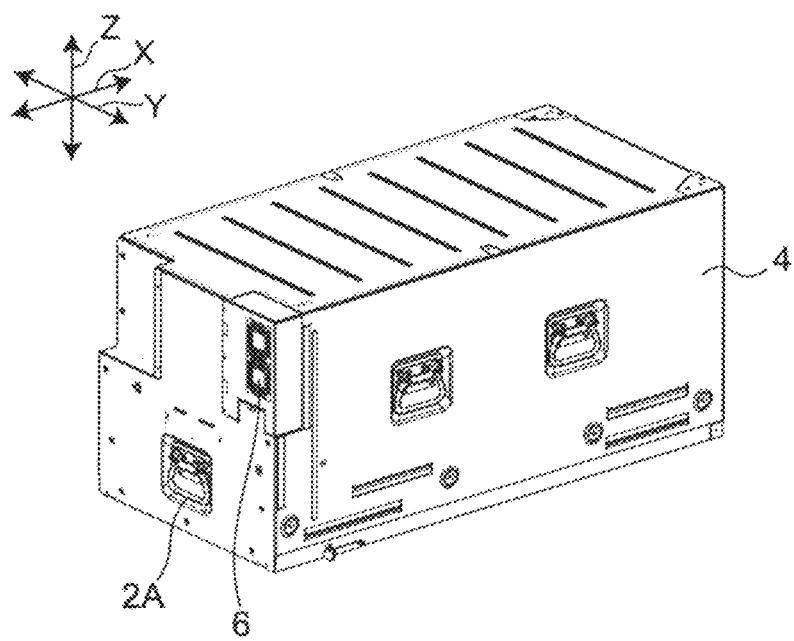
FIG. 3 is a perspective view illustrating a state in which the drawer of FIG. 2 is stored in a case.
Figure 4:
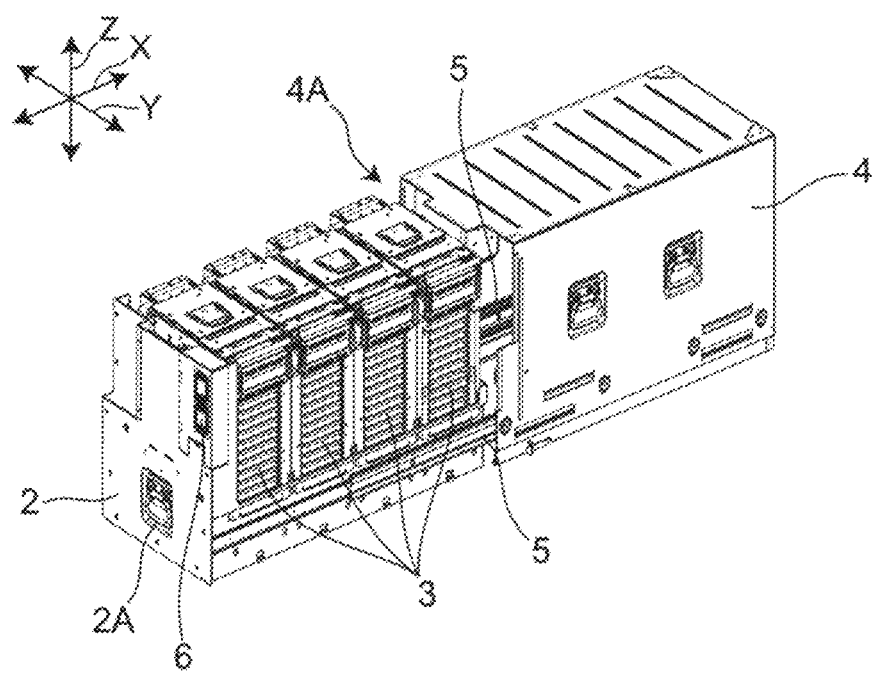
FIG. 4 is a perspective view illustrating a state in which the drawer of FIG. 2 is drawn out of the case.

FIG. 3 is a perspective view illustrating a state in which the drawer 2 is stored in a case 4. FIG. 4 is a perspective view illustrating a state in which the drawer 2 is drawn out of the case 4.

When the drawer 2 is located within the storage 1, the drawer is stored within the case 4 as illustrated in FIG. 3. Accordingly, dust is prevented from entering each disc device 3 stored within the drawer 2. The case 4 is a rectangular parallelepiped box-shaped member, and has an opening 4A (see FIG. 4) on a front surface. The case 4 is attachably and detachably fixed within the storage 1. In the embodiment, four cases 4 are stacked in the vertical direction Z.

When the drawer 2 is drawn out from the storage 1, the drawer 2 is drawn out of the case 4 through the opening 4A of the case 4 as illustrated in FIG. 4. A pair of rails 5 are provided at the case 4 so as to guide the movement of the drawer 2 in the depth direction X.

A fan unit 6 that blows cooling air for cooling the disc devices 3 is attached detachably to the front wall of the drawer 2.

Figure 5:
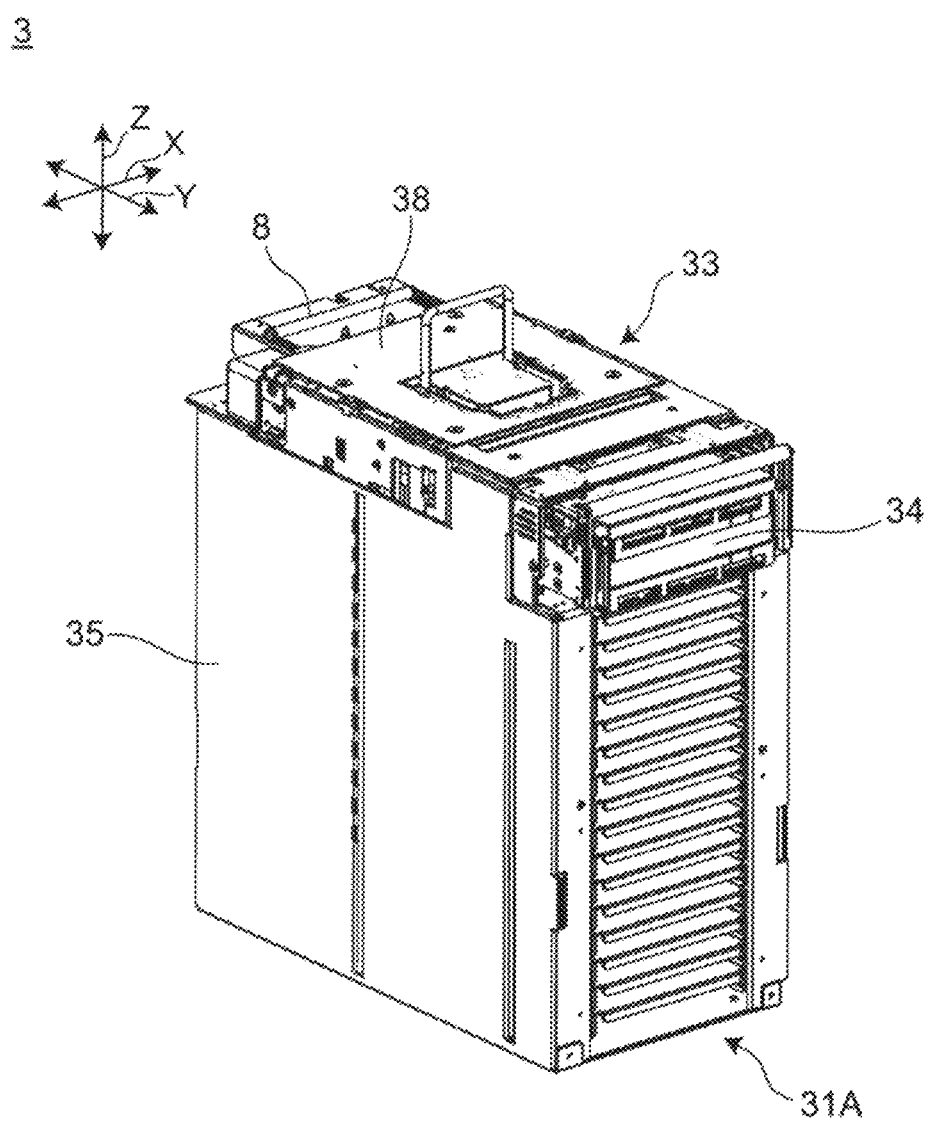
FIG. 5 is a perspective view of the disc device according to the embodiment.
Figure 6:
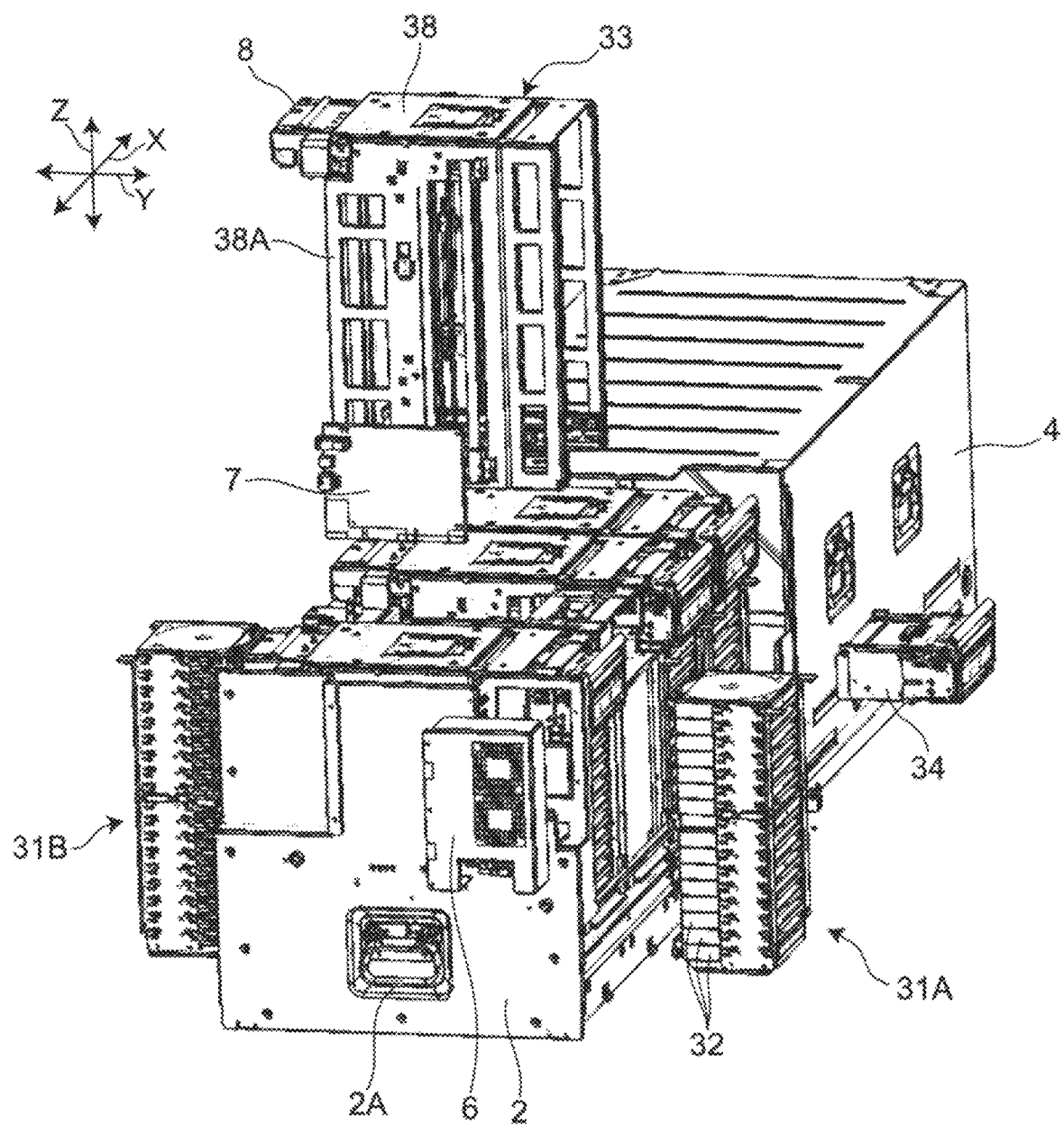
FIG. 6 is a perspective view illustrating a state in which the drawer of FIG. 2 is dawn out of the case, and is an exploded view illustrating one disc device stored in the drawer.

FIG. 5 is a perspective view of the disc device 3. FIG. 6 is a perspective view illustrating a state in which the drawer 2 is drawn out from the case 4, and is an exploded view illustrating one disc device 3 stored in the drawer 2.

The disc device 3 includes two tray stacks 31A and 31B facing each other in the horizontal direction Y.

A plurality of disc trays 32 is stored in the tray stacks 31A and 31B. The tray stacks 31A and 31B are configured to hold the plurality of disc trays 32 in the vertical direction Z. In the embodiment, the tray stack 31A disposed on a right side when viewed from the front of the drawer 2 is configured to hold 16 disc trays 32 in the vertical direction Z. The tray stack 31B disposed on a left side when viewed from the front of the drawer 2 is configured to hold 18 disc trays 32 in the vertical direction Z.

The disc tray 32 is configured to store the plurality of discs. In the embodiment, the disc tray 32 is configured to store 12 discs in a stacked state. The disc is, for example, an optical disc having a recording layer on both sides with a diameter of 12 cm. A thickness of the disc is, for example, 1.38 mm.

A changer unit 33 for transporting the disc tray 32 and the disc is provided between the tray stacks 31A and 31B.

A drive unit 34 is a device that records or reproduces information on the disc. In the embodiment, the drive unit 34 is a tray-type disc drive that loads the disc by using the tray. The drive unit 34 is attached to a casing 35.

The tray stacks 31A and 31B and the changer unit 33 are stored within the casing 35. As illustrated in FIG. 4, the tray stacks 31A and 31B are configured to be attachable and detachable by being pushed or pulled in the horizontal direction Y in a state in which the drawer 2 is drawn out of the case 4. The tray stacks 31A and 31B may be divided into a plurality of stages (for example, upper and lower two stages) such that the tray stacks 31A and 31B are easily attached to and detached from the casing 35. The changer unit 33 is configured to be attachable and detachable from the casing 35 by being pushed or pulled in the vertical direction Z in a state in which the drawer 2 is drawn out of the case 4 as illustrated in FIG. 4.

A control unit 7 that controls various operations including a disc transport operation of each disc device 3 and a blowing operation of the fan unit 6 is attached detachably to the front wall of the drawer 2. The control unit 7 is connected to a host computer that manages data, for example, in a wired or wireless manner. The host computer sends a command to the control unit 7 to perform an operation such as writing or reading data to or from a designated disc based on an instruction from an operator.

The control unit 7 controls operations of the units such as the fan unit 6, the changer unit 33, and the drive unit 34 according to the command.

A connecting unit 8 is attached to the changer unit 33 above the tray stack 31B. The connecting unit 8 electrically connects the control unit 7 with a tray carrier 36 and a disc selector 37 provided in the changer unit 33 to be described below.

FIGS. 7A to 7H are perspective views illustrating a configuration of the changer unit 33 and the disc transport operation.

Figure 7A:
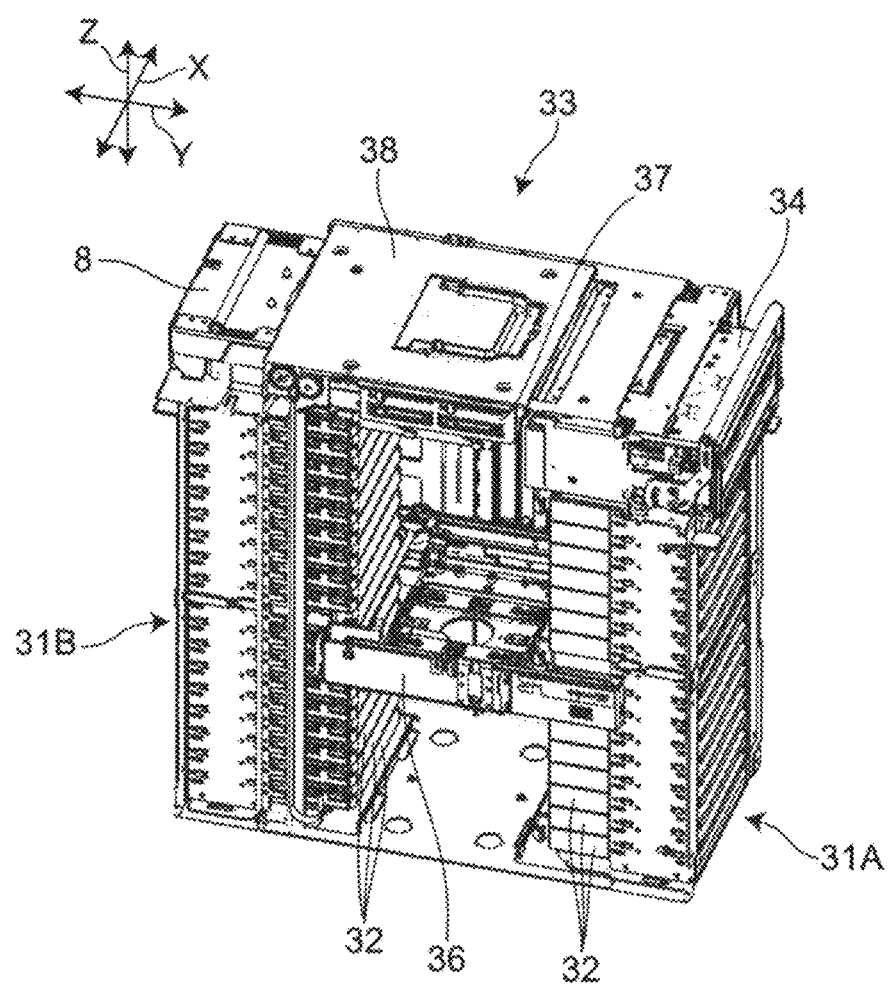
FIG. 7A is a perspective view illustrating a configuration of a changer unit included in the disc device of FIG. 5 and a disc transport operation.

The changer unit 33 includes the tray carrier 36 and the disc selector 37 as illustrated in FIG. 7A. The tray carrier 36 and the disc selector 37 are attached to a chassis 38 illustrated in FIG. 6. FIGS. 7A to 7H illustrate a state in which a front wall 38A of the chassis 38 illustrated in FIG. 6 is removed in order to easily illustrate an internal configuration of the changer unit 33.

Figure 7B:
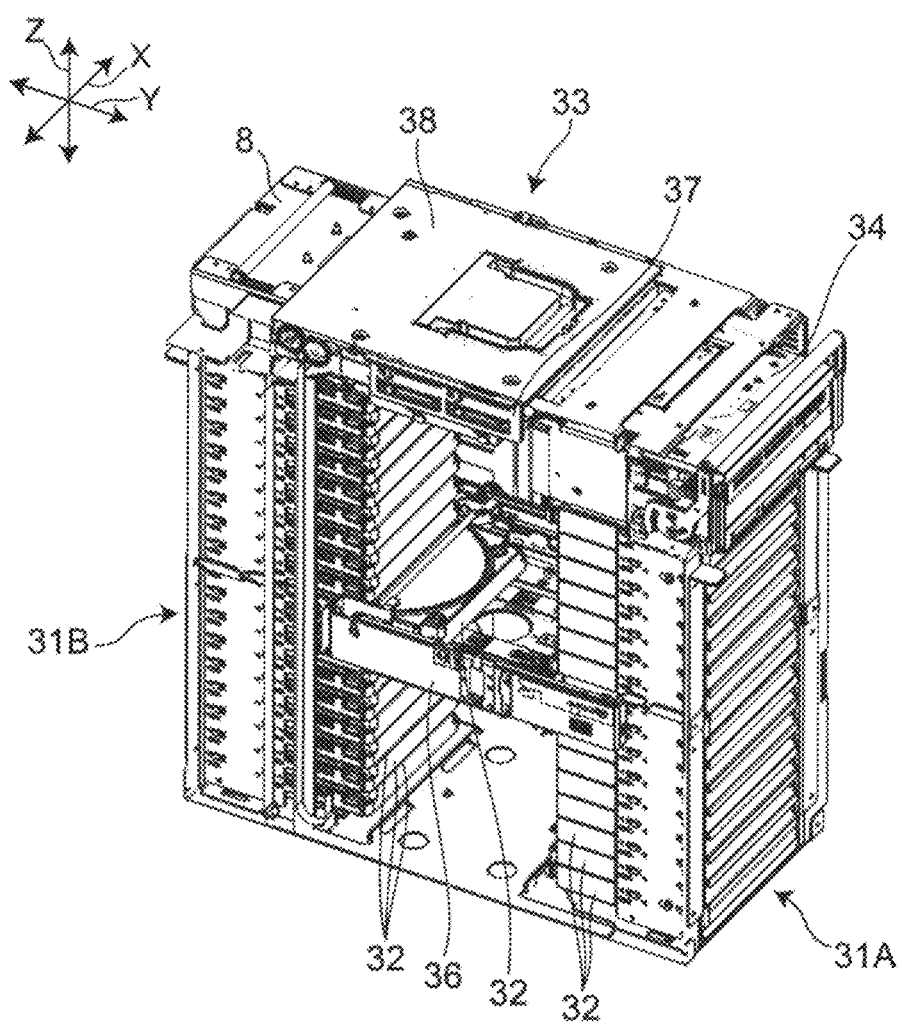
FIG. 7B is a perspective view illustrating the disc transport operation subsequent to FIG. 7A.
Figure 7C:
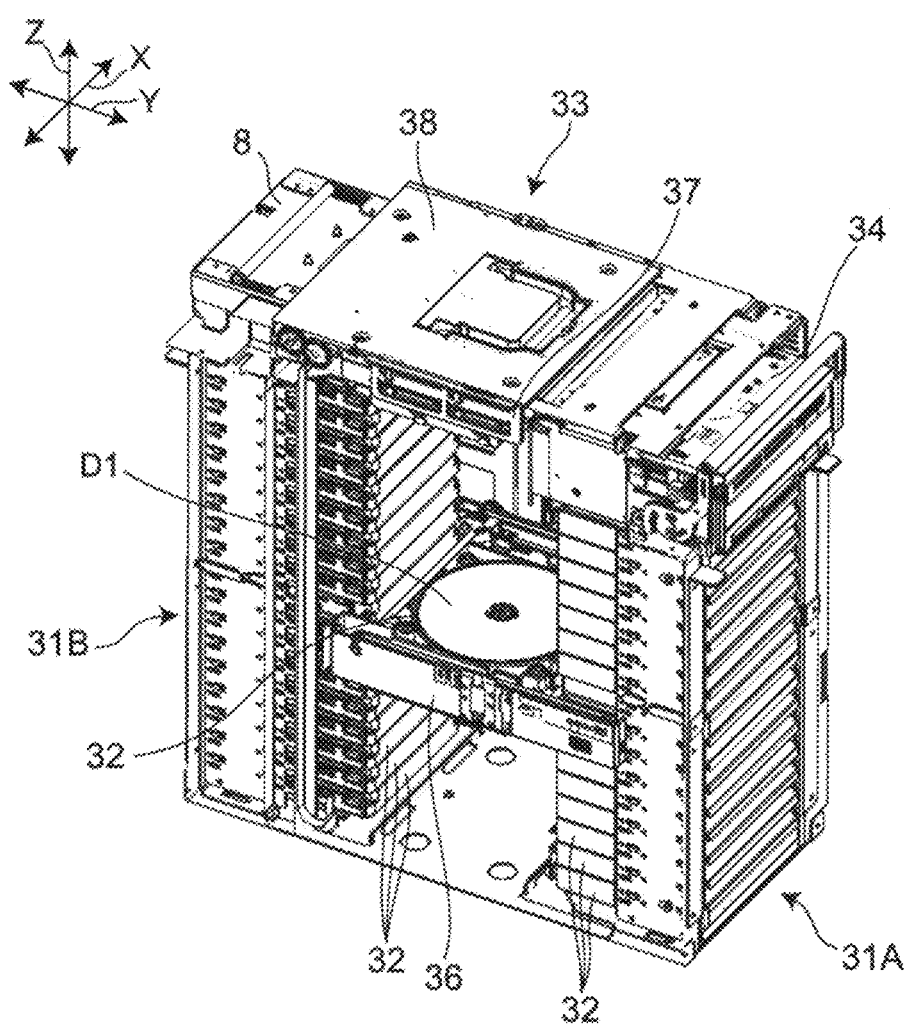
FIG. 7C is a perspective view illustrating the disc transport operation subsequent to FIG. 7B.
Figure 7D:
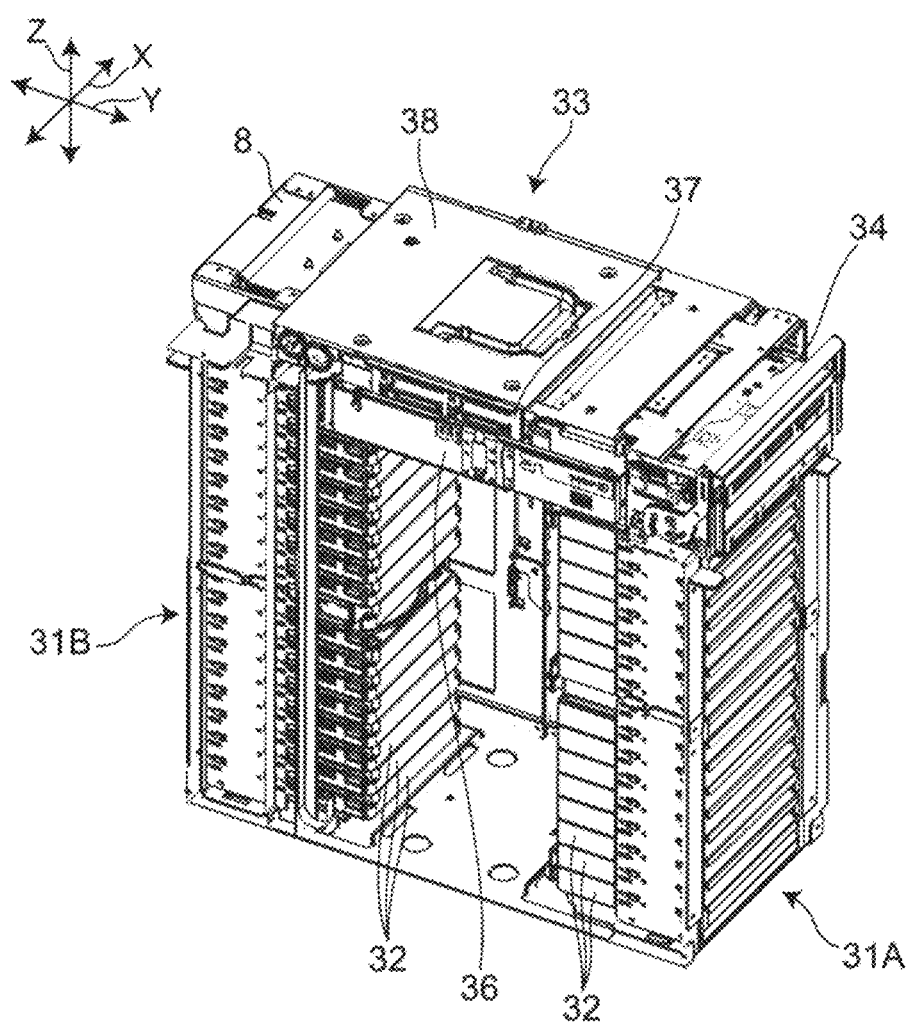
FIG. 7D is a perspective view illustrating the disc transport operation subsequent to FIG. 7C.

As illustrated in FIGS. 7B to 7D, the tray carrier 36 is configured to transport one disc tray 32 selected from the plurality of disc trays 32 to the vicinity of the drive unit 34. The tray carrier 36 is configured to store the disc tray 32 transported to the vicinity of the drive unit 34 at an original position (the tray stack 31A or the tray stack 31B). That is, the tray carrier 36 has the same function as a "picker" of the disc device of the related art.

In the embodiment, the tray carrier 36 is configured to move in the vertical direction Z. The tray carrier 36 is configured to enable the disc tray 32 is drawn in and out of the tray stack 31A or 31B by moving to a desired position of the disc tray 32.

The disc selector 37 is disposed in the vicinity of the drive unit 34, and is configured to supply one disc D1 from a plurality of discs D1 stored in the disc tray 32 to the drive unit 34. In the embodiment, as illustrated in FIG. 7E, the disc selector 37 is configured to hold the plurality of discs D1 stored in the disc tray 32 in the vicinity of the drive unit 34. When the disc selector 37 holds the plurality of discs D1, the tray carrier 36 descends, and is separated from the disc selector 37. Thereafter, as illustrated in FIG. 7F, a tray 34A is discharged from the drive unit 34 so as to be located below the disc selector 37.

Figure 7F:
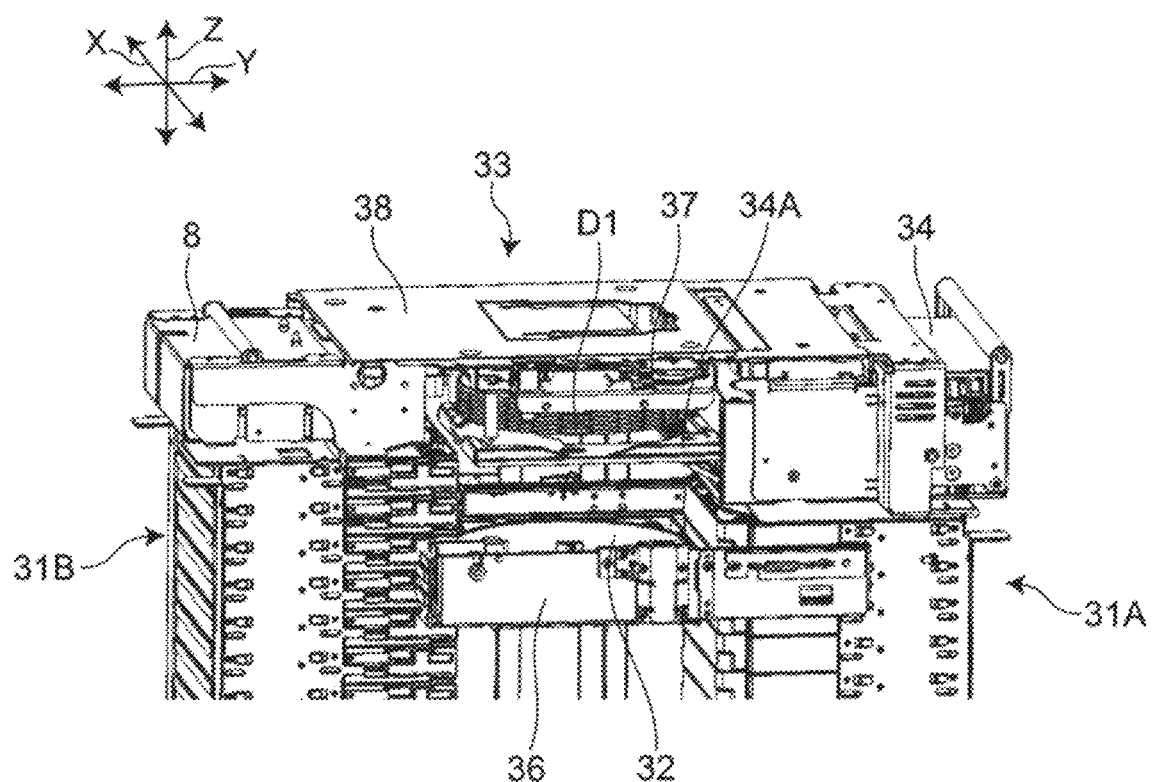
FIG. 7F is a perspective view illustrating the disc transport operation subsequent to FIG. 7E.
Figure 7G:
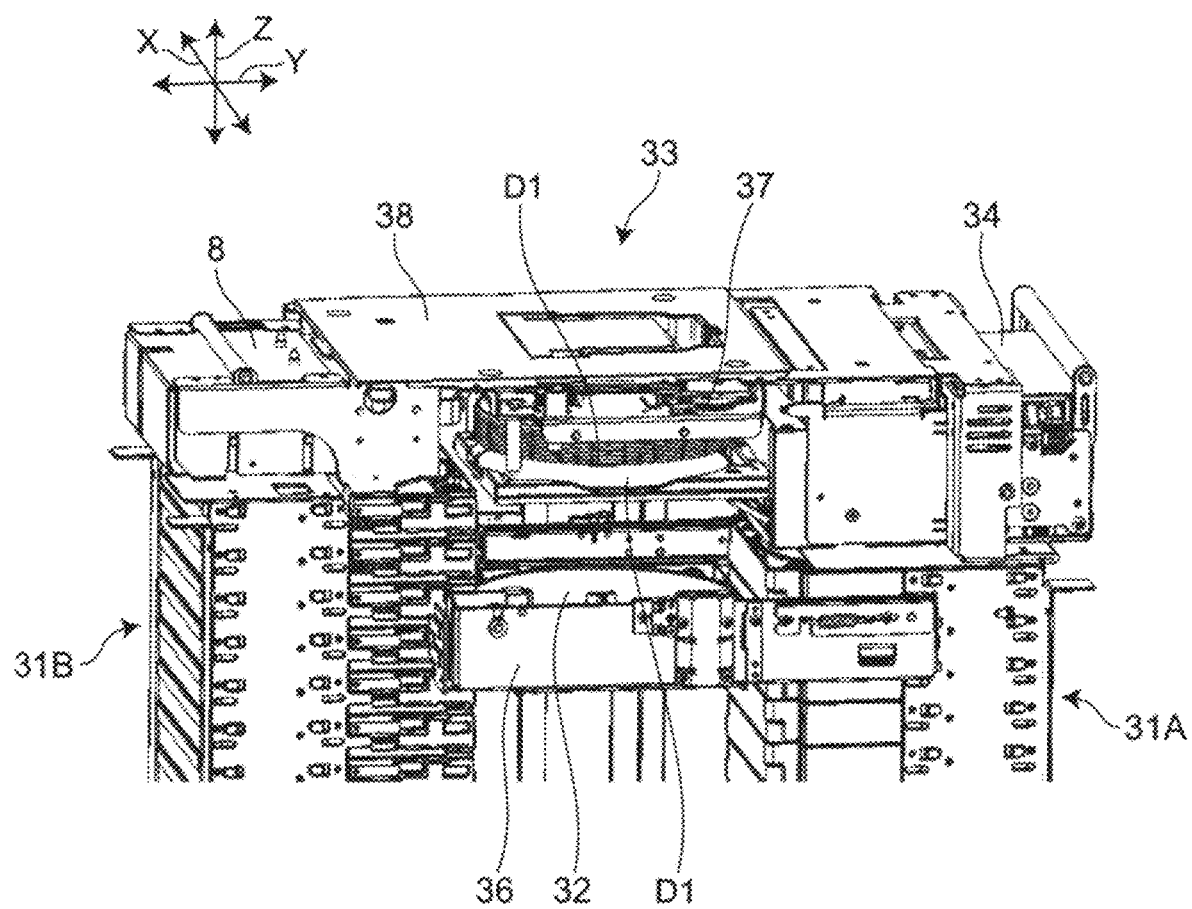
FIG. 7G is a perspective view illustrating the disc transport operation subsequent to FIG. 7F.
Figure 7H:
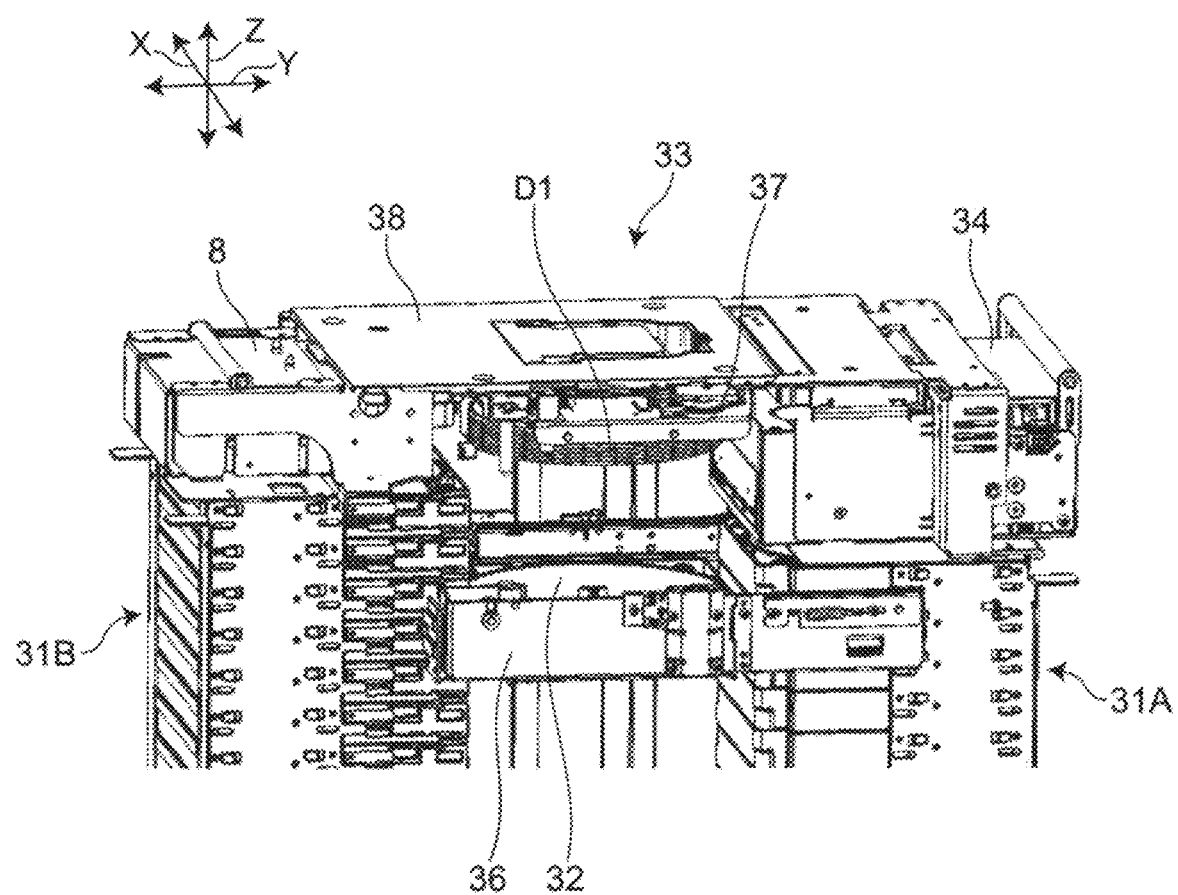
FIG. 7H is a perspective view illustrating the disc transport operation subsequent to FIG. 7G.

As illustrated in FIG. 7G, the disc selector 37 separates one disc D1 from the plurality of held discs D1, and supplies the separated disc D1 to the tray 34A of the drive unit 34. Thereafter, as illustrated in FIG. 7H, the tray 34A is transported into the drive unit 34, and thus, data can be recorded or reproduced on the disc D1.

As illustrated in FIG. 7F, the disc selector 37 is configured to hold the disc D1 on the tray 34A discharged from the drive unit 34 and return the disc D1 into the disc tray 32 by releasing the holding of the disc on the disc tray 32. That is, the disc selector 37 has the same function as a "carrier" of the disc device of the related art.

Next, a configuration of the disc tray 32 will be described in more detail.

Figure 8:
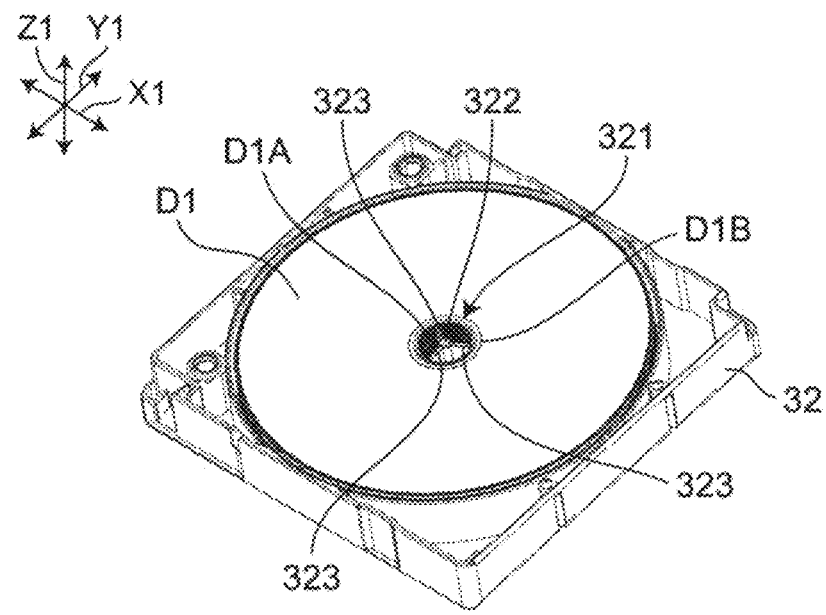
FIG. 8 is a perspective view illustrating a state in which a plurality of discs is stored in a disc tray in a stacked state.
Figure 9:
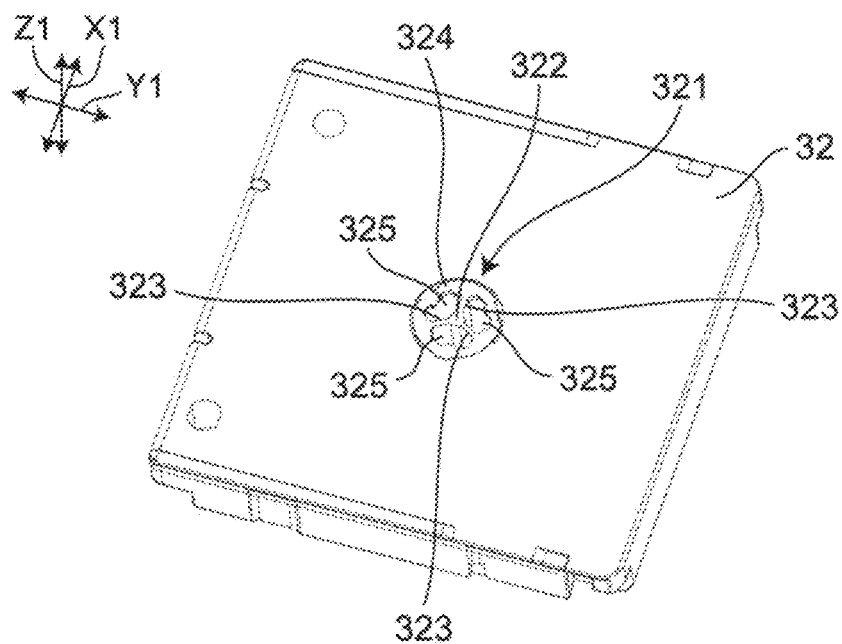
FIG. 9 is a perspective view of the disc tray when viewed obliquely from below.

FIG. 8 is a perspective view illustrating a state in which the plurality of discs D1 is stored in the disc tray 32 in a stacked state. FIG. 9 is a perspective view of the disc tray 32 when viewed obliquely from below. FIG. 10 is a plan view of the disc tray 32.

As illustrated in FIG. 8, a tray spindle (also referred to as a core rod) 321 that penetrates a center hole D1A formed in each of the plurality of discs D1 and regulates the movement of each disc D1 in a plane direction (X1 direction and Y1 direction) is provided at the disc tray 32.

The disc tray spindle 321 is made of a material such as polyacetal (POM) having high wear resistance and high slidability. The disc tray spindle 321 is configured to come in contact with an inner peripheral portion D1B of each disc D1 at three points. At least one of the disc tray spindle 321 and each disc D1 may be shaved due to the contact of the disc tray spindle with each disc, and a foreign substance (savings) can be prevented from being generated by such shaving. It is possible to suppress sliding resistance low while stably support the inner peripheral portion D1B of each disc D1. As a result, it is possible to more reliably push out the plurality of discs D1 from the disc tray 32.

In the embodiment, the disc tray spindle 321 includes a central shaft 322 extending in a thickness direction Z1 of the disc tray 32, and three side plates 323 that are connected to the central shaft 322 to come in contact with the inner peripheral portion D1B of each disc D1. In the embodiment, the central shaft 322 is formed in a columnar shape. Each side plate 323 is formed in a flat plate shape, and is connected along a side surface of the central shaft 322.

As illustrated in FIGS. 9 and 10, three side plates 323 are arranged at substantially equal angular intervals or at equal angular intervals about the central shaft 322 when viewed from the thickness direction Z1 of the disc tray 32. Specifically, three side plates 323 are arranged at intervals of 120 degrees around the central shaft 322. The disc tray spindle 321 comes in contact with the inner peripheral portion D1B of the disc D1 at three points by leading end portions of three side plates 323.

Figure 11A:
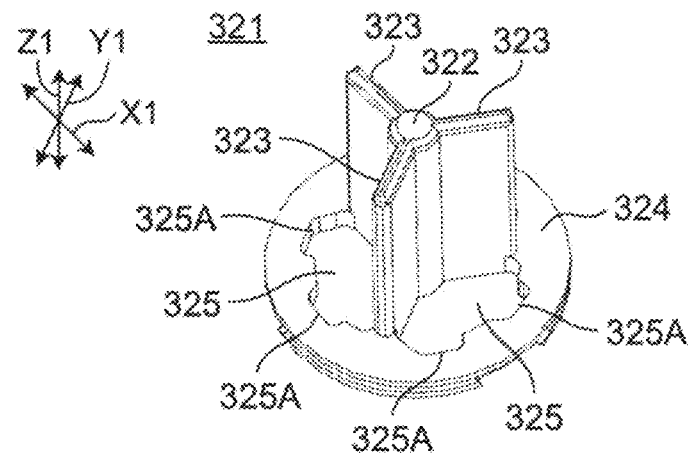
FIG. 11A is a perspective view of a disc tray spindle when viewed obliquely from above.
Figure 11B:
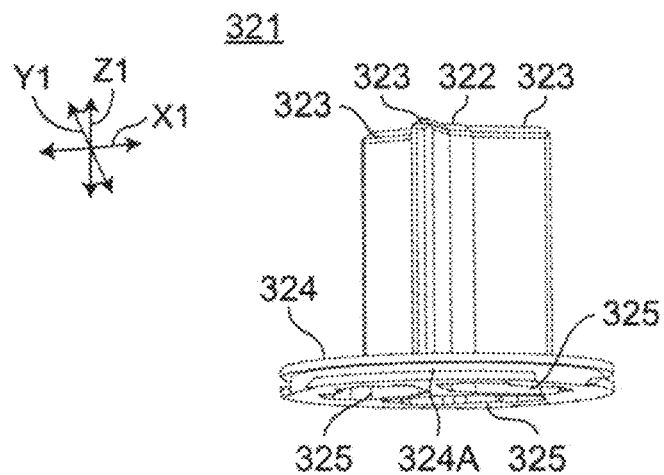
FIG. 11B is a perspective view of the disc tray spindle when viewed obliquely from below.
Figure 11C:
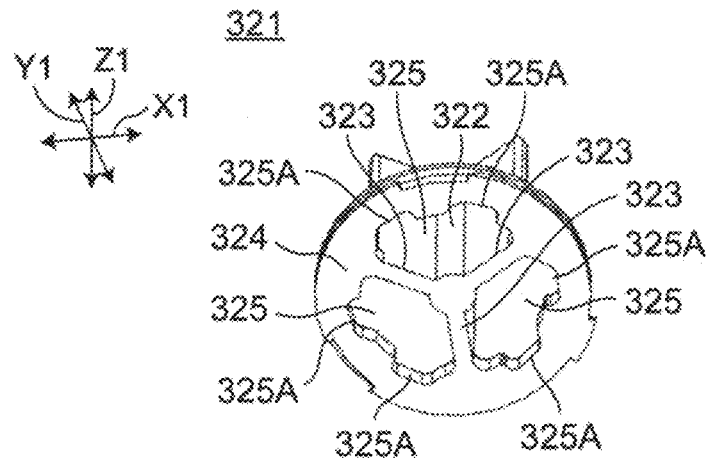
FIG. 11C is a perspective view of the disc tray spindle when viewed obliquely from below.

FIG. 11A is a perspective view of the disc tray spindle 321 when viewed obliquely from above. FIGS. 11B and 11C are perspective views of the disc tray spindle 321 when viewed from obliquely below.

As illustrated in FIGS. 11A to 11C, the disc tray spindle 321 includes a bottom plate 324 connected to lower end portions of three side plates 323. The bottom plate 324 has through-holes 325 in three regions sandwiched between any two side plates 323 of three side plates 323 when viewed from the thickness direction Z1 of the disc tray 32.

Each through-hole 325 is formed in a region located in the vicinity of an inner diameter of the disc D1 when viewed from the thickness direction Z1 of the disc tray 32. A recording region of the disc D1 is, for example, a region where data in a range of 40 mm to 118.5 mm from a center of the disc D1 is recorded. In FIG. 10, the recording region of the disc D1 is a region located outside a region surrounded by a dashed-dotted line. In the embodiment, a through-hole is not formed in the vicinity of the recording region of the disc D1 when viewed from the thickness direction Z1 of the disc tray 32. Accordingly, it is possible to prevent the foreign substance from entering the disc tray 32 and damaging the recording region of the disc D1.

Each through-hole 325 is formed in the whole or substantially the whole region (a region surrounded by a dotted line in FIG. 10) overlapping with the center hole D1A of the disc D1 when viewed from the thickness direction Z1 of the disc tray 32. Each through-hole 325 is formed so as to partially enter a region (in FIG. 10, a region between the region surrounded by the dotted line and a region (for example, a region located at 17.75 mm from the center of the disc D1) surrounded by a dashed double-dotted line) located in the vicinity of the inner diameter of the disc D1. In the embodiment, each through-hole 325 has two recesses 325A that enter the region located in the vicinity of the inner diameter of the disc D1. Each recess 325A has a shape corresponding to at least one of a first support claw 374B, a second support claw 375B, and a third support claw 375C which will be described below, and has a size with which these support claws can pass in a state in which these support claws are located at protrusion positions. In the embodiment, the first support claw 374B, the second support claw 375B, and the third support claw 375C have the same or substantially the same shape and size. Accordingly, an opening area is formed as small as possible, and the strength of the disc tray spindle 321 is improved.

The disc tray spindle 321 is attached by bayonet-coupling an outer peripheral portion of the bottom plate 324 to a wall forming a circular hole formed in a bottom wall of the disc tray 32.

Figure 12A:
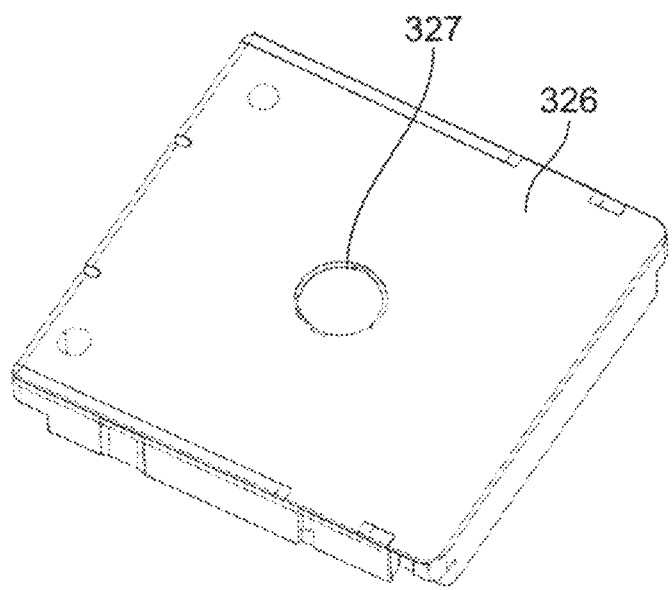
FIG. 12A is a perspective view of the disc tray before the disc tray spindle is attached when viewed from below.
Figure 12B:
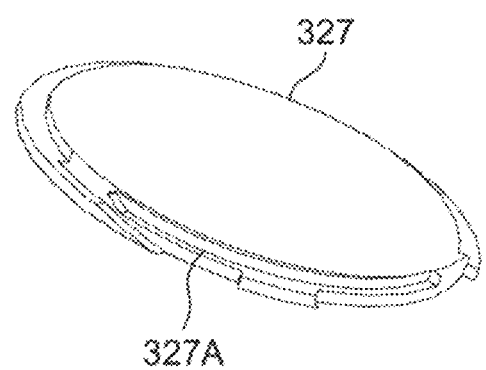
FIG. 12B is a partially enlarged perspective view of FIG. 12A.

FIG. 12A is a perspective view of the disc tray 32 before being attached to the disc tray spindle 321 when viewed from below, and FIG. 12B is a partially enlarged perspective view thereof.

As illustrated in FIG. 12A, a circular hole 327 is formed in a central portion of a bottom wall 326 of the disc tray 32. As illustrated in FIG. 12B, a bayonet protrusion 327A is formed on the wall forming the circular hole 327. As illustrated in FIG. 11B, a bayonet groove 324A corresponding to the bayonet protrusion 327A is formed in the bottom plate 324 of the disc tray spindle 321.

Figure 13A:
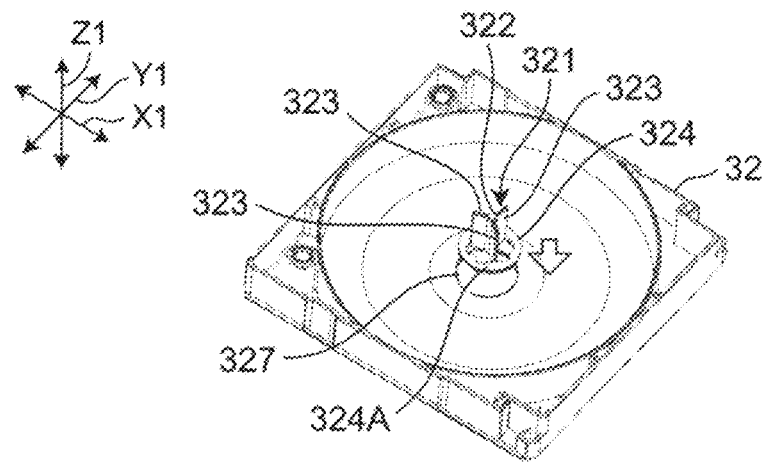
FIG. 13A is a perspective view illustrating a state in which the disc tray spindle is attached to a circular hole of the disc tray.
Figure 13B:
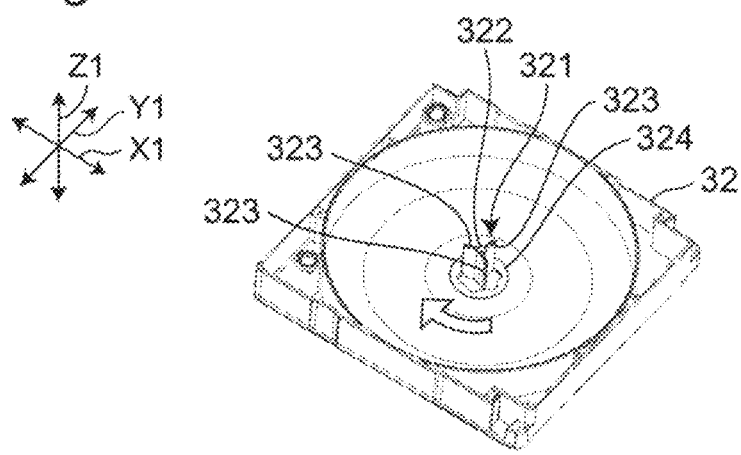
FIG. 13B is a perspective view illustrating a state in which the disc tray spindle is attached to the circular hole of the disc tray.
Figure 13C:
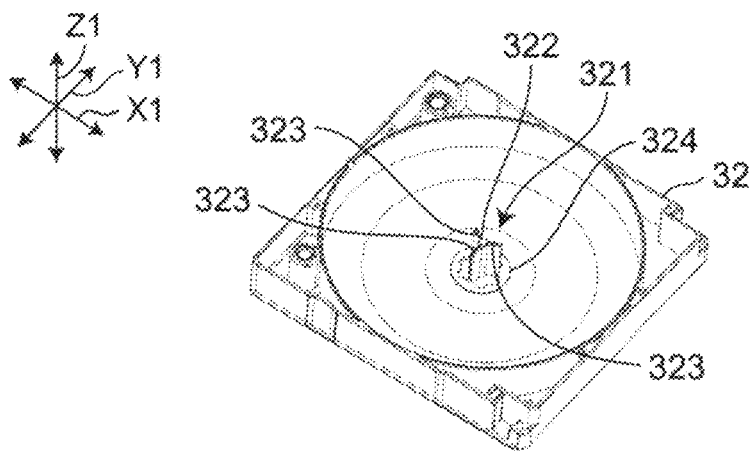
FIG. 13C is a perspective view illustrating a scene in which the disc tray spindle is attached to the circular hole of the disc tray.

FIGS. 13A to 13C are perspective views illustrating scenes in which the disc tray spindle 321 is attached to the circular hole 327 of the disc tray 32.

Initially, as illustrated in FIGS. 13A and 13B, the bottom plate 324 of the disc tray spindle 321 is inserted into the circular hole 327.

Subsequently, as illustrated in FIG. 13C, the bayonet protrusion 327A and the bayonet groove 324A are coupled by rotating the disc tray spindle 321 about the central shaft 322.

As stated above, the disc tray spindle 321 is bayonet-coupled to the circular hole 327 of the disc tray 32, and thus, it is possible to eliminate the necessity of separately providing a fastening member such as a screw. As a result, an increase in the number of components can be suppressed, and an increase in the thickness of the disc tray 32 can be suppressed.

Next, a configuration of the disc selector 37 will be described in more detail.

FIGS. 14A to 14D are perspective views illustrating scenes in which the disc selector 37 holds the plurality of discs D1 within the disc tray 32 transported by the tray carrier 36.

As illustrated in FIGS. 14A to 14D, the disc selector 37 includes a disc selector spindle 371 inserted into the center hole D1A formed in each of the plurality of discs D1. The disc selector spindle 371 is configured to hold the plurality of discs D1 in the stacked state, separate the lowermost disc from other discs, and supply the separated disc to the drive unit 34.

Figure 14A:
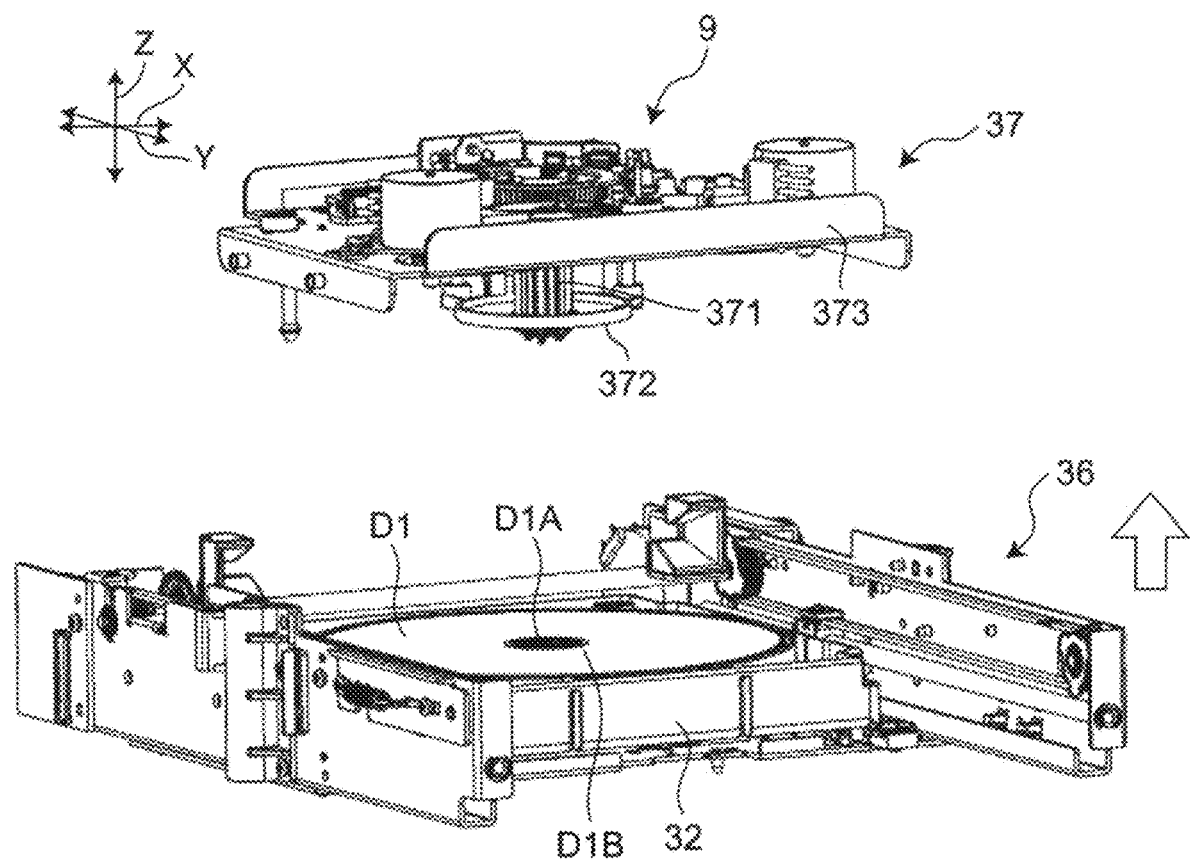
FIG. 14A is a perspective view illustrating a scene in which a tray carrier holds the plurality of discs within the disc tray transported by a disc selector.
Figure 14B:
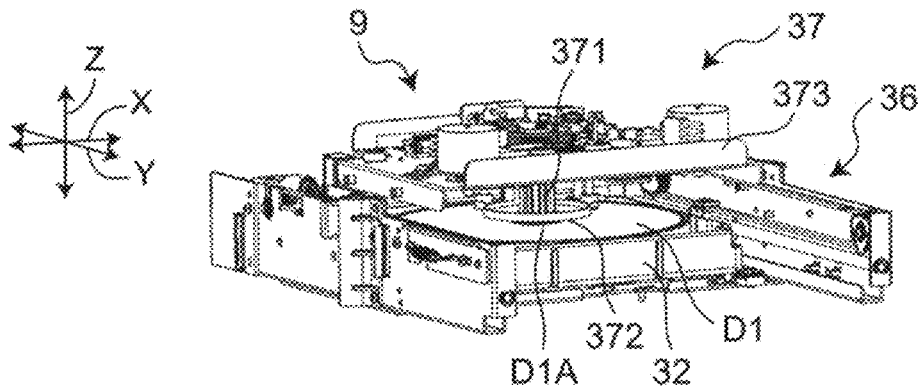
FIG. 14B illustrates a state in which the tray carrier ascends to a position at which the disc selector spindle holds the uppermost disc.
Figure 14C:
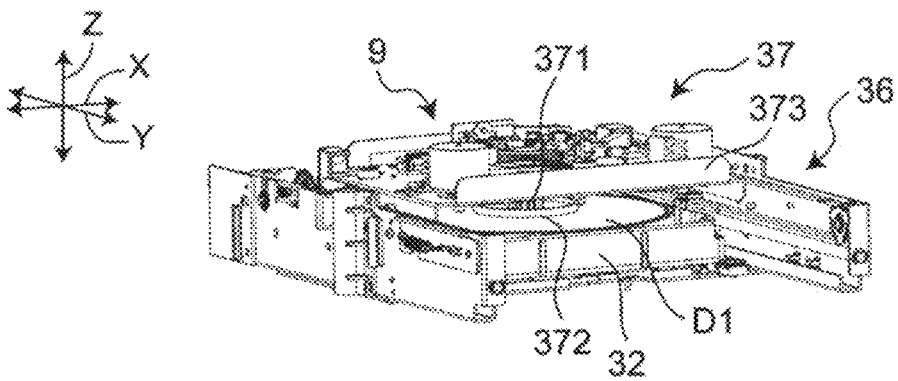
FIG. 14C illustrates a state in which the tray carrier ascends to a position at which the disc selector spindle holds six discs.
Figure 14D:
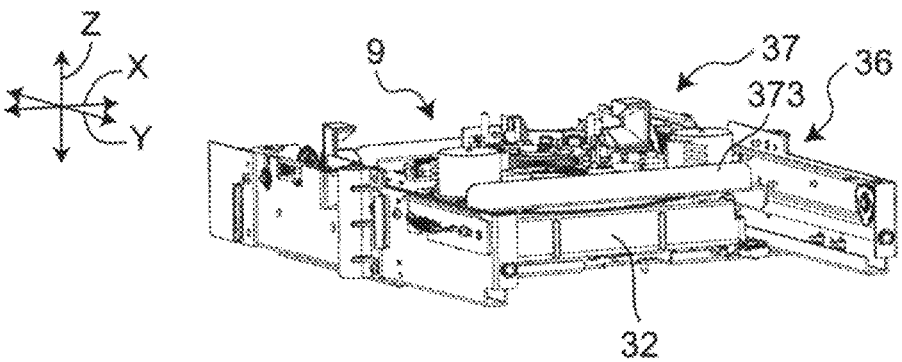
FIG. 14D illustrates a state in which the tray carrier ascends to a position at which the disc selector spindle holds all the discs.

In the embodiment, the disc selector spindle 371 is configured to hold any number of discs among the plurality of discs D1. FIG. 14B illustrates a state in which the tray carrier 36 ascends to a position at which the disc selector spindle 371 holds the uppermost disc. FIG. 14C illustrates a state in which the tray carrier 36 ascends to a position at which the disc selector spindle 371 holds six discs. FIG. 14D illustrates a state in which the tray carrier 36 ascends to a position at which the disc selector spindle 371 holds all (12) discs.

A disc-shaped disc press 372 is attached around the disc selector spindle 371 so as to be relatively movable in the vertical direction Z. The disc press 372 is urged downward by a conical coil spring (not illustrated). When the disc selector spindle 371 is inserted into the center hole D1A of each disc D1, the disc press 372 presses the disc D1 against the disc tray 32 by an urging force of the conical coil spring by coming in contact with a non-recording region on the inner peripheral portion of the disc D1. Accordingly, each disc D1 is prevented from rattling, and the disc selector spindle 371 is more reliably inserted into the center hole D1A of each disc D1.

The disc selector 37 includes a drive mechanism 9 that drives the disc selector spindle 371, and a chassis 373 that holds the drive mechanism 9.

Figure 15:
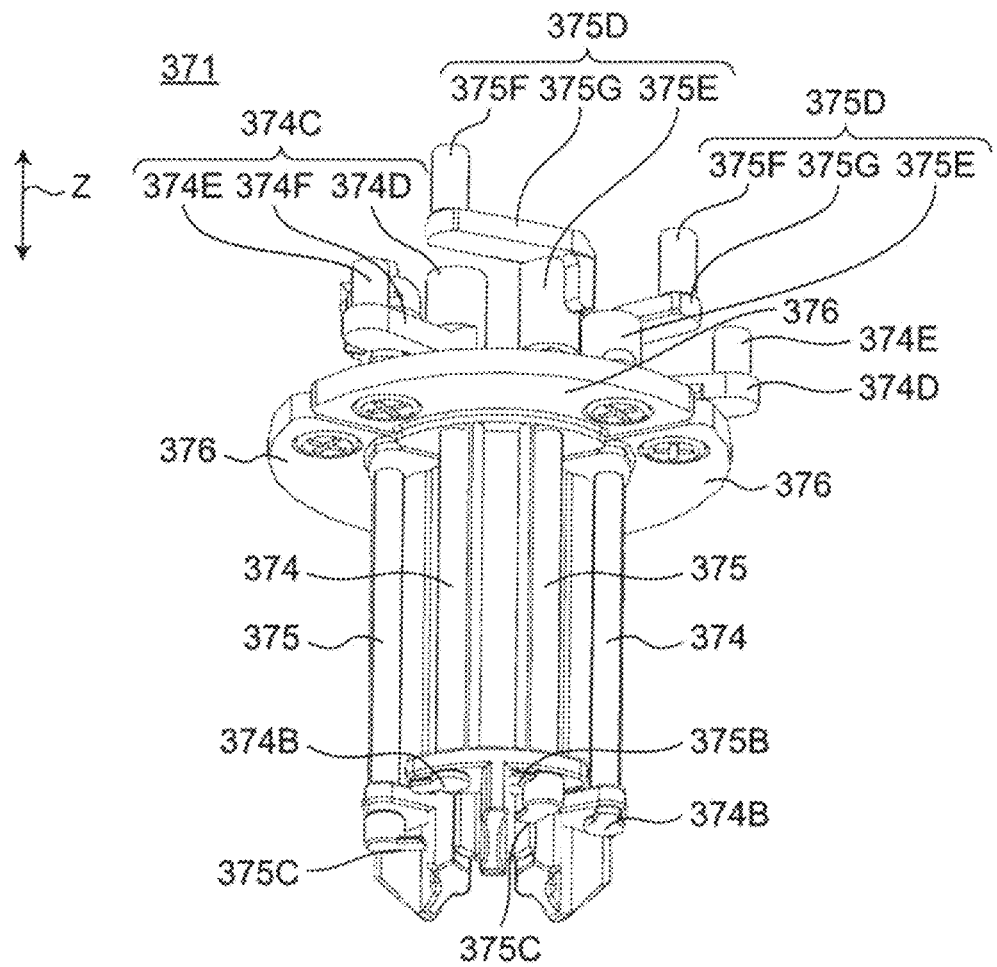
FIG. 15 is a perspective view of the disc selector spindle.
Figure 16:
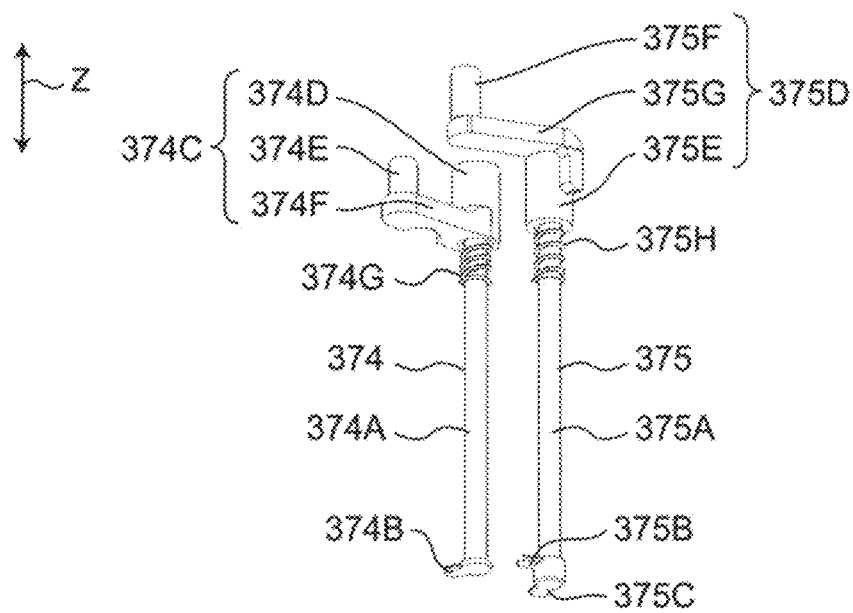
FIG. 16 is a perspective view of a select hook and a drop hook provided at the disc selector spindle.
Figure 17:
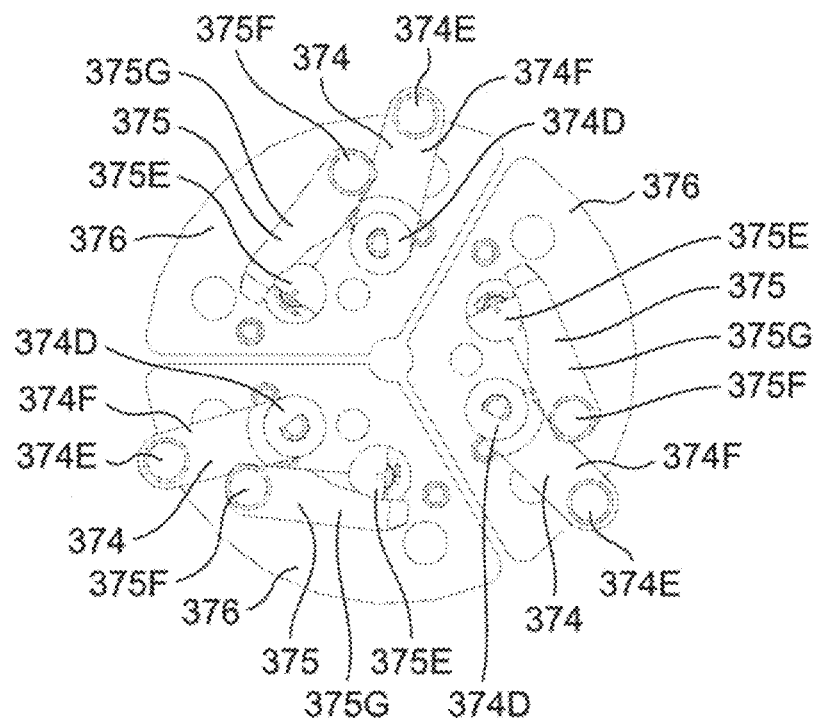
FIG. 17 is a top view of the disc selector spindle.
Figure 18:
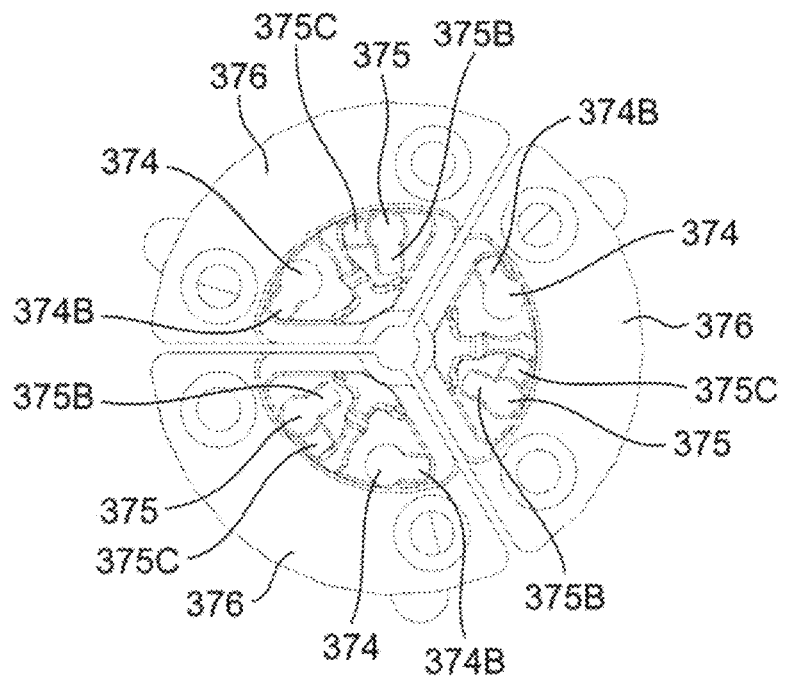
FIG. 18 is a bottom view of the disc selector spindle.

FIG. 15 is a perspective view of the disc selector spindle 371. FIG. 16 is a perspective view of a select hook 374 and a drop hook 375 of the disc selector spindle 371. FIG. 17 is a top view of the disc selector spindle 371. FIG. 18 is a bottom view of the disc selector spindle 371.

The disc selector spindle 371 includes a plurality of select hooks 374 and a plurality of drop hooks 375. In the embodiment, the disc selector spindle 371 includes three select hooks 374 and three drop hooks 375.

The select hooks 374 and the drop hooks 375 are attached so as to penetrate fixing plates 376. As illustrated in FIGS. 17 and 18, the fixing plate 376 is a fan-shaped plate member having a central angle of about 120 degrees, and is fixed to the chassis 373 by a fastening member such as a screw. Three fixing plates 376 are attached to the chassis 373 in a disc shape. One select hook 374 and one drop hook 375 are attached to one fixing plate 376. That is, three select hooks 374 and three drop hooks 375 are alternately arranged at intervals in a circumferential direction of the center hole D1A of the disc D1 in plan view.

The select hook 374 and the drop hook 375 attached to each fixing plate 376 are configured to pass through the through-hole 325 of the disc tray 32. In the embodiment, the select hook 374 and the drop hook 375 are configured to relatively move in the vertical direction Z which is a stacking direction of the disc D1.

The select hook 374 includes a first shaft 374A extending in the vertical direction Z which is the stacking direction of the disc D1, the first support claw 374B attached to a lower end portion of the first shaft 374A, and a selection lever 374C attached to an upper end portion of the first shaft 374A.

The first shaft 374A is a columnar member, and is attached to the fixing plate 376 so as to be rotatable around an axis.

The first support claw 374B is configured to move to a storage position at which the first support claw is stored inside the center hole D1A of the disc D1 (see, for example, FIG. 31A) and a protrusion position at which the first support claw protrudes in the region located in the vicinity of the inner diameter of the disc D1 (see, for example, FIG. 31C) in plan view. In the embodiment, the first support claw 374B is configured to move between the storage position and the protrusion position in conjunction with the rotation operation of the first shaft 374A around an axis. The first support claw 374B is configured to pass through the recess 325A of the through-hole 325 of the disc tray 32 in a state in which the first support claw is located at the protrusion position.

The selection lever 374C includes a fixing pin 374D and an engagement pin 374E extending in the vertical direction Z, and a connection bar 374F that connects the fixing pin 374D and the engagement pin 374E. The fixing pin 374D and the engagement pin 374E are columnar members each having a diameter larger than a diameter of the first shaft 374A. The fixing pin 374D is disposed coaxially with the first shaft 374A, and is formed to protrude upward from the connection bar 374F. The engagement pin 374E is arranged at a position shifted laterally with respect to the first shaft 374A, and is formed to protrude upward from the connection bar 374F.

As illustrated in FIG. 16, a coil spring 374G is provided around the first shaft 374A. The coil spring 374G is disposed between the chassis 373 and the selection lever 374C so as to urge the selection lever 374C upward of the chassis 373.

The drop hook 375 has a second shaft 375A extending in the vertical direction Z which is the stacking direction of the disc D1, a second support claw 375B and a third support claw 375C attached to a lower end portion of the second shaft 375A, and a separation lever 375D attached to an upper end portion of the second shaft 375A.

The second shaft 375A is a columnar member, and is attached to the fixing plate 376 so as to be rotatable around an axis.

The second support claw 375B is configured to move to a storage position at which the second support claw is stored inside the center hole D1A of the disc D1 (see, for example, FIG. 31A) and a protrusion position at which the second support claw protrudes in the region located in the vicinity of the inner diameter of the disc D1 (see, for example, FIG. 31C) in plan view. The third support claw 375C is configured to move to a storage position at which the third support claw is stored inside the center hole D1A of the disc D1 (see, for example, FIG. 31A) and a protrusion position at which the third support claw protrudes in the region located in the vicinity of the inner diameter of the disc D1 (see, for example, FIG. 33B) in plan view. In the embodiment, the second support claw 375B and the third support claw 375C are configured to move to one storage position and one protrusion position in conjunction with the rotation operation of the second shaft 375A around an axis. The first support claw 374B, the second support claw 375B, and the third support claw 375C are configured to move to the storage position and the protrusion position independently of each other.

The second support claw 375B is disposed so as to be shifted from the third support claw 375C by the thickness of one disc D1 in the vertical direction Z which is the stacking direction of the disc D1. In the embodiment, the second support claw 375B is disposed so as to be shifted upward from the third support claw 375C by the thickness of one disc D1.

A timing when the second support claw 375B moves to the protrusion position from the storage position is different from a timing when the third support claw 375C moves to the protrusion position from the storage position. In the embodiment, the second support claw 375B is provided at a position shifted by a predetermined angle (for example, 90 degrees) with respect to the third support claw 375C when viewed from the vertical direction Z. The second support claw 375B and the third support claw 375C are configured to pass through the recess 325A of the through-hole 325 of the disc tray 32 in a state in which the second and third support claws are located at the protrusion positions.

The separation lever 375D includes a columnar contact pin 375E and a columnar engagement pin 375F extending in the vertical direction Z, and a connection bar 375G that connects the contact pin 375E and the engagement pin 375F. The contact pin 375E is disposed coaxially with the second shaft 375A, and is formed to protrude upward and downward from the connection bar 375G. The engagement pin 375F is disposed at a position shifted laterally with respect to the second shaft 375A, and is formed to protrude upward from the connection bar 375G.

As illustrated in FIG. 16, a coil spring 375H is provided around the second shaft 375A. The coil spring 375H is disposed between the chassis 373 and the separation lever 375D so as to urge the separation lever 375D upward of the chassis 373.

Figure 19:
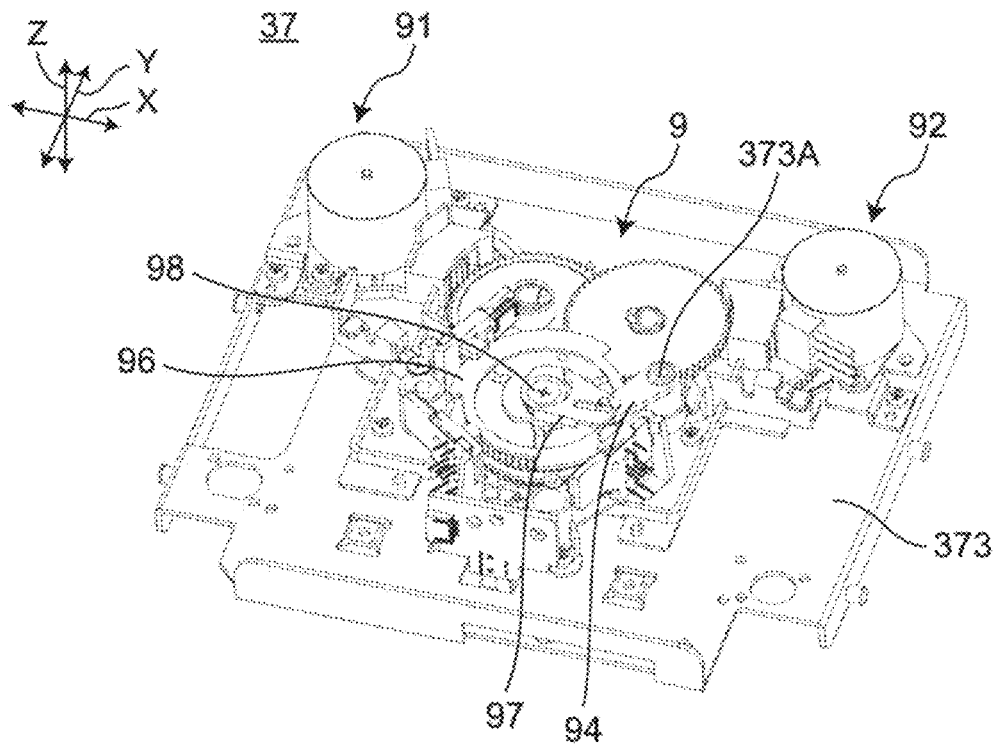
FIG. 19 is a perspective view of the disc selector when viewed obliquely from above.
Figure 20:
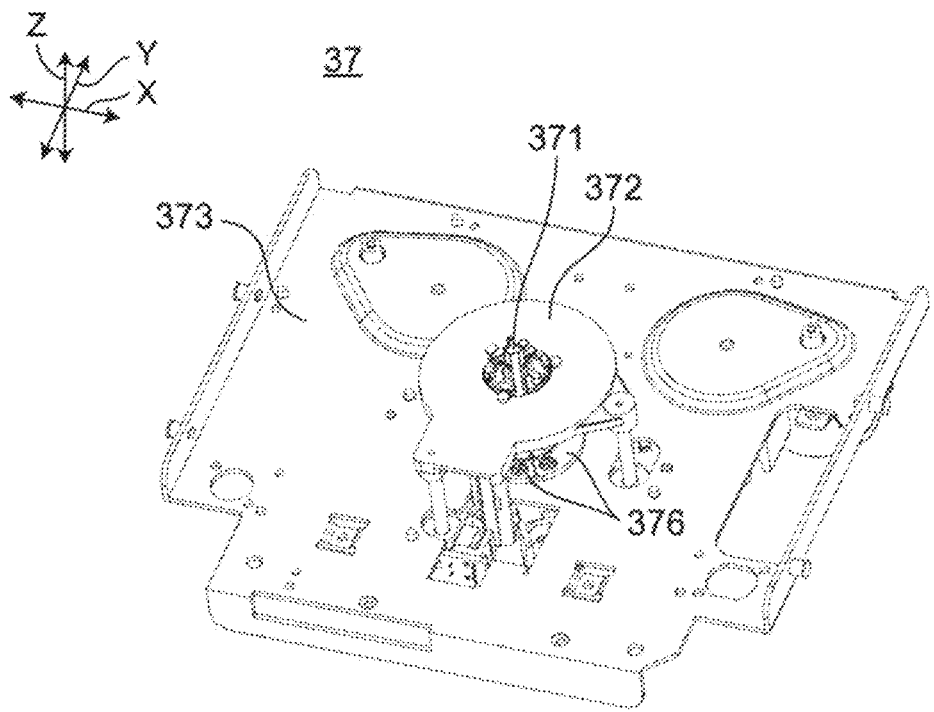
FIG. 20 is a perspective view of the disc selector when viewed obliquely from below.
Figure 21:
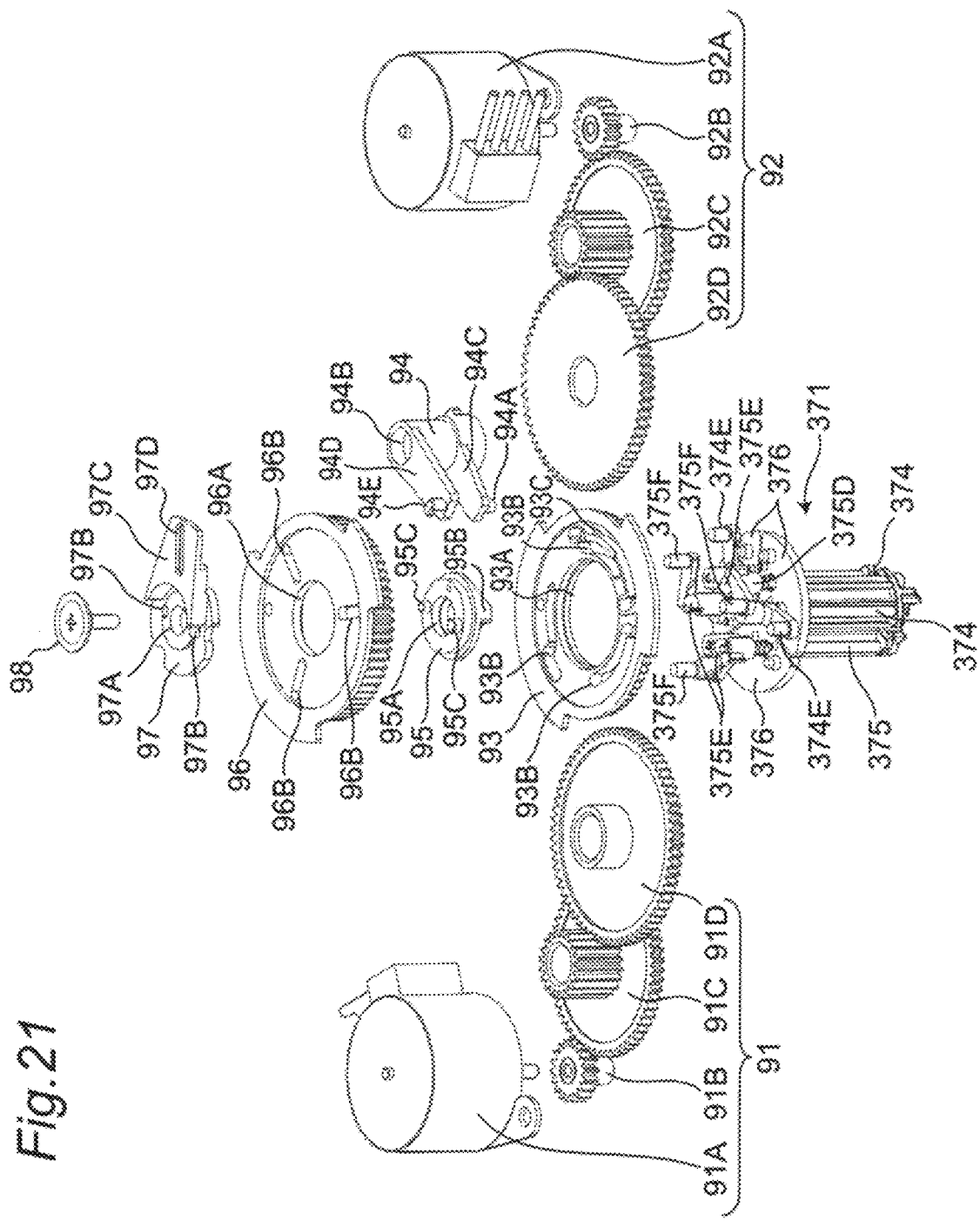
FIG. 21 is an exploded perspective view illustrating a configuration of a drive mechanism that drives the disc selector spindle.
Figure 22:
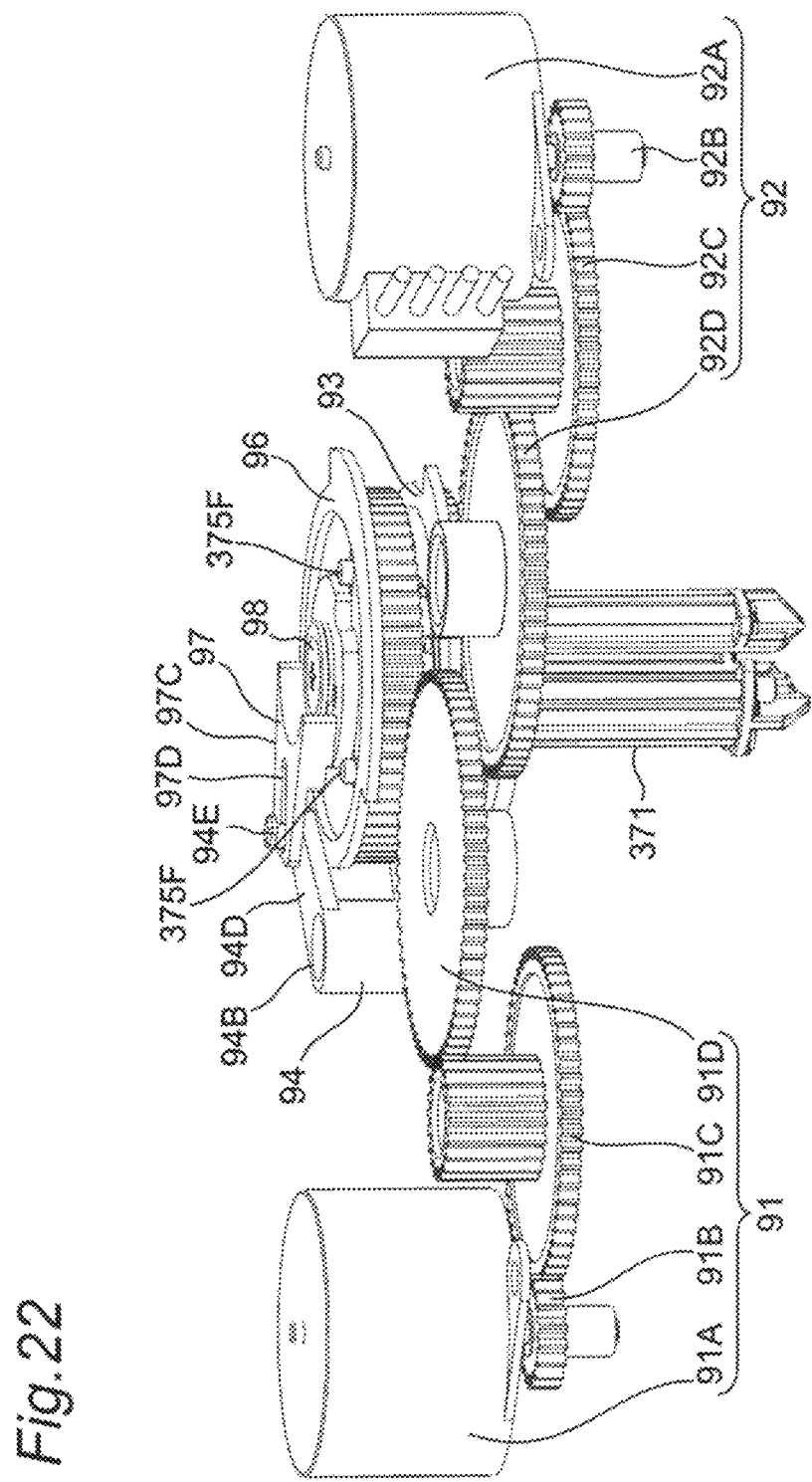
FIG. 22 is an assembled perspective view of the drive mechanism of FIG. 21 when viewed from the back.

FIG. 19 is a perspective view of the disc selector 37 as viewed obliquely from above. FIG. 20 is a perspective view of the disc selector 37 as viewed obliquely from below. FIG. 21 is an exploded perspective view illustrating a configuration of the drive mechanism 9 that drives the disc selector spindle 371. FIG. 22 is an assembled perspective view of the drive mechanism 9 of FIG. 21 when viewed from the back.

As illustrated in FIG. 19, the drive mechanism 9 is attached on an upper surface of the chassis 373. As illustrated in FIGS. 21 and 22, the drive mechanism 9 includes a select hook drive unit 91, a drop hook drive unit 92, a selection cam gear 93, a link lever 94, a pressing cam 95, a separation cam gear 96, a drive lever 97 and a fixing screw 98.

The select hook drive unit 91 includes a selection motor 91A, a motor gear 91B, a reduction gear 91C, and a relay gear 91D.

The selection motor 91A is a motor that generates a rotational driving force for rotating the selection cam gear 93. The motor gear 91B is fixed to an output shaft of the selection motor 91A, and meshes with the reduction gear 91C. The reduction gear 91C meshes with the relay gear 91D. The relay gear 91D meshes with the selection cam gear 93. The rotational driving force generated from the selection motor 91A is transmitted to the selection cam gear 93 via the motor gear 91B, the reduction gear 91C, and the relay gear 91D, and thus, the selection cam gear 93 rotates. The driving of the selection motor 91A is controlled by the control unit 7.

The drop hook drive unit 92 includes a separation motor 92A, a motor gear 92B, a reduction gear 92C, and a relay gear 92D.

The separation motor 92A is a motor that generates a rotational driving force for rotating the separation cam gear 96. The motor gear 92B is fixed to an output shaft of the separation motor 92A, and meshes with the reduction gear 92C. The reduction gear 92C meshes with the relay gear 92D. The relay gear 92D meshes with the separation cam gear 96. The rotational driving force generated from the separation motor 92A is transmitted to the separation cam gear 96 via the motor gear 92B, the reduction gear 92C, and the relay gear 92D, and thus, the separation cam gear 96 rotates. The driving of the separation motor 92A is controlled by the control unit 7.

A center hole 93A penetrating in the vertical direction Z is formed in a central portion of the selection cam gear 93. Three cam grooves 93B with which the engagement pins 374E of the select hooks 374 can be engaged are formed around the center hole 93A of the selection cam gear 93. Each cam groove 93B is formed so as to extend substantially in a circumferential direction of the selection cam gear 93. The selection cam gear 93 is rotated by the driving of the selection motor 91A, and thus, each engagement pin 374E relatively moves along the corresponding cam groove 93B.

A cam groove 93C with which the engagement pin 94A provided at the link lever 94 can be engaged is formed in the selection cam gear 93. As illustrated in FIG. 19, the link lever 94 includes a cylindrical bearing 94B that is inserted into a columnar shaft 373A that protrudes upward from the upper surface of the chassis 373 on the side of the selection cam gear 93. The link lever 94 is attached to the chassis 373 so as to be rotatable about the shaft 373A by inserting the bearing 94B into the shaft 373A. The selection cam gear 93 is rotated by the driving of the selection motor 91A, and thus, the engagement pin 94A relatively moves along the cam groove 93C. The selection cam gear 93 further rotates in a state in which the engagement pin 94A reaches an end portion of the cam groove 93C, and thus, the link lever 94 rotates about the shaft 373A.

The link lever 94 includes a lower connection plate 94C and an upper connection plate 94D so as to extend laterally from a side surface of the bearing 94B. The lower connection plate 94C and the upper connection plate 94D are formed so as to face each other in the vertical direction Z with the separation cam gear 96 interposed therebetween. The engagement pin 94A is provided so as to protrude downward from a leading end portion of the lower connection plate 94C. A hook 94E that protrudes upward is provided at a leading end portion of the upper connection plate 94D.

The pressing cam 95 is provided within the center hole 93A of the selection cam gear 93. A center hole 95A penetrating in the vertical direction Z is provided in a central portion of the pressing cam 95. An inclination 95B capable of vertically moving the drop hook 375 by coming in contact with the contact pin 375E of the drop hook 375 at the time of rotating about the center hole 95A is formed on a lower surface of the pressing cam 95. The inclination 95B is formed so as to be inclined downward from an upstream side to a downstream side in a rotation direction. A pair of bosses 95C are formed on an upper surface of the pressing cam 95 so as to protrude upward at positions facing each other via the center hole 95A.

Three cam grooves 96B with which the engagement pins 375F of the drop hooks 375 can be engaged are formed around a center hole 96A of the separation cam gear 96. Each cam groove 96B is formed substantially along a radial direction of the separation cam gear 96. The separation cam gear 96 is rotated by the driving of the separation motor 92A, and thus, each engagement pin 375F relatively moves along the corresponding cam groove 96B.

The drive lever 97 is attached to the pressing cam 95 through the center hole 96A of the separation cam gear 96 so as to rotate integrally with the pressing cam 95. A center hole 97A penetrating in the vertical direction is formed in a central portion of the drive lever 97. A fixing screw 98 is screwed into the center hole 97A and the center hole 95A. Fitting holes 97B into which the pair of bosses 95C of the pressing cam 95 are fitted are formed in the drive lever 97. Accordingly, the drive lever 97 and the pressing cam 95 rotate integrally.

The drive lever 97 includes a protrusion plate 97C that protrudes laterally. A cam groove 97D with which the hook 94E of the link lever 94 is engaged is formed in the protrusion plate 97C. When the link lever 94 rotates around the shaft 373A, the hook 94E slides within the cam groove 97D, and the drive lever 97 is configured to rotate around the center hole 97A in a reverse direction of the link lever 94.

FIGS. 23A to 23F are perspective views illustrating positional relationships between the first support claw 374B of the select hook 374 and the second support claw 375B and the third support claw 375C of the drop hook 375 which can be obtained by driving the selection motor 91A and the separation motor 92A.

As illustrated in FIGS. 23A to 23F, the first support claw 374B, the second support claw 375B, and the third support claw 375C can have at least six different positional relationships by driving the selection motor 91A and the separation motor 92A. These positional relationships will be described in more detail below.

Figure 24A:
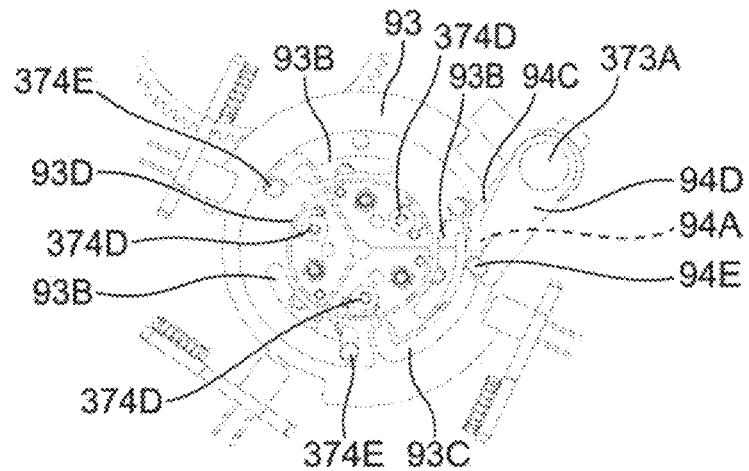
FIG. 24A is a plan view illustrating a positional relationship between a selection cam gear, an engagement pin of the select hook, and a link lever at an initial position.
Figure 24B:
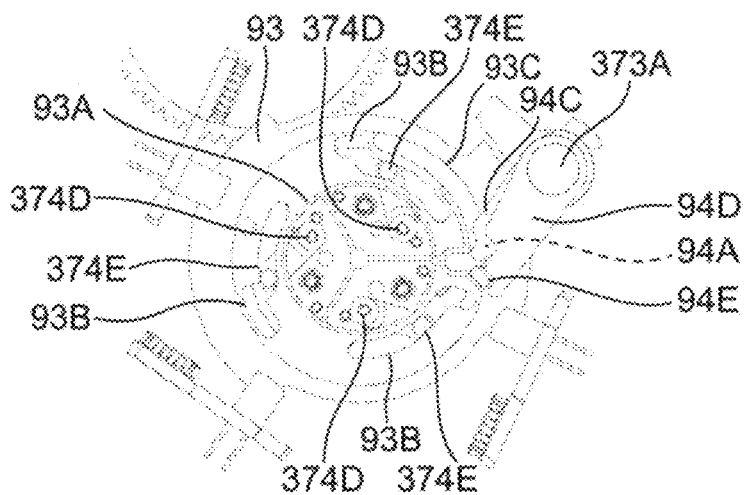
FIG. 24B is a plan view illustrating a positional relationship between the selection cam gear, the engagement pin of the select hook, and the link lever when the selection motor is driven.
Figure 24C:
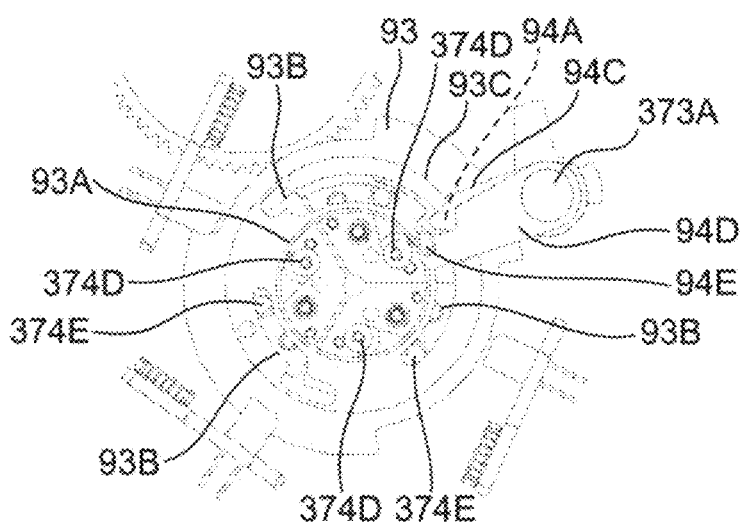
FIG. 24C is a plan view illustrating a positional relationship between the selection cam gear, the engagement pin of the select hook, and the link lever when the selection motor is further driven.
Figure 25A:
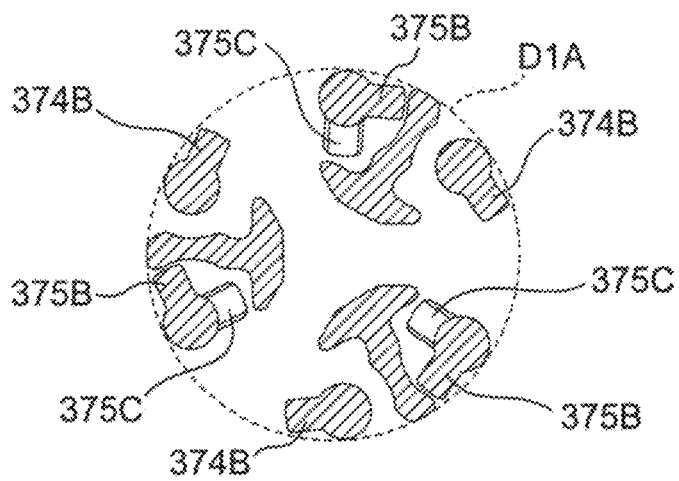
FIG. 25A is a plan view illustrating a positional relationship between the first support claw of the select hook and the second support claw and the third support claw of the drop hook at an initial position.
Figure 25B:
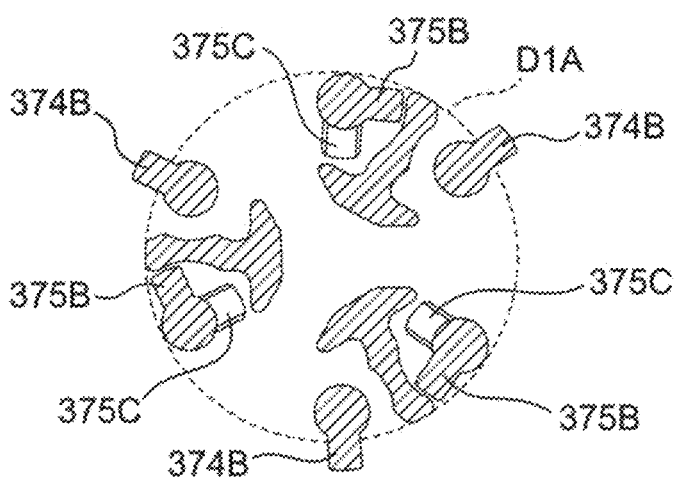
FIG. 25B is a plan view illustrating a positional relationship between the first support claw of the select hook and the second support claw and the third support claw of the drop hook when the selection motor is driven.
Figure 25C:
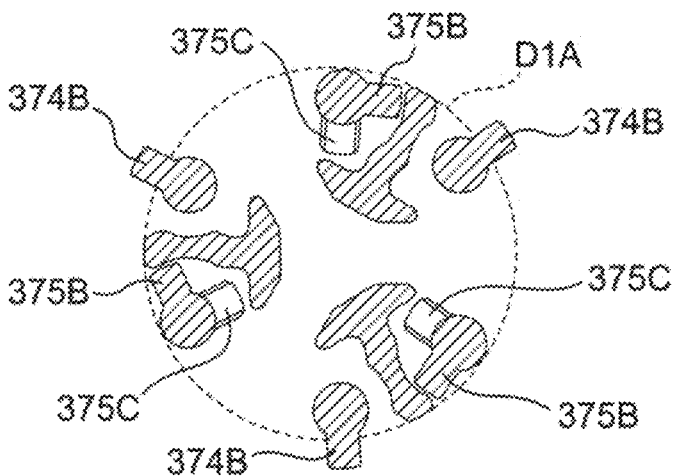
FIG. 25C is a plan view illustrating a positional relationship between the first support claw of the select hook and the second support claw and the third support claw of the drop hook when the selection motor is further driven.

FIGS. 24A to 24C are plan views illustrating positional relationships between the selection cam gear 93, the engagement pin 374E of the select hook 374, and the link lever 94 when the selection motor 91A is driven. FIGS. 25A to 25C are plan views illustrating the positional relationships between the first support claw 374B of the select hook 374 and the second support claw 375B and the third support claw 375C of the drop hook 375 when the selection motor 91A is driven.

Figure 23A:
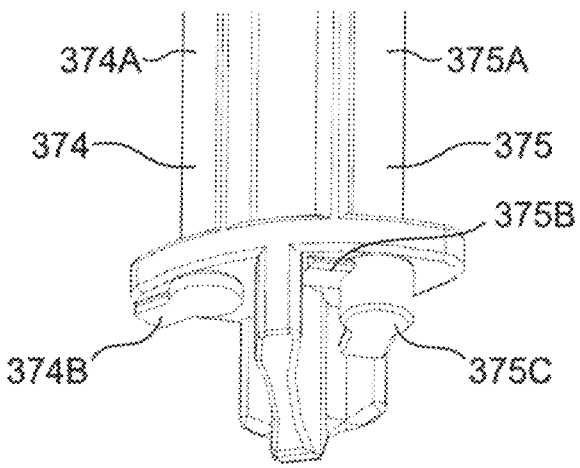
FIG. 23A is a perspective view illustrating a positional relationship between a first support claw of the select hook and a second support claw and a third support claw of the drop hook which can be obtained by driving a selection motor and a separation motor.

As illustrated in FIG. 24A, at an initial position, each engagement pin 374E of the select hook 374 is located at one end portion of the corresponding cam groove 93B of the selection cam gear 93. The engagement pin 94A of the link lever 94 is located at one end portion of the cam groove 93C. As illustrated in FIGS. 25A and 23A, at the initial position, the first support claw 374B of the select hook 374 and the second support claw 375B and the third support claw 375C of the drop hook 375 are located at the storage position at which these support claws are stored inside the center hole D1A of the disc D1.

Figure 23B:
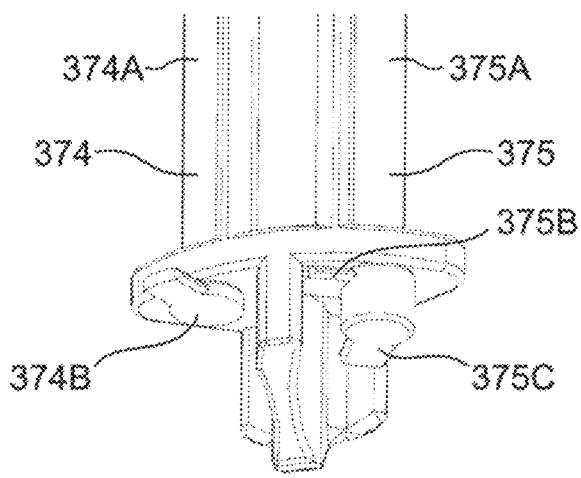
FIG. 23B is a perspective view illustrating a positional relationship between the first support claw of the select hook and the second support claw and the third support claw of the drop hook which can be obtained by driving the selection motor and the separation motor.

When the selection motor 91A is driven from the state illustrated in FIG. 24A, the selection cam gear 93 rotates in a reverse direction as illustrated in FIG. 24B (counterclockwise in FIG. 24B). Accordingly, each engagement pin 374E of the select hook 374 moves from one end portion of the corresponding cam groove 93B of the selection cam gear 93 to the other end portion. At this time, the selection lever 374C of the select hook 374 rotates in a reverse direction (counterclockwise in FIG. 24B) about the fixing pin 374D, and the first shaft 374A (see FIG. 16) to which the fixing pin 374D is connected rotates around the axis. As illustrated in FIGS. 25B and 23B, the first support claw 374B of the select hook 374 moves to the protrusion positions outside the center hole D1A of the disc D1 in conjunction with the rotation operation of the first shaft 374A.

When the selection cam gear 93 rotates in a forward direction as illustrated in FIG. 24B, the engagement pin 94A of the link lever 94 moves from one end portion of the cam groove 93C to the other end portion. At this time, the cam groove 93C is formed such that the link lever 94 does not rotate.

When the selection motor 91A is further driven from the state illustrated in FIG. 24B, the selection cam gear 93 further rotates in the forward direction as illustrated in FIG. 24C. Accordingly, each engagement pin 374E of the select hook 374 moves to the other end portion of the corresponding cam groove 93B of the selection cam gear 93. At this time, the selection lever 374C of the select hook 374 does not rotate, and a state in which the first support claw 374B of the select hook 374 is located at the protrusion position is maintained as illustrated in FIGS. 25C and 23B.

When the selection cam gear 93 further rotates in the forward direction as illustrated in FIG. 24C, the link lever 94 moves to the other end portion of the cam groove 93C, and rotates about the shaft 373A in the forward direction. As will be described below, the drive lever 97 and the pressing cam 95 rotate in a reverse direction in conjunction with the rotation of the link lever 94, and the drop hook 375 is pushed down against an urging force of the coil spring 375H.

Figure 26A:
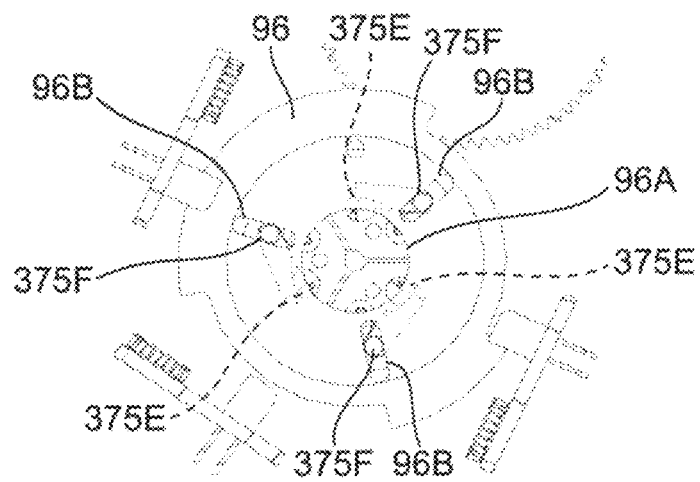
FIG. 26A is a plan view illustrating a positional relationship between a separation cam gear and an engagement pin of a drop hook at an initial position.
Figure 26B:
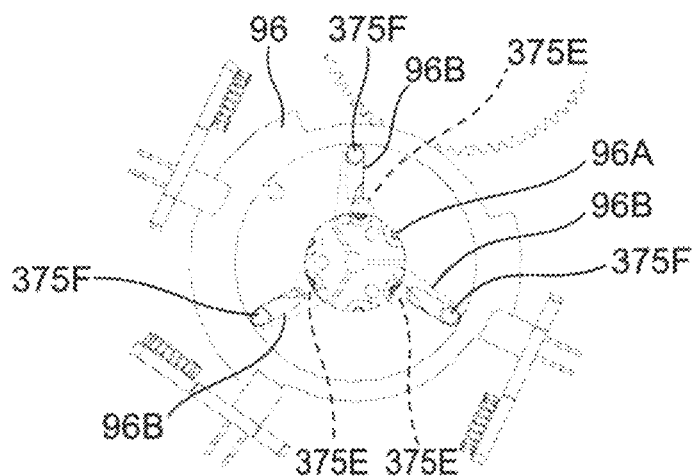
FIG. 26B is a plan view illustrating a positional relationship between the separation cam gear and the engagement pin of the drop hook when the separation motor is driven.
Figure 26C:
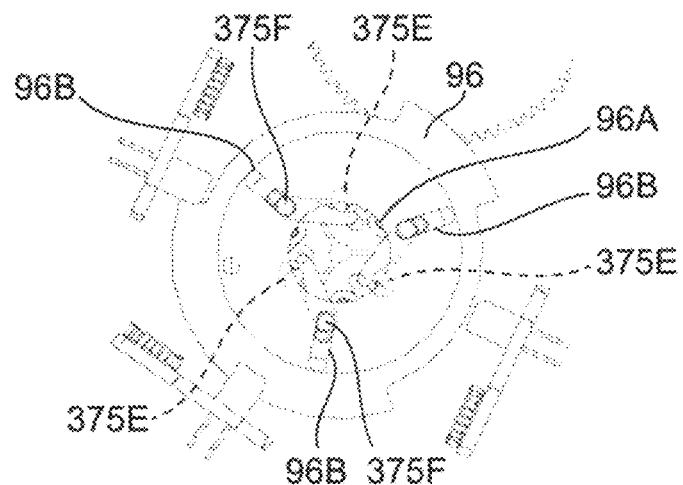
FIG. 26C is a plan view illustrating a positional relationship between the separation cam gear and the engagement pin of the drop hook when the separation motor is further driven.
Figure 27A:
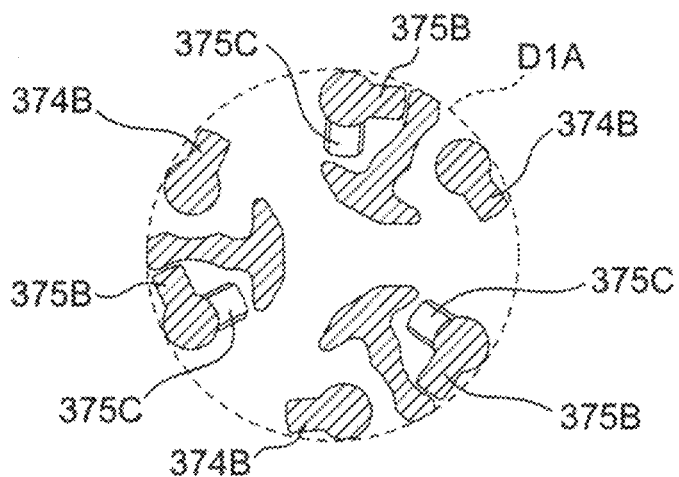
FIG. 27A is a plan view illustrating a positional relationship between the first support claw of the select hook and the second support claw and the third support claw of the drop hook at an initial position.
Figure 27B:
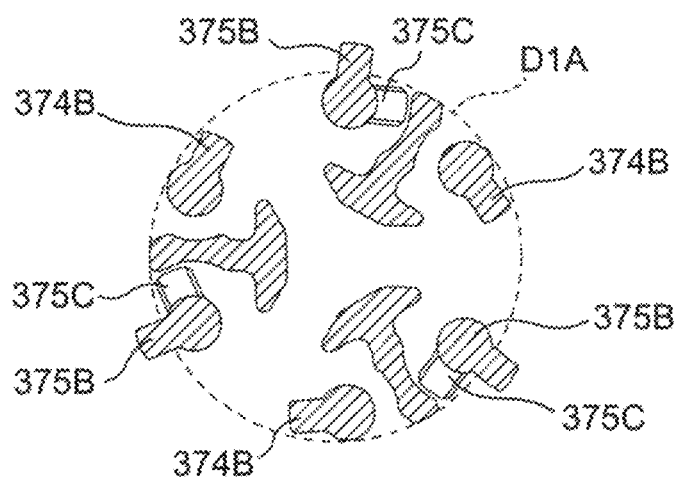
FIG. 27B is a plan view illustrating the positional relationship between the first support claws of the select hook and the second and third support claws of the drop hook when the separation motor is driven.
Figure 27C:
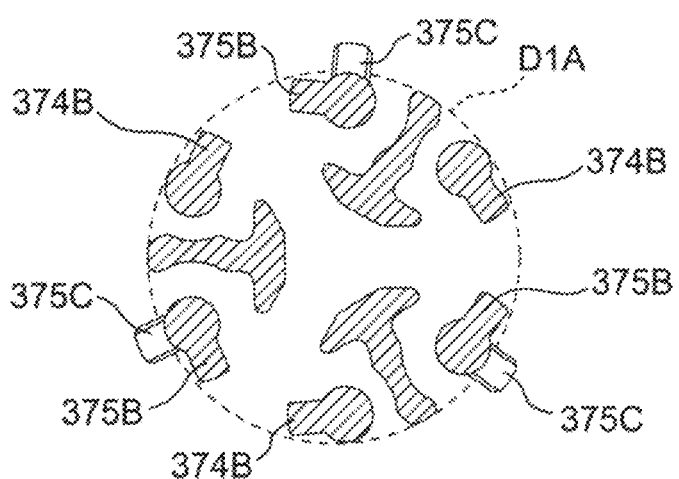
FIG. 27C is a plan view illustrating the positional relationship between the first support claws of the select hook and the second and third support claws of the drop hook when the separation motor is further driven.

FIGS. 26A to 26C are plan views illustrating positional relationships between the separation cam gear 96 and the engagement pin 375F of the drop hook 375 when the separation motor 92A is driven. FIGS. 27A to 27C are plan views illustrating the positional relationships between the first support claw 374B of the select hook 374 and the second support claw 375B and the third support claw 375C of the drop hook 375 when the separation motor 92A is driven.

As illustrated in FIG. 26A, at the initial position, each engagement pin 375F of the drop hook 375 is located at an intermediate portion of the corresponding cam groove 96B of the separation cam gear 96. As illustrated in FIGS. 27A and 23A, at the initial position, the first support claw 374B of the select hook 374 and the second support claw 375B and the third support claw 375C of the drop hook 375 are located at the storage position inside the center hole D1A of the disc D1.

Figure 23C:
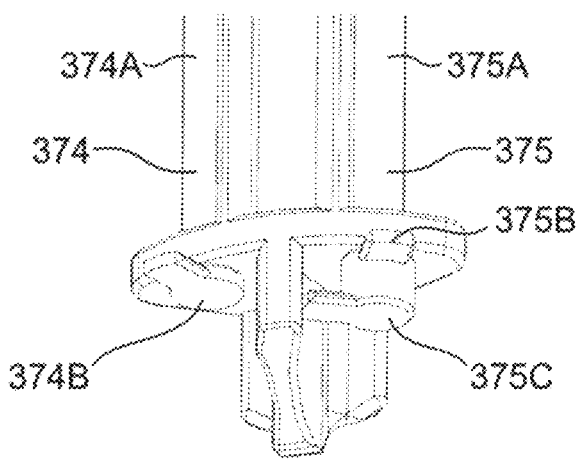
FIG. 23C is a perspective view illustrating a positional relationship between the first support claw of the select hook and the second support claw and the third support claw of the drop hook which can be obtained by driving the selection motor and the separation motor.
Figure 23D:
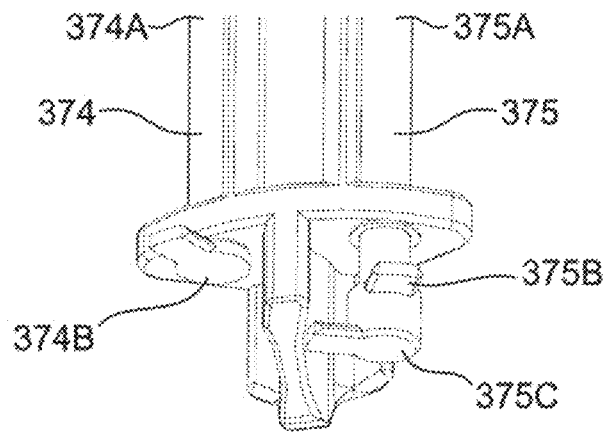
FIG. 23D is a perspective view illustrating a positional relationship between the first support claws of the select hook and the second support claw and the third support claw of the drop hook which can be obtained by driving the selection motor and the separation motor.
Figure 23E:
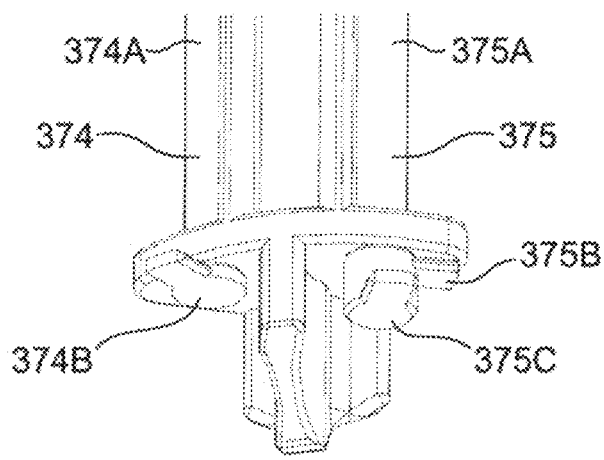
FIG. 23E is a perspective view illustrating a positional relationship between the first support claw of the select hook and the second support claw and the third support claw of the drop hook which can be obtained by driving the selection motor and the separation motor.
Figure 23F:
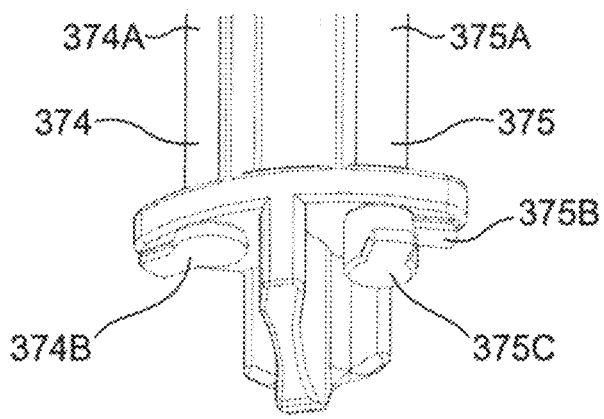
FIG. 23F is a perspective view illustrating a positional relationship between the first support claw of the select hook and the second support claw and the third support claw of the drop hook which can be obtained by driving the selection motor and the separation motor.

When the separation motor 92A is driven from the state illustrated in FIG. 26A, the separation cam gear 96 rotates in a reverse direction as illustrated in FIG. 26B (counterclockwise in FIG. 26B). Accordingly, each engagement pin 375F of the drop hook 375 moves to an outer end portion of the corresponding cam groove 96B of the separation cam gear 96. At this time, the separation lever 375D of the drop hook 375 rotates in a reverse direction (counterclockwise in FIG. 26B) about the contact pin 375E, and the second shaft 375A (see FIG. 16) to which the contact pin 375E is connected rotates around an axis. As illustrated in FIGS. 27B and 23F, the second support claw 375B of the drop hook 375 moves to the protrusion position outside the center hole D1A of the disc D1 in conjunction with the rotation operation of the second shaft 375A.

When the separation motor 92A is further driven from the state illustrated in FIG. 26B, the separation cam gear 96 further rotates in a reverse direction as illustrated in FIG. 26C. Thereby, each engagement pin 375F of the drop hook 375 moves to the inner end portion of the corresponding cam groove 96B of the separation cam gear 96. At this time, the separation lever 375D of the drop hook 375 further rotates about the contact pin 375E in a reverse direction, and the second shaft 375A (see FIG. 16) to which the contact pin 375E is connected further rotates around an axis. As illustrated in FIG. 27C, the second support claw 375B of the drop hook 375 moves to the storage position in conjunction with the rotation operation of the second shaft 375A, and the third support claw 375C of the drop hook 375 moves to the protrusion position.

Figure 28A:
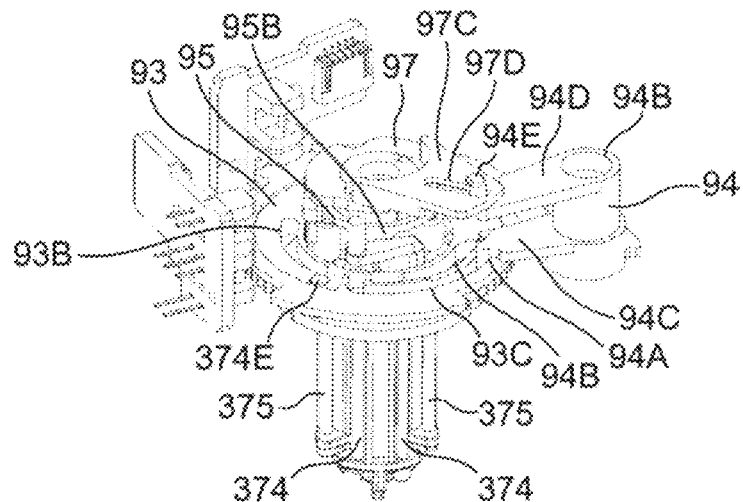
FIG. 28A is a perspective view illustrating a positional relationship between a pressing cam and a contact pin of a drop hook at the initial position.
Figure 28B:
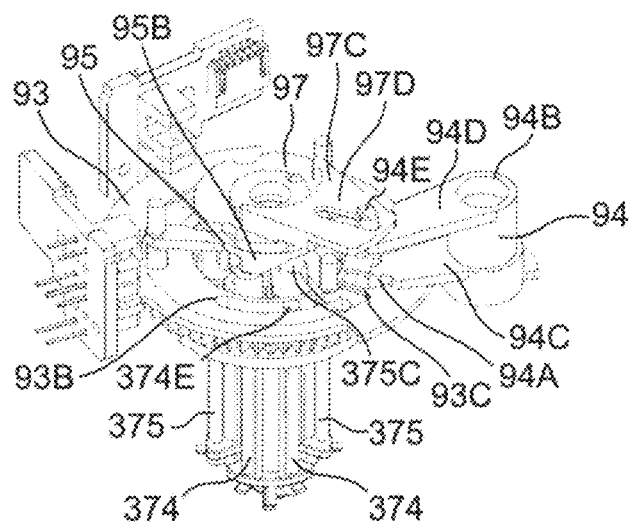
FIG. 28B is a perspective view illustrating a positional relationship between a pressing cam and a contact pin of the drop hook when the selection motor and the separation motor are driven.
Figure 28C:
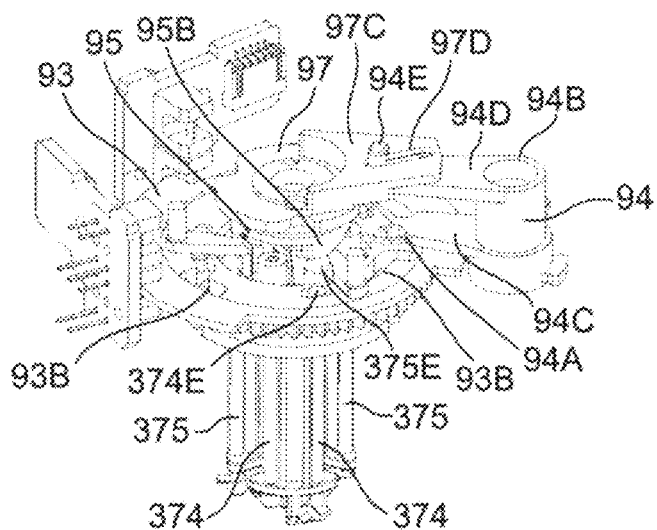
FIG. 28C is a perspective view illustrating a positional relationship between the pressing cam and the contact pin of the drop hook when the selection motor is further driven.
Figure 29A:
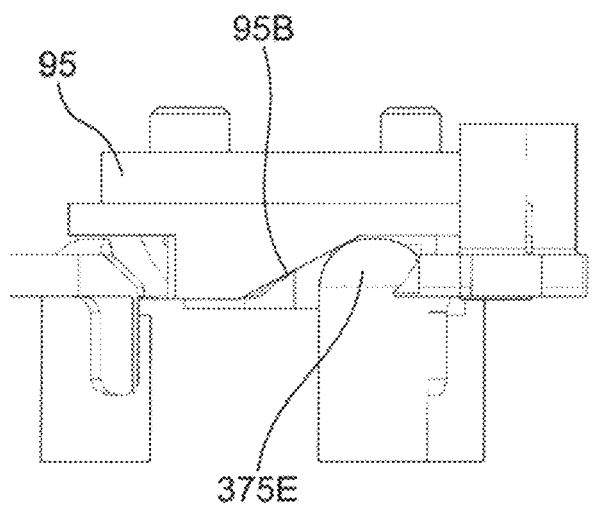
FIG. 29A is a side view illustrating a positional relationship between the pressing cam and the contact pin of the drop hook when the selection motor and the separation motor are driven.
Figure 29B:
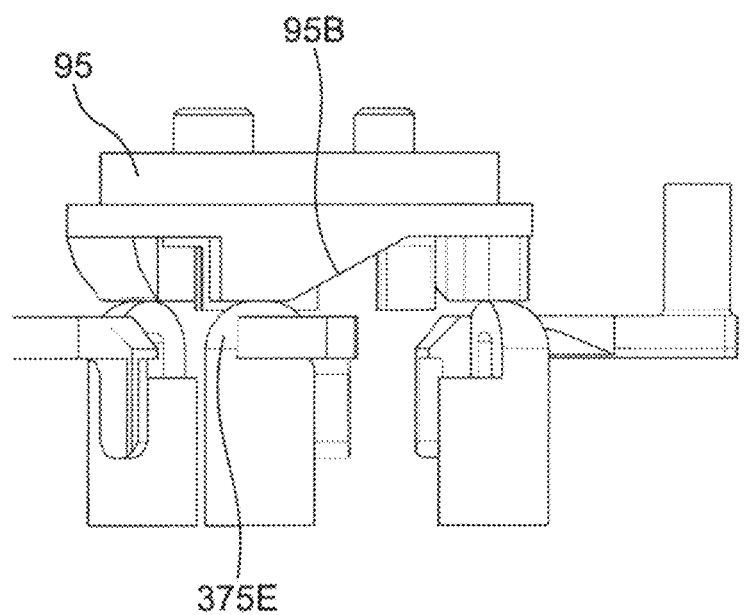
FIG. 29B is a side view illustrating a positional relationship between the pressing cam and the contact pin of the drop hook when the selection motor is further driven.
Figure 30A:
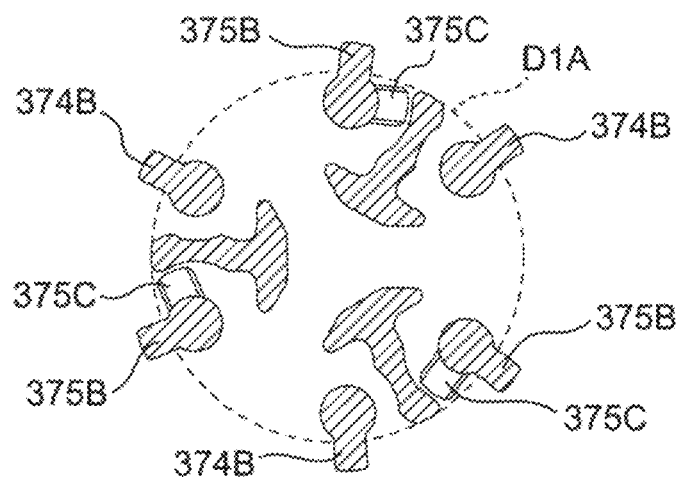
FIG. 30A is a plan view illustrating a positional relationship between the first support claw of the select hook and the second support claw and the third support claw of the drop hook when the selection motor and the separation motor are driven.
Figure 30B:
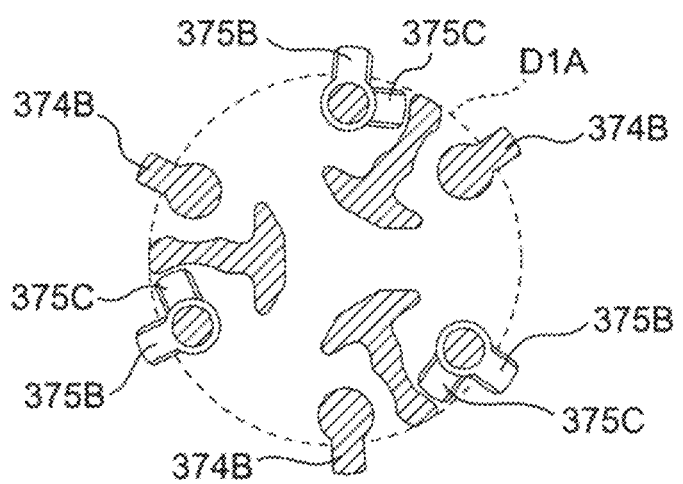
FIG. 30B is a plan view illustrating a positional relationship between the first support claw of the select hook and the second support claw and the third support claw of the drop hook when the selection motor is further driven.

FIGS. 28A to 28C are perspective views illustrating positional relationships between the pressing cam 95 and the contact pin 375E of the drop hook 375 when the selection motor 91A and the separation motor 92A are driven. FIGS. 29A and 29B are side views illustrating the positional relationships between the pressing cam 95 and the contact pin 375E of the drop hook 375 when the selection motor 91A and the separation motor 92A are driven. FIGS. 30A and 30B are plan views illustrating the positional relationships between the first support claw 374B of the select hook 374 and the second support claw 375B and the third support claw 375C of the drop hook 375 when the selection motor 91A and the separation motor 92A are driven. FIGS. 28A to 28C illustrate a state in which the separation cam gear 96 is removed in order to easily illustrate the positional relationships between the pressing cam 95 and the contact pin 375E of the drop hook 375.

As illustrated in FIG. 28A, at the initial position, each engagement pin 374E of the select hook 374 is located at one end portion of the corresponding cam groove 93B of the selection cam gear 93. The engagement pin 94A of the link lever 94 is located at one end portion of the cam groove 93C. At this initial position, the first support claw 374B of the select hook 374 and the second support claw 375B and the third support claw 375C of the drop hook 375 are located at the storage position at which the support claws are stored inside the center hole D1A of the disc D1 as illustrated in FIGS. 23A and 24A.

When the selection motor 91A and the separation motor 92A are driven from the state illustrated in FIG. 28A, the selection cam gear 93 and the separation cam gear 96 rotate in the reverse direction. Accordingly, as illustrated in FIGS. 30A and 23C, the first support claw 374B of the select hook 374 and the second support claw 375B of the drop hook 375 move to the protrusion position.

When only the selection motor 91A is further driven from the state illustrated in FIG. 28B, the selection cam gear 93 further rotates in the reverse direction. Accordingly, as illustrated in FIGS. 28C and 29B, the link lever 94 rotates about the shaft 373A in a forward direction, and the hook 94E of the link lever 94 moves from an outer end portion to an inner end portion along the cam groove 97D. The drive lever 97 and the pressing cam 95 rotate in the reverse direction in conjunction with this movement, and the drop hook 375 is pressed down (for example, about 2 mm) by the inclination 95B of the pressing cam 95 against the urging force of the coil spring 375H. As a result, as illustrated in FIGS. 30B and 23D, the second support claw 375B of the drop hook 375 moves downward in a state in which the second support claw is located at the protrusion position.

Next, a disc holding operation in which the disc selector spindle 371 holds the plurality of discs D1 from the disc tray 32 will be described. The movements of the first support claw 374B, the second support claw 375B, and the third support claw 375C and the movement of the disc tray 32 are performed under the control of the control unit 7. Here, it is assumed that any disc is the sixth disc from the top and the disc selector spindle 371 holds six discs out of twelve discs D1 from the disc tray 32.

FIGS. 31A to 31F are cross-sectional views schematically illustrating the disc holding operation in which the disc selector spindle 371 holds the plurality of discs D1 from the disc tray 32. FIGS. 32A and 32B are perspective views illustrating the disc holding operation in which the disc selector spindle 371 holds the plurality of discs D1 from the disc tray 32 in a partial cross section.

Figure 31A:
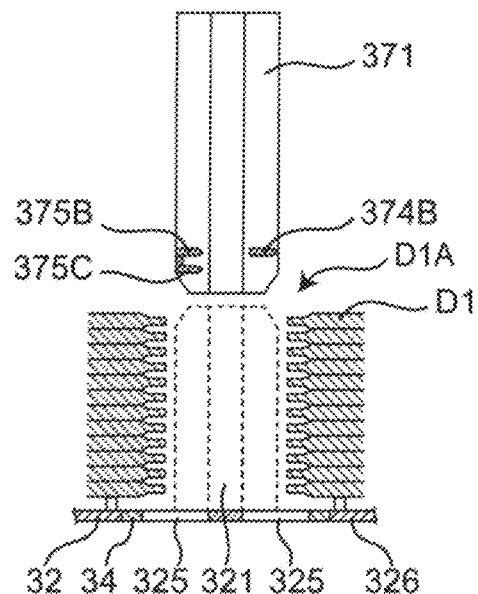
FIG. 31A is a cross-sectional view schematically illustrating a disc holding operation in which the disc selector spindle holds the plurality of discs from the disc tray.
Figure 32A:
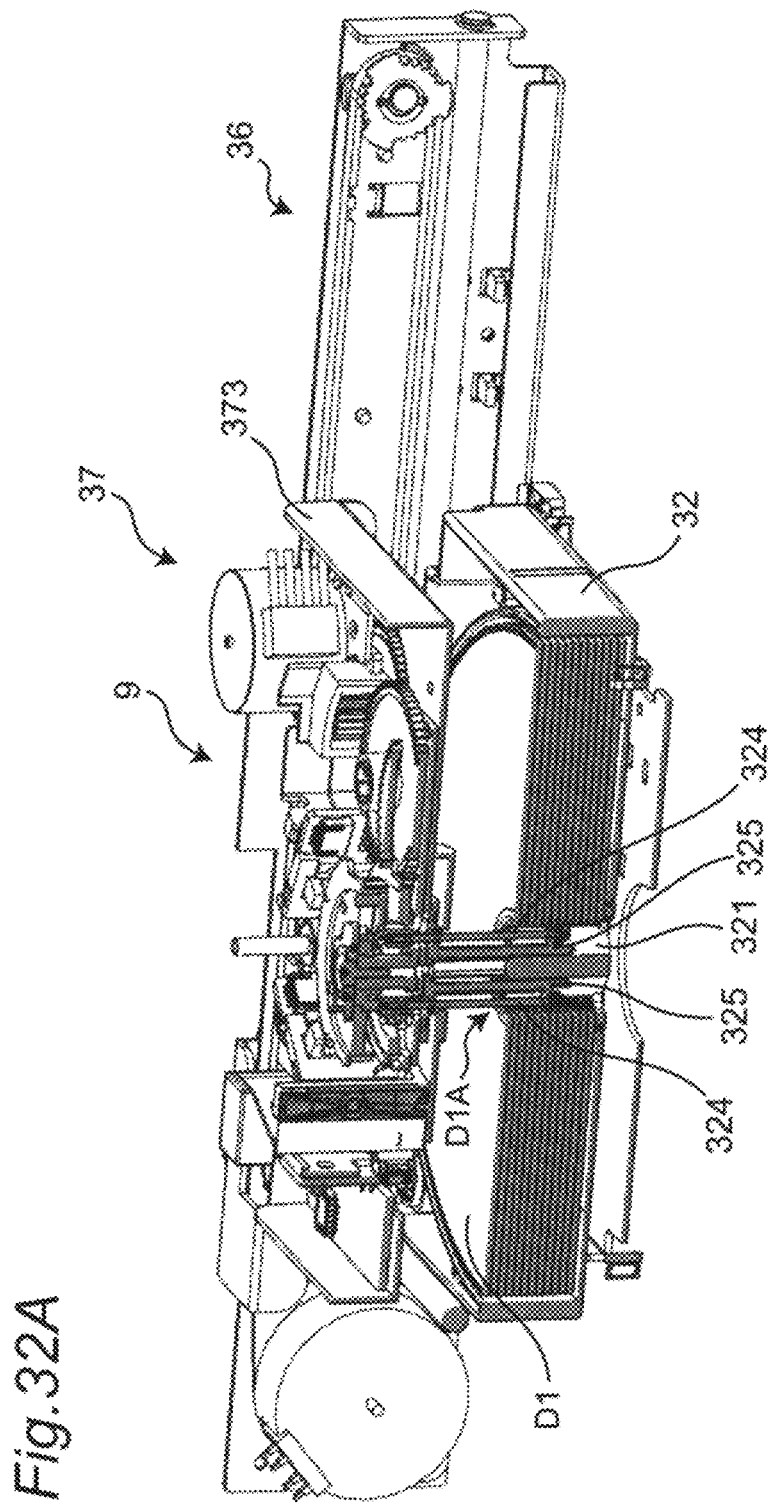
FIG. 32A is a perspective view illustrating the disc holding operation in which the disc selector spindle holds the plurality of discs from the disc tray in a partial cross-section.
Figure 32B:
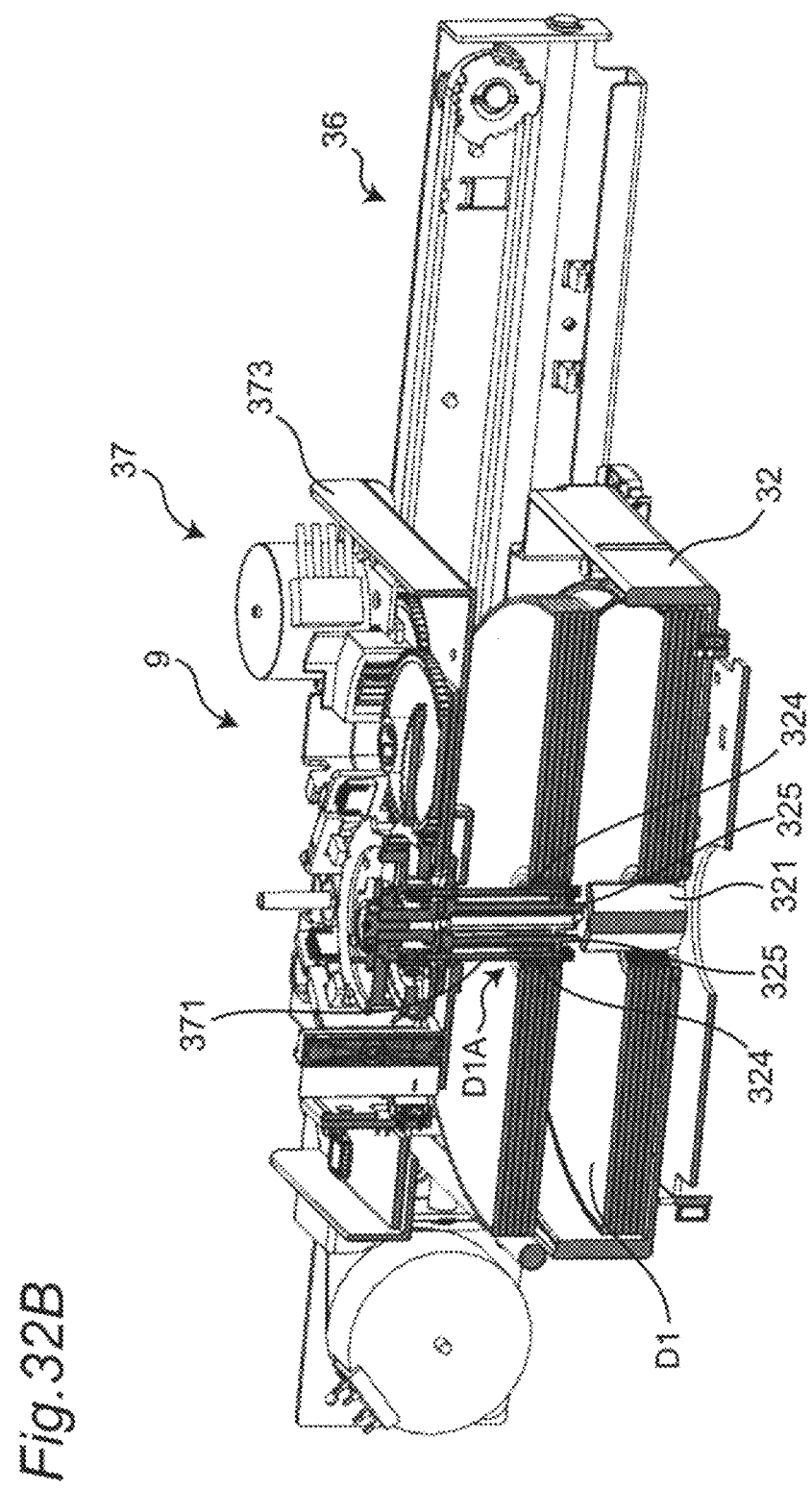
FIG. 32B is a perspective view illustrating the disc holding operation in which the disc selector spindle holds the plurality of discs from the disc tray in a partial cross-section.

Initially, as illustrated in FIG. 31A, the first support claw 374B, the second support claw 375B, and the third support claw 375C are respectively located at the storage positions (see FIG. 23A).

Figure 31B:
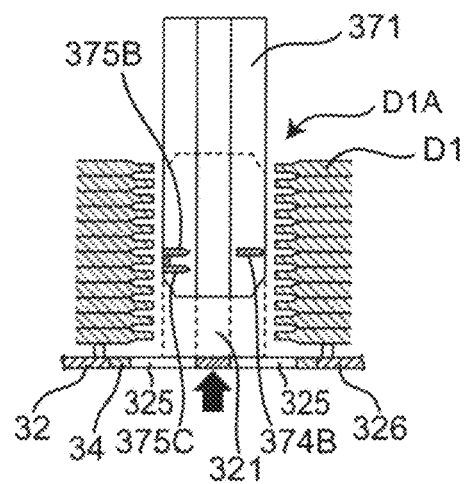
FIG. 31B is a cross-sectional view illustrating the disc holding operation subsequent to FIG. 31A.

Subsequently, as illustrated in FIGS. 31B and 32A, the disc tray 32 ascends, and the disc selector spindle 371 is inserted into the center holes D1A of the plurality of discs D1.

Figure 31C:
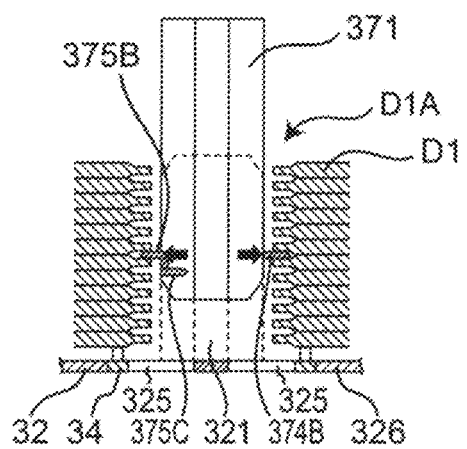
FIG. 31C is a cross-sectional view illustrating the disc holding operation subsequent to FIG. 31B.

Subsequently, as illustrated in FIG. 31C, when the first support claw 374B and the second support claw 375B are moved below the sixth disc from the top, the first support claw 374B and the second support claw 375B are moved to the protrusion positions from the storage positions (see FIGS. 23B and 23C).

Figure 31D:
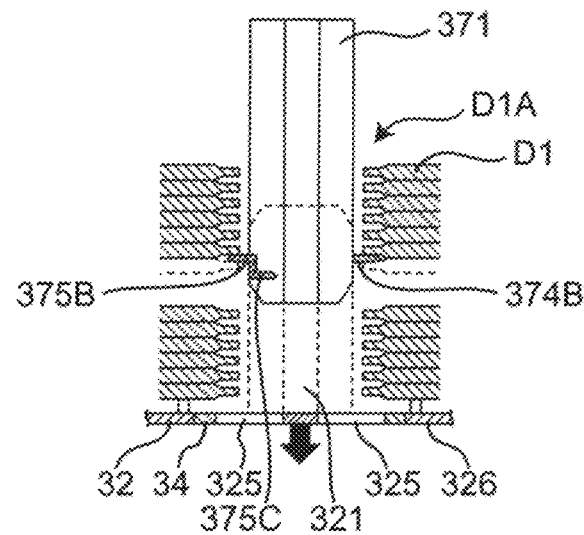
FIG. 31D is a cross-sectional view illustrating the disc holding operation subsequent to FIG. 31C.

Subsequently, as illustrated in FIG. 31D, the disc tray 32 descends in a state in which the first support claw 374B and the second support claw 375B are located at the protrusion positions. That is, the first support claw 374B and the second support claw 375B are moved upward relative to the seventh disc from the top. Accordingly, the sixth disc and the disc above the sixth disc are held by the first support claw 374B and the second support claw 375B. At this time, the seventh disc may not be separated from the sixth disc by coming in close contact with the sixth disc.

Figure 31E:
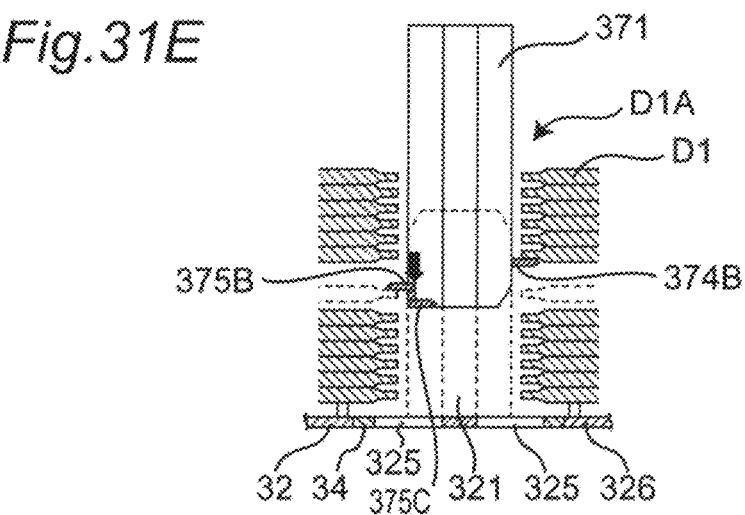
FIG. 31E is a cross-sectional view illustrating the disc holding operation subsequent to FIG. 31D.

Subsequently, as illustrated in FIG. 31E, the second support claw 375B is moved downward relative to the sixth disc in a state in which the first support claw 374B and the second support claw 375B holding six discs. Accordingly, the seventh disc that comes in close contact with the sixth disc is separated from the sixth disc.

Figure 31F:
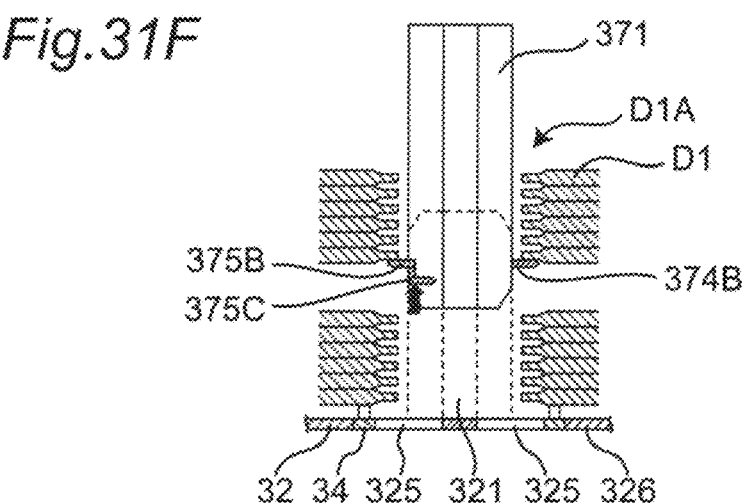
FIG. 31F is a cross-sectional view illustrating the disc holding operation subsequent to FIG. 31E.

Subsequently, the second support claw 375B is moved upward relative to the seventh disc as illustrated in FIG. 31F, and six discs are held again by the first support claw 374B and the second support claw 375B as illustrated in FIG. 32B. Accordingly, the disc selector spindle 371 can stably transport the held six discs to the drive unit 34.

Subsequently, a disc supply operation in which the disc selector spindle 371 supplies (places) the lowermost disc among the plurality of held discs D1 to the tray 34A of the drive unit 34 will be described. The movements of the first support claw 374B, the second support claw 375B, and the third support claw 375C are performed under the control of the control unit 7. Here, it is assumed that the disc selector spindle 371 supplies the lowermost disc among the held six discs as any disc to the tray 34A.

FIGS. 33A to 33F are cross-sectional views schematically illustrating the disc supply operation in which the disc selector spindle 371 supplies the plurality of held discs D1 to the tray 34A of the drive unit 34.

Figure 33A:
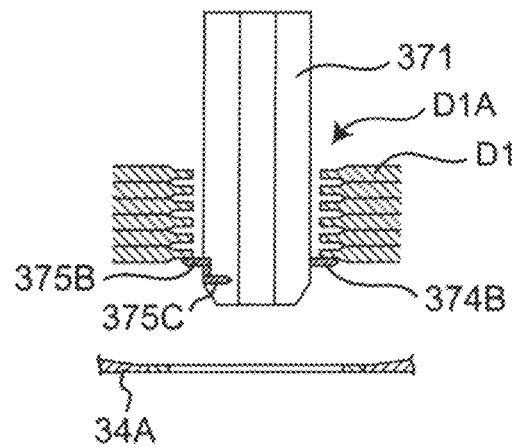
FIG. 33A is a cross-sectional view schematically illustrating a disc supply operation in which the disc selector spindle supplies the plurality of discs held by the disc selector spindle to a tray of a drive unit.

Initially, as illustrated in FIG. 33A, the tray 34A of the drive unit 34 is located below the disc selector spindle 371 that holds six discs. At this time, the first support claw 374B and the second support claw 375B are respectively located at the protrusion positions (see FIG. 23C), and hold six discs.

Figure 33B:
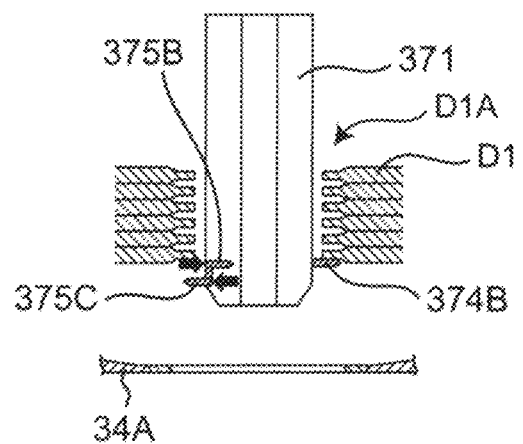
FIG. 33B is a cross-sectional view illustrating the disc supply operation subsequent to FIG. 33A.

Subsequently, as illustrated in FIG. 33B, the second support claw 375B is moved from the protrusion position to the storage position, and the third support claw 375C is moved from the storage position to the protrusion position (see FIG. 23E).

Figure 33C:
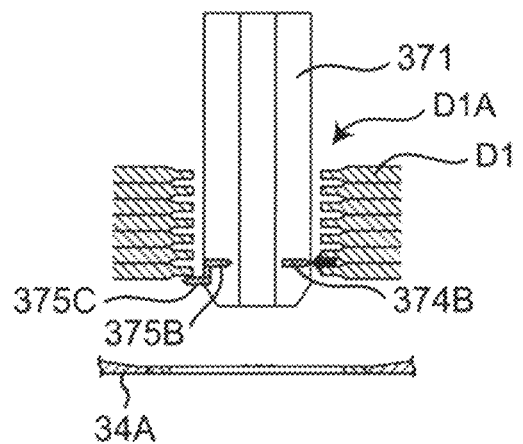
FIG. 33C is a cross-sectional view illustrating the disc supply operation subsequent to FIG. 33B.

Subsequently, as illustrated in FIG. 33C, the first support claw 374B is moved from the protrusion position to the storage position (see FIG. 23F). Accordingly, six discs fall onto the third support claw 375C by their own weight, and are held by the third support claw 375C.

Figure 33D:
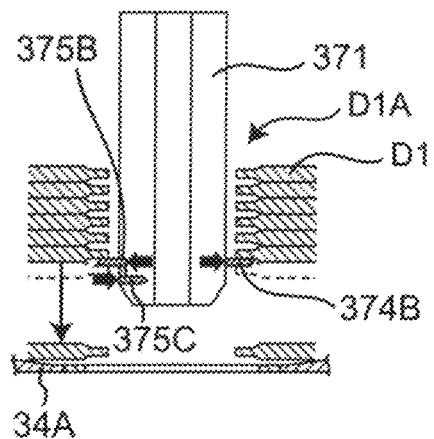
FIG. 33D is a cross-sectional view illustrating the disc supply operation subsequent to FIG. 33C.

Subsequently, as illustrated in FIG. 33D, the first support claw 374B and the second support claw 375B are moved from the storage positions to the protrusion positions, and the third support claw 375C is moved from the protrusion position to the storage position (see FIG. 23C). At this time, the lowermost disc may not be separated from the fifth disc by coming in close contact with the fifth disc.

Figure 33E:
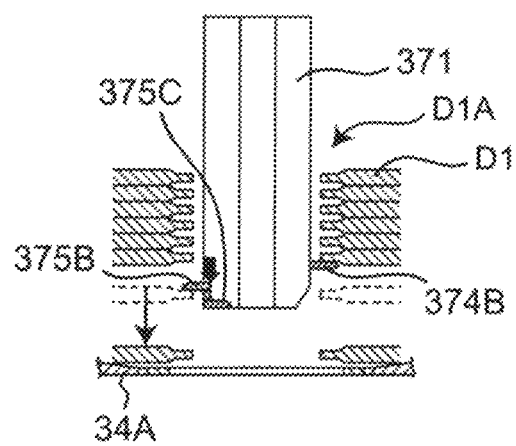
FIG. 33E is a cross-sectional view illustrating the disc supply operation subsequent to FIG. 33D.

Subsequently, as illustrated in FIG. 33E, the second support claw 375B is moved downward relative to the lowermost disc in a state in which the first support claw 374B and the second support claw 375B hold five discs (see FIG. 23D). Accordingly, the lowermost disc is separated from the fifth disc. The separated lowermost disc falls onto the tray 34A of the drive unit 34 by their own weight, and is supplied (placed) to the tray 34A.

Figure 33F:
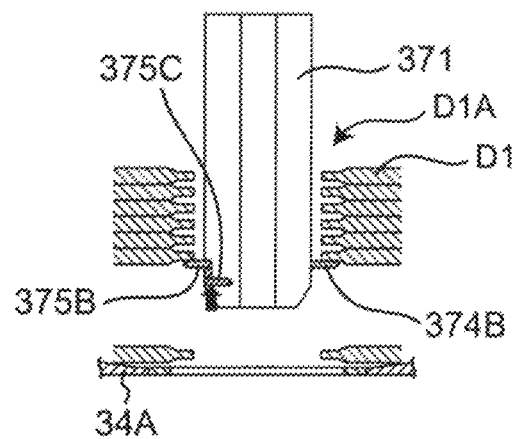
FIG. 33F is a cross-sectional view illustrating the disc supply operation subsequent to FIG. 33E.

Subsequently, as illustrated in FIG. 33F, the second support claw 375B is moved upward relative to the lowermost disc, and the first support claw 374B and the second support claw 375B hold five discs. Accordingly, the disc selector spindle 371 can supply the lowermost disc among the held six discs to the tray 34A of the drive unit 34.

Subsequently, a disc returning operation in which the disc selector spindle 371 collects the disc on the tray 34A of the drive unit 34 and returns the collected disc to the disc tray 32 will be described. The movements of the first support claw 374B, the second support claw 375B, and the third support claw 375C and the movement of the disc tray 32 are performed under the control of the control unit 7. Here, it is assumed that the disc selector spindle 371 collects the disc on the tray 34A of the drive unit 34 while holding five discs and returns the collected disc to the disc tray 32.

FIGS. 34A to 34G are cross-sectional views schematically illustrating the disc returning operation in which the disc selector spindle 371 collects the disc on the tray 34A of the drive unit 34 and returns the collected disc to the disc tray 32.

Figure 34A:
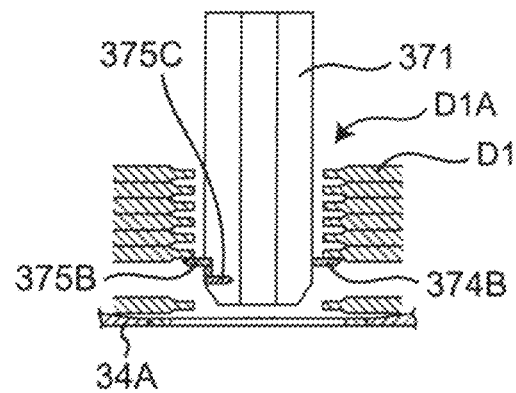
FIG. 34A is a cross-sectional view schematically illustrating a disc returning operation in which the disc selector spindle collects the disc on the tray of the drive unit and returns the collected disc to the disc tray.

Initially, as illustrated in FIG. 34A, the tray 34A on which one disc is placed is located below the disc selector spindle 371 that holds five discs. At this time, the first support claw 374B and the second support claw 375B are respectively located at the protrusion positions (see FIG. 23C), and hold five discs.

Figure 34B:
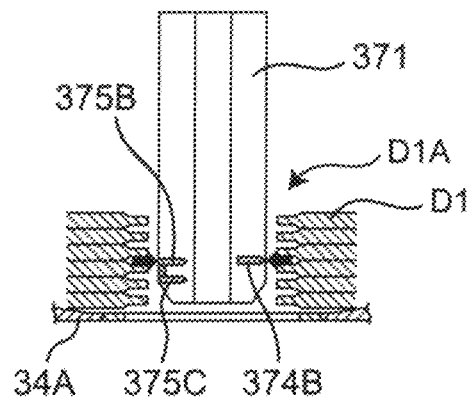
FIG. 34B is a cross-sectional view illustrating the disc returning operation subsequent to FIG. 34A.

Subsequently, as illustrated in FIG. 34B, the first support claw 374B and the second support claw 375B are moved from the protrusion positions to the storage positions (see FIG. 23A). Accordingly, five discs fall onto the tray 34A by their own weight, and six discs are placed on the tray 34A.

Figure 34C:
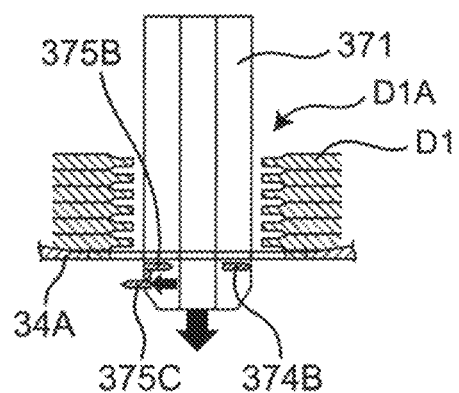
FIG. 34C is a cross-sectional view illustrating the disc returning operation subsequent to FIG. 34B.

Subsequently, as illustrated in FIG. 34C, the disc selector spindle 371 is relatively moved such that any one of the first support claw 374B, the second support claw 375B, and the third support claw 375C passes through the center hole of the tray 34A and is located below the tray 34A. At this time, any one of the first support claw 374B, the second support claw 375B, and the third support claw 375C is moved from the storage positions to the protrusion positions (see FIG. 23F).

Figure 34D:
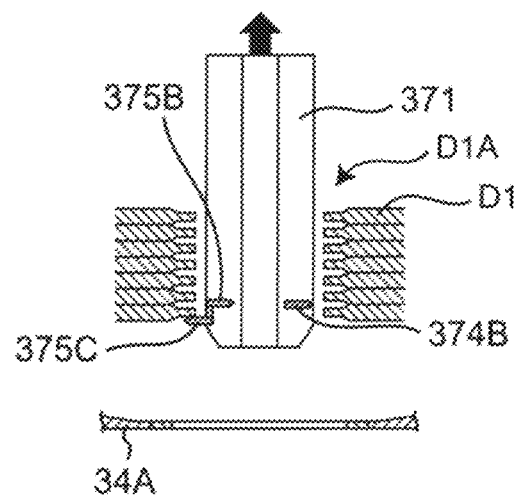
FIG. 34D is a cross-sectional view illustrating the disc returning operation subsequent to FIG. 34C.

Subsequently, as illustrated in FIG. 34D, the disc selector spindle 371 is relatively moved above the tray 34A. Accordingly, any one of the first support claw 374B, the second support claw 375B, and the third support claw 375C collects the disc on the tray 34A, and holds six discs.

Figure 34E:
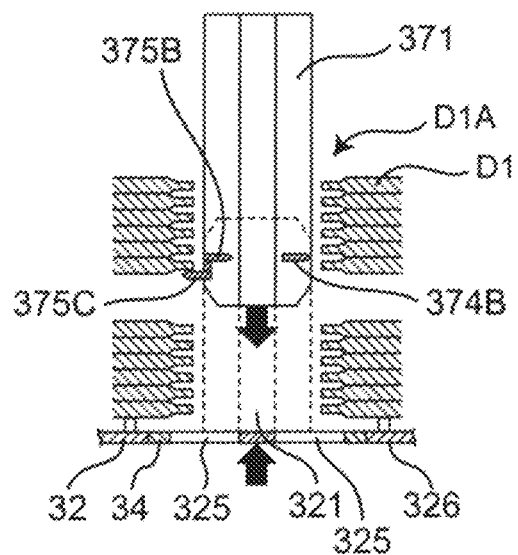
FIG. 34E is a cross-sectional view illustrating the disc returning operation subsequent to FIG. 34D.

Subsequently, as illustrated in FIG. 34E, the disc tray 32 that stores six discs is located below the disc selector spindle 371 holding six discs. Thereafter, the disc selector spindle 371 and the disc tray 32 are relatively moved so as to approach each other.

Figure 34F:
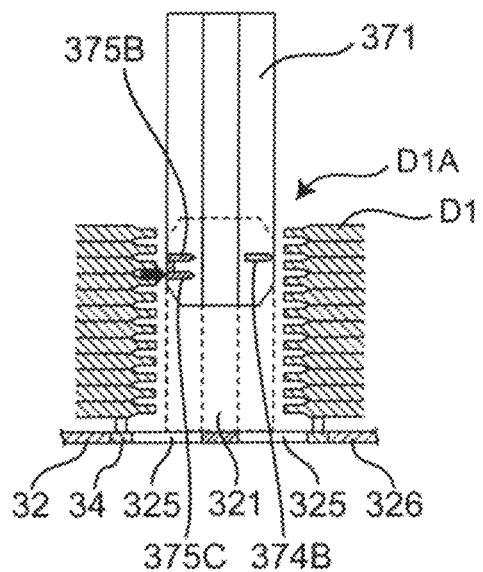
FIG. 34F is a cross-sectional view illustrating the disc returning operation subsequent to FIG. 34E.

Subsequently, as illustrated in FIG. 34F, one of the first support claw 374B, the second support claw 375B, and the third support claw 375C is moved from the protrusion position to the storage position above the disc tray 32, and six discs held by the disc selector spindle 371 are stacked on six discs stored in the disc tray 32.

Figure 34G:
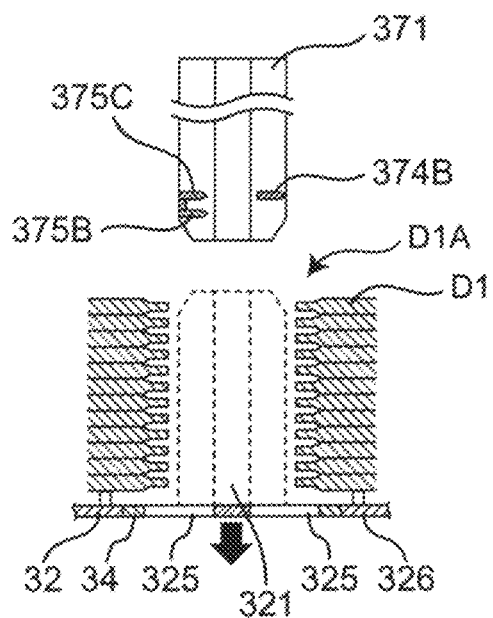
FIG. 34G is a cross-sectional view illustrating the disc returning operation subsequent to FIG. 34F.
Figure 36:
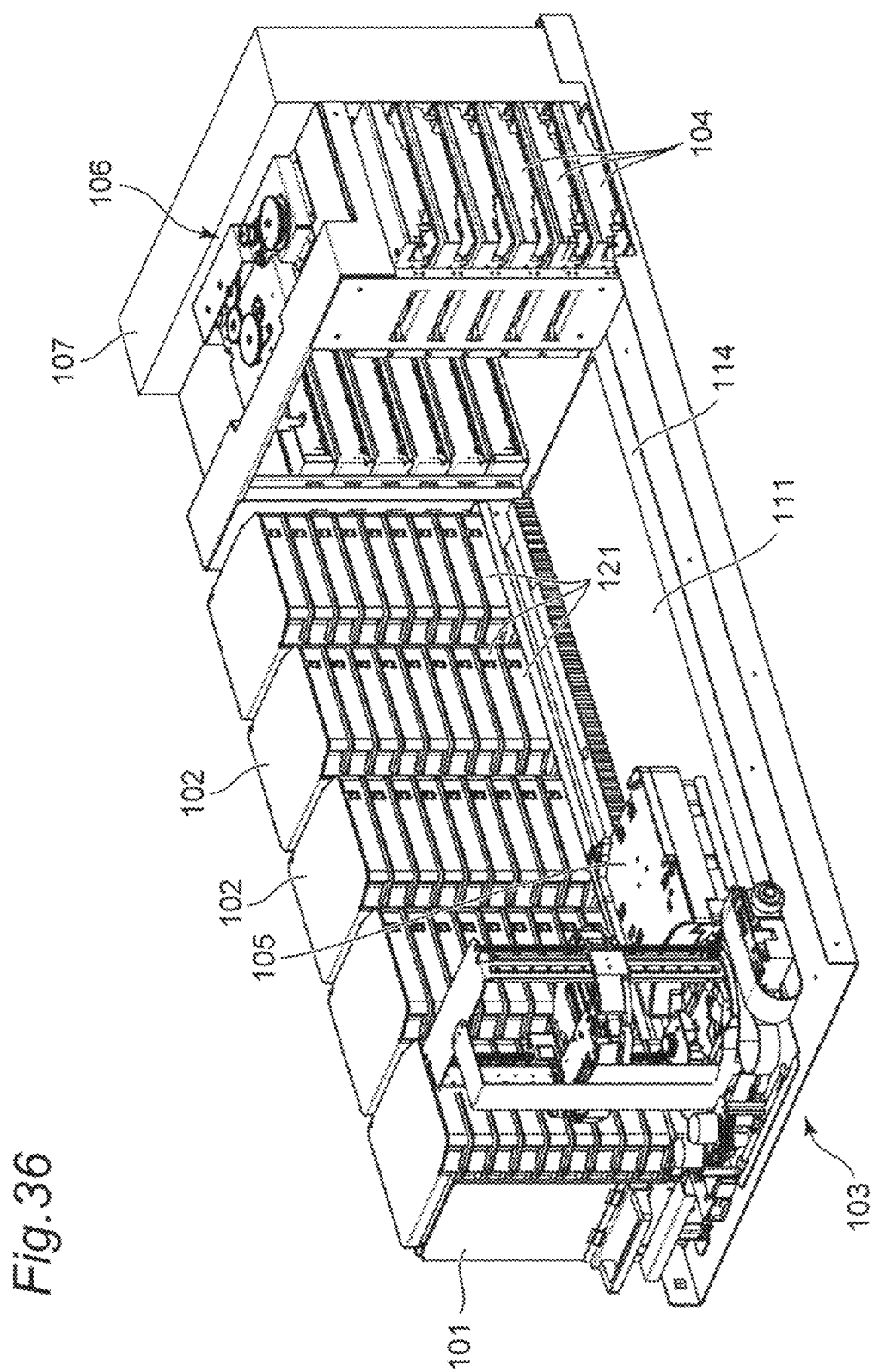
FIG. 36 is a perspective view schematically illustrating a schematic configuration of a disc device of the related art.

Subsequently, as illustrated in FIG. 34G, the disc tray 32 descends, and the disc selector spindle 371 escapes from the center holes D1A of twelve discs D1. Accordingly, the disc selector spindle 371 can return the disc on the tray 34A to the disc tray 32.

According to the disc device of the embodiment, the disc selector spindle 371 includes the select hook 374 having the first support claw 374B, and the drop hook 375 having the second support claw 375B and the third support claw 375C. According to this configuration, the plurality of discs D1 is held in the stacked state by moving the first support claw 374B, the second support claw 375B, and the third support claw 375C between the storage positions and the protrusion positions. The lowermost disc can be separated from other discs and supplied to the drive unit 34. As a result, it is possible to simplify the configuration of the changer unit by eliminating the necessity of providing the lifter. In the disc device according to the embodiment, a drive source for driving the select hook 374 and a drive source for driving the drop hook 375 are separately required. However, since a driving source for driving the lifter is not required, an increase in the number of driving sources can be suppressed.

In accordance with the disc device of the embodiment, the disc selector spindle 371 has the plurality of select hooks 374 and the plurality of drop hooks 375. According to this configuration, it is possible to more stably hold the plurality of discs by bringing the plurality of select hooks 374 and the plurality of drop hooks 375 into contact with the plurality of locations on the inner peripheral portion of the lowermost disc.

In accordance with the disc device of the embodiment, the plurality of select hooks 374 and the plurality of drop hooks 375 are alternately arranged at intervals in the circumferential direction of the center hole D1A of the disc D1 in plan view. According to this configuration, it is possible to more stably hold the plurality of discs by equally bringing the plurality of select hooks 374 and the plurality of drop hooks 375 into contact with the plurality of locations on the inner peripheral portion of the lowermost disc.

The present disclosure is not limited to the aforementioned embodiment, and can be implemented in various other modes. For example, although it has been described that the first support claw 374B is configured to move to the storage position and the protrusion position in conjunction with the rotation operation of the first shaft 374A around the axis, the present disclosure is not limited thereto. The first support claw 374B may be configured to move between the storage position and the protrusion position. Similarly, the second support claw 375B and the third support claw 375C may be configured to move between the storage positions and the protrusion positions.

Although it has been described with reference to FIGS. 31E and 33E that the discs adjacent to each other are separated by relatively moving the second support claw 375B downward, the present disclosure is not limited thereto. For example, the discs adjacent to each other may be separated by relatively moving the first support claw 374B downward.

Although it has been described that the select hook 374 and the drop hook 375 are configured to relatively move in the vertical direction Z, the present disclosure is not limited thereto. When there is a low possibility that the discs adjacent to each other are not separated by coming in close contact with each other, the select hook 374 and the drop hook 375 may not be configured to relatively move in the vertical direction Z. It is not necessary to perform the operation described with reference to FIGS. 31E and 33E.

Although it has been described that the disc tray 32 descends after six discs held by the disc selector spindle 371 are returned to the disc tray 32 during the disc returning operation as illustrated in FIG. 34G, the present disclosure is not limited thereto. For example, as illustrated in FIGS. 35A and 35B, when one disc is returned to the disc tray 32, the one disc is shifted from the other discs in the plane direction, and may not be caught in the disc tray 32. Thus, as illustrated in FIG. 35C, the disc tray 32 may ascend such that the disc tray moves until the lower end portion of the disc selector spindle 371 passes the through-hole 325 of the disc tray 32 and protrudes downward outside the disc tray 32. Accordingly, it is possible to reliably insert the disc D1 into the disc tray 32 by correcting the shift of each disc D1 in the plane direction and aligning the center holes D1A of the discs D1 in plan view.

Although it has been described that the disc selector spindle 371 is inserted into and removed from the center holes D1A of the plurality of discs D1 by moving the disc tray 32 in the vertical direction Z, the present disclosure is not limited thereto. The disc selector spindle 371 is moved in the vertical direction Z, and thus, the disc selector spindle 371 may be inserted into and removed from the center holes D1A of the plurality of discs D. That is, the disc selector spindle 371 and the disc tray 32 may be relatively moved in the vertical direction Z, and thus, the disc selector spindle 371 may be inserted into and removed from the center holes D1A of the plurality of discs D1. Similarly, the disc selector spindle 371 and the tray 34A of the drive unit 34 are relatively moved in the vertical direction Z, and thus, the disc selector spindle 371 may be inserted into and removed from the center hole D1A of the disc D1 on the tray 34A.

It has been described that the first support claw 374B and the second support claw 375B enter a gap between the discs adjacent to each other. Thus, it is necessary to control the positions of the first support claw 374B and the second support claw 375B in the vertical direction Z with high precision. Thus, it is preferable that a position detection sensor capable of detecting the positions of the first support claw 374B and the second support claw 375B in the vertical direction Z with high accuracy be provided. Accordingly, the first support claw 374B or the second support claw 375B can more reliably enter the gap between the discs adjacent to each other.

The gap between adjacent discs is usually very narrow. Thus, when the disc is slightly inclined with respect to a direction orthogonal to the stacking direction, the first support claw 374B or the second support claw 375B cannot enter the gap between the discs adjacent to each other, and may come in contact with the inner peripheral portion of the disc. Thus, when at least one of the first support claw 374B of one select hook 374 of the plurality of select hooks 374 and the second support claw 375B of one drop hook 375 of the plurality of drop hooks 375 is moved to the protrusion position from the storage position, it is preferable that the support claw be configured to correct the inclination of the disc D1 with respect to the direction orthogonal to the stacking direction by coming in contact with the inner peripheral portion of the disc D1 earlier than the other support claw. For example, it is preferable that at least one of the first support claw 374B of one select hook 374 and the second support claw 375B of one drop hook 375 have a tapered leading end portion (see, for example, FIG. 31A). Accordingly, the first support claw 374B or the second support claw 375B can more reliably enter the gap between the discs adjacent to each other.

It is preferable that the first support claw 374B or the second support claw 375B for correcting the inclination of the disc D1 be provided in the vicinity of the position detection sensor in plan view. In this case, since the position of the first support claw 374B or the second support claw 375B for correcting the inclination of the disc D1 in the vertical direction Z can be controlled with high accuracy, the first support claw 374B or the second support claw 375B can more reliably enter the gap between the discs adjacent to each other.

As stated above, the embodiment has been described as an example of the technology of the present disclosure. Thus, the accompanying drawings and detailed description have been provided. Therefore, not only components which are essential for solving the problems but also components which are not essential for solving the problems in order to illustrate the aforementioned technology may be included in the components described in the accompanying drawings and detailed description. Thus, the fact that the non-essential components are described in the accompanying drawings and detailed description should not directly prove that the non-essential components are essential.

In addition, since the aforementioned embodiment is provided in order to illustrate the technology of the present disclosure, various changes, replacements, additions, and omissions can be performed within the scope of the claims or the equivalents thereof.

INDUSTRIAL APPLICABILITY

The disc device according to the present disclosure is particularly useful for a disc device used in a facility that handles a large amount of data such as a data center since it is possible to simplify the configuration of the changer unit by eliminating the necessity of providing the lifter.

REFERENCE SIGNS LIST 1 storage
1A opening
2 drawer
2A handle
3 disc device
4 case
4A opening
5 rail
6 fan unit
7 control unit
8 connecting unit
9 drive mechanism
31A tray stack
31B tray stack
32 disc tray
33 changer unit
34 drive unit
34A tray
35 casing
36 tray carrier
37 disc selector
38 chassis
38A front wall
91 select hook drive unit
91A selection motor
91B motor gear
91C reduction gear
91D relay gear
92 drop hook drive unit
92A separation motor
92B motor gear
92C reduction gear
92D relay gear
93 selection cam gear
93A center hole
93B cam groove
93C cam groove
94 link lever
94A engagement pin
94B bearing
94C lower connection plate
94D upper connection plate
94E hook
95 pressing cam
95A center hole
95B inclination
95C boss
96 separation cam gear
96A center hole
96B cam groove
97 drive lever
97A center hole
97B fitting hole
97C protrusion plate
97D cam groove
98 fixing screw
321 disc tray spindle
322 central shaft
323 side plate
324 bottom plate
324A bayonet groove
325 through-hole
325A recess
326 bottom wall
327 circular hole
327A bayonet protrusion
371 disc selector spindle
372 disc press
373 chassis
373A shaft
374 select hook
374A first shaft
374B first support claw
374C selection lever
374D fixing pin
374E engagement pin
374F connection bar
374G coil spring
375 drop hook
375A second shaft
375B second support claw
375C third support claw
375D separation lever
375E contact pin
375F engagement pin
375G connection bar
375H coil spring
376 fixing plate
D1 disc
D1A center hole
D1B inner peripheral portion

The invention claimed is:

1. A disc device that supplies one disc of a plurality of stacked discs to a drive unit, the device comprising:
a disc selector spindle that is inserted into center holes formed in the plurality of discs, and is configured to hold the plurality of discs in a stacked state, separate a lowermost disc from the other discs, and supply separated lowermost disc to the drive unit,
wherein
the disc selector spindle comprises
a select hook having a first support claw, and
a drop hook having a second support claw and a third support claw,
each of the first support claw, the second support claw, and the third support claw is configured to move to a storage position at which each support claw is stored inside the center hole of the disc and a protrusion position at which each support claw protrudes in a region located in the vicinity of an inner diameter of the disc in plan view,
the first support claw is configured to move to the storage position and the protrusion position independently of movements of the second support claw and the third support claw, and the second support claw is disposed so as to be shifted from the third support claw in a stacking direction of the disc by a thickness of one disc, and is configured to move from the storage position to the protrusion position at a timing different from a timing of the third support claw.

2. The disc device according to claim 1, wherein
the select hook comprises a first shaft extending in the stacking direction,
the first support claw is configured to move to the storage position and the protrusion position in conjunction with a rotation operation of the first shaft around an axis,
the drop hook comprises a second shaft extending in the stacking direction, and
the second support claw and the third support claw are configured to move to the storage positions and the protrusion positions in conjunction with a rotation operation of the second shaft around an axis.

3. The disc device according to claim 1, wherein the select hook and the drop hook are configured to relatively move in the stacking direction.

4. The disc device according to claim 1, wherein
the disc selector spindle is configured to
position the first support claw, the second support claw, and the third support claw at the storage positions when the disc selector spindle is inserted into the center holes of the plurality of discs,
move the first support claw and the second support claw from the storage positions to the protrusion positions when the first support claw and the second support claw are moved below a predetermined disc, and
cause the first support claw and the second support claw to hold the predetermined disc and a disc above the predetermined disc by moving the first support claw and the second support claw upward relative to the predetermined disc in a state in which the first support claw and the second support claw are located at the protrusion positions.

5. The disc device according to claim 4, wherein
the disc selector spindle is configured to separate a disc below the predetermined disc from the predetermined disc by moving the first support claw or the second support claw downward relative to the predetermined disc in a state in which the first support claw and the second support claw hold the predetermined disc and the disc above the predetermined disc.

6. The disc device according to claim 1, wherein
the disc selector spindle is configured to
move the second support claw from the protrusion position to the storage position and move the third support claw from the storage position to the protrusion position in a state in which the first support claw and the second support claw hold a predetermined disc and a disc above the predetermined disc,
cause the third support claw to hold the predetermined disc and the disc above the predetermined disc by moving the first support claw from the protrusion position to the storage position in a state in which the second support claw is located at the storage position and the third support claw is located at the protrusion position, and
separate the predetermined disc from the disc above the predetermined disc by moving the first support claw and the second support claw from the storage positions to the protrusion positions and moving the third support claw from the protrusion position to the storage position in a state in which the third support claw holds the predetermined disc and the disc above the predetermined disc.

7. The disc device according to claim 6, wherein the disc selector spindle is configured to separate the predetermined disc from the disc above the predetermined disc by moving the first support claw and the second support claw downward relative to the predetermined disc in a state in which the first support claw and the second support claw are located at the protrusion positions and the third support claw is located at the storage position.

8. The disc device according to claim 1, wherein the disc selector spindle comprises a plurality of the select hooks and a plurality of the drop hooks.

9. The disc device according to claim 8, wherein the plurality of select hooks and the plurality of drop hooks are alternately arranged at intervals in a circumferential direction of the center hole of the disc in plan view.

10. The disc device according to claim 8, wherein at least one of the first support claw of one select hook of the plurality of select hooks and the second support claw of one drop hook of the plurality of drop hooks is configured to correct an inclination of the disc with respect to a direction orthogonal to the stacking direction by coming in contact with an inner peripheral portion of the disc earlier than the other support claw when the at least one moves from the storage position to the protrusion position.

11. The disc device according to claim 1, further comprising:
a disc tray that stores the plurality of discs in the stacked state,
wherein
the disc tray has a through hole in the region located in the vicinity of the inner diameter of the disc in plan view, and
the disc selector spindle is configured to move to a position at which a lower end portion protrudes downward outside the disc tray via the through hole.

* * * * *